(12) United States Patent
Walker et al.

(10) Patent No.: US 12,398,079 B2
(45) Date of Patent: Aug. 26, 2025

(54) SINTERED CERAMIC BODY OF LARGE DIMENSION AND METHOD OF MAKING

(71) Applicant: Heraeus Covantics North America LLC, Chandler, AZ (US)

(72) Inventors: Luke Walker, Chandler, AZ (US); Matthew Joseph Donelon, Chandler, AZ (US); Lillian Thompson, Chandler, AZ (US)

(73) Assignee: Heraeus Covantics North America LLC, Chandler, AZ (US)

( * ) Notice: Subject to any disclaimer, the term of this patent is extended or adjusted under 35 U.S.C. 154(b) by 87 days.

(21) Appl. No.: 18/247,088

(22) PCT Filed: Sep. 30, 2021

(86) PCT No.: PCT/US2021/052981
§ 371 (c)(1),
(2) Date: Mar. 29, 2023

(87) PCT Pub. No.: WO2022/072705
PCT Pub. Date: Apr. 7, 2022

(65) Prior Publication Data
US 2023/0373870 A1    Nov. 23, 2023

Related U.S. Application Data

(60) Provisional application No. 63/087,204, filed on Oct. 3, 2020, provisional application No. 63/124,586, filed on Dec. 11, 2020.

(51) Int. Cl.
*C04B 35/565* (2006.01)
*B28B 3/02* (2006.01)
(Continued)

(52) U.S. Cl.
CPC .......... *C04B 41/0054* (2013.01); *B28B 3/025* (2013.01); *C04B 35/5607* (2013.01);
(Continued)

(58) Field of Classification Search
CPC .......... B29C 2791/006; C04B 35/5607; C04B 35/5611; C04B 35/5622; C04B 35/5626;
(Continued)

(56) References Cited

U.S. PATENT DOCUMENTS 5,798,016 A    8/1998  Oehrlein et al.
5,911,852 A    6/1999  Katayama et al.
(Continued)

FOREIGN PATENT DOCUMENTS

CN    104942289 A    9/2015
CN    106498205 A    3/2017
(Continued)

OTHER PUBLICATIONS

Zhou Y, et al., "Densification and grain growth in pulse electric current sintering of alumina", Journal of the European Ceramic Society, Elsevier, Amsterdam, NL, vol. 24, No. 12, Jan. 1, 2004 (Jan. 1, 2004) pp. 3465-3470, XP004504462, ISSN: 0955-2219, DOI: 10.1016/J.JEURCERAMSOC.2003.10.013 p. 3466.
(Continued)

*Primary Examiner* — Leo B Tentoni
(74) *Attorney, Agent, or Firm* — Dicke, Billig & Czaja, PLLC

(57) ABSTRACT

A method of making a sintered ceramic body comprising the steps of disposing a ceramic powder (5) inside an inner volume of a spark plasma sintering tool (1), wherein the tool comprises: a die (2) comprising a sidewall comprising inner and outer walls, wherein the inner wall has a diameter defining the inner volume; upper and lower punches (4,4') operably coupled with the die, wherein each of the punches
(Continued)

have an outer wall defining a diameter less than the diameter of the die inner wall, thereby creating a gap (3) between the punches and the inner wall when at least one of the punches are moved within the inner volume, and the gap is from 10 μm to 70 μm wide; creating vacuum conditions inside the inner volume; moving at least one of the punches to apply pressure to the ceramic powder while heating, and sintering; and lowering the temperature of the sintered body.

12 Claims, 17 Drawing Sheets

(51) Int. Cl.
 C04B 35/56 (2006.01)
 C04B 35/58 (2006.01)
 C04B 35/64 (2006.01)
 C04B 35/645 (2006.01)
 C04B 41/00 (2006.01)
 C04B 41/91 (2006.01)

(52) U.S. Cl.
 CPC ...... *C04B 35/5611* (2013.01); *C04B 35/5622* (2013.01); *C04B 35/5626* (2013.01); *C04B 35/58014* (2013.01); *C04B 35/58064* (2013.01); *C04B 35/58071* (2013.01); *C04B 35/58078* (2013.01); *C04B 41/0081* (2013.01); *C04B 41/91* (2013.01); *B29C 2791/006* (2013.01); *C04B 2235/612* (2013.01); *C04B 2235/662* (2013.01); *C04B 2235/666* (2013.01); *C04B 2235/96* (2013.01)

(58) Field of Classification Search
 CPC ............ C04B 35/565; C04B 35/58014; C04B 35/58064; C04B 35/58071; C04B 35/58078; C04B 35/64; C04B 35/645; C04B 2235/612; C04B 2235/6562; C04B 2235/662; C04B 2235/666
 USPC .................. 264/101, 404, 434, 662, 682
 See application file for complete search history.

(56) References Cited

U.S. PATENT DOCUMENTS

| | | | |
|---|---|---|---|
| 6,123,791 A | 9/2000 | Han et al. | |
| 6,352,611 B1 | 3/2002 | Han et al. | |
| 2006/0172073 A1* | 8/2006 | Groza | C04B 35/64 |
| | | | 427/372.2 |
| 2013/0213801 A1 | 8/2013 | Itoh et al. | |
| 2013/0280520 A1* | 10/2013 | Pan | C04B 35/62675 |
| | | | 252/301.4 F |
| 2018/0201545 A1 | 7/2018 | Nagatomo | |
| 2022/0204410 A1 | 6/2022 | Donelon et al. | |
| 2022/0388909 A1 | 12/2022 | Walker et al. | |

FOREIGN PATENT DOCUMENTS

| | | |
|---|---|---|
| JP | S5841700 A | 3/1983 |
| JP | H044998 A | 1/1992 |
| JP | 2983268 B2 | 11/1999 |
| JP | 2004/068089 A | 3/2004 |
| JP | 2005112658 A | 4/2005 |
| JP | 2007210866 A | 8/2007 |
| JP | 2013115156 A | 6/2013 |
| JP | 2018065707 A | 4/2018 |
| RU | 183245 U1 | 9/2018 |
| TW | 201350560 A | 12/2013 |
| WO | 2014097963 A1 | 6/2014 |

OTHER PUBLICATIONS

Salvatore Grasso, et al., "Pressure Effects on Temperature Distribution during Spark Plasma Sintering with Graphite Sample", Materials Transactions, Jan. 1, 2009 (Jan. 1, 2009), pp. 2111-2114, XP055404450, Sendai DOI: 10.2320/matertrans.M2009148 Retrieved from the Internet: URL: https://www.jim.or.jp/journal/e/pdf3/50/08/2111.pdf p. 2111-p. 2112.

Olevsky et al., Fundamental Aspects of Spark Plasma Sintering: II.: Finite Element Analysis of Scalability, Journal of the American Ceramic Society, vol. 95, Issue 8, pp. 2414-2422 (2012), Feb. 5, 2012.

Olevsky et al., Fundamental Aspects of Spark Plasma Sintering: I. Experimental Analysis of Scalability, Journal of the American Ceramic Society, vol. 95, Issue 8 (2012) pp. 2406-2413, Feb. 5, 2012.

S. Cisternino, E. Cazzola, H. Skliarova, J. Amico, M. Malachini,, Target manufacturing by Spark Plasma Sintering for efficient 89Zr production, Nuclear Medicine and Biology 104-105 (2022) 38-46, Nov. 1, 2022, Elsevier.

* cited by examiner

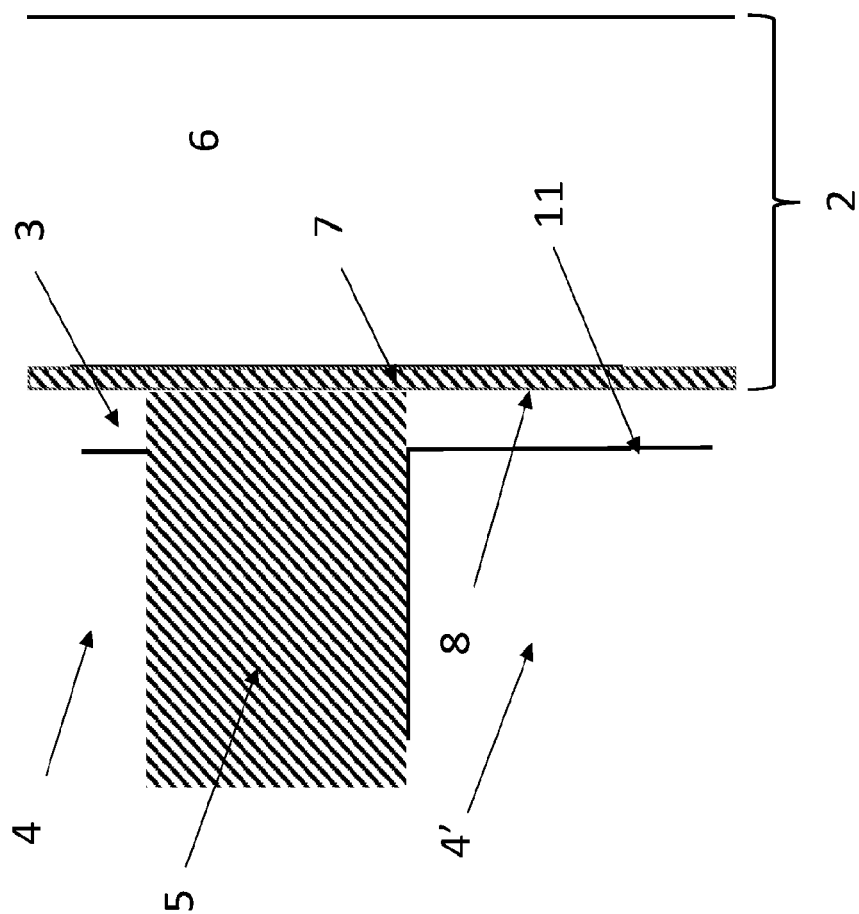

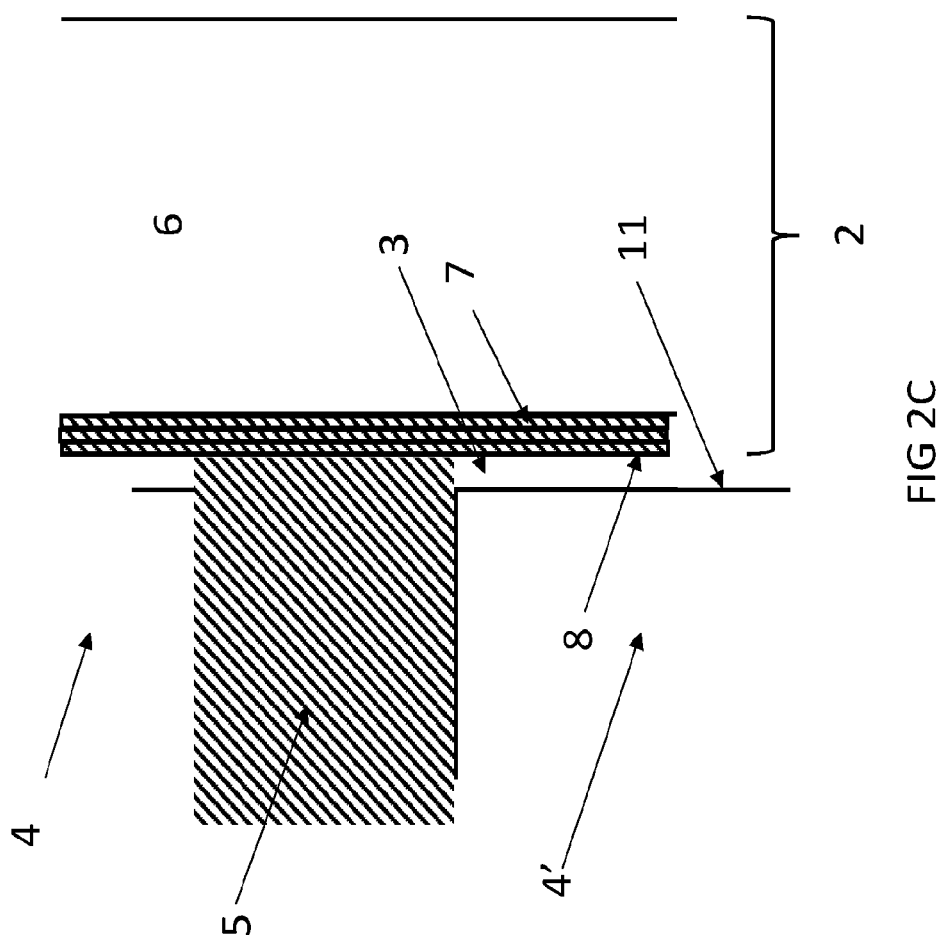

SINTERED CERAMIC BODY OF LARGE DIMENSION AND METHOD OF MAKING

FIELD

The present disclosure relates to a sintered ceramic body, in particular to a large sintered ceramic body of high purity and high density. Moreover, the present disclosure also relates to a specific process for the preparation of a sintered ceramic body and in particular to a method for the preparation of a large sintered ceramic body which can be prepared according to the method of the present disclosure.

BACKGROUND

Ceramics are useful across a variety of industries, such as automotive, aerospace, semiconductor, optics, and medical, among others. Ceramics generally provide high compressive strengths, low thermal expansions, high thermal conductivity, excellent chemical resistance, and favorable dielectric and optical properties. However, fabrication of ceramic parts at large dimensions of about 100 mm to 200 mm and greater proves challenging for a variety of reasons.

Ceramic materials are generally known to be brittle when compared to other materials, such as metals, cermets and polymers. As such, variations in their physical properties and the presence of defects lends them to fracture more readily than other, more ductile materials.

Certain ceramic materials are refractory in nature and difficult to densify. As a result, these are typically prepared by pressureless vacuum sintering in which a ceramic powder is loaded in a furnace and sintered at temperatures of 1600° C. and greater for extended periods of time, often over several days. This technique often results in a sintered ceramic of unacceptable quality, having lower densities and correspondingly higher porosity, which degrades performance such as chemical etch and/or erosion resistance. These conditions for fabrication also result in large grain sizes, on the order of 20 um and greater, and lower densities of less than for example about 95% of theoretical, thereby degrading mechanical strength and resulting in breakage at large dimensions, making them unusable for many applications.

In order to promote densification, sintering aids are often used. In applications where high purity across a large body size is required, sintering aids present in the sintered ceramic are incompatible with the end use of the ceramic article and thus precludes their use in applications where high purity, on the order of 99.99% and greater, is required. Sintering aids may also pose issue where their specific properties may alter the electrical, magnetic or other properties in the sintered ceramic in an undesirable manner for the end user.

Other ceramic materials are known to have low sintered strengths, making them particularly difficult to handle at large dimension without breakage. This prevents their development as structural materials for a variety of applications. Attempts to prepare ceramic materials, in particular those known to have low sintered strengths, at large (>100 mm) body sizes often results in breakage during or after sintering, upon cooling, during post sintering treatments such as annealing or machining or upon handling as needed for processing.

For semiconductor processing applications, vacuum processing chambers are used for etching and chemical vapor deposition (CVD) of materials on semiconducting substrates. These vacuum processing chambers include components such as disks, rings, liners, and cylinders that confine the plasma over the wafer or substrate being processed. These chamber components, which are typically formed from a variety of plasma resistant ceramic materials, are continuously attacked by the plasma and, consequently, erode, corrode and accumulate or release contaminants. This plasma attack causes numerous problems including short component part lifetimes leading to extended tool downtime, increased consumable costs, on-wafer transition metal contamination, process drift and particle contamination which results in device yield loss.

Because of the erosive and corrosive nature of the plasma environment and the need to minimize particle and/or metal contamination, it is desirable for the ceramic components used in plasma processing chambers to have suitably high erosion and corrosion resistance. Such parts have been formed from materials that provide resistance to corrosion and erosion in plasma environments and have been described, for example, in U.S. Pat. Nos. 5,798,016 and 5,911,852; 6,123,791 and 6,352,611. However, these examples do not provide direction for the preparation of ceramic materials and components of large dimension, on the order of at least 100 mm to 200 mm and greater as required in current semiconductor processing chambers.

The large sintered ceramic bodies prepared so far mainly suffer under the risk of breakage, high porosity, low density and an insufficient quality/purity for their use in corrosion resistant applications. Moreover, plasma etch resistant ceramic components of increasingly large dimension are needed for use in state of the art etch chambers. These requirements currently prevent the application of a host of sintered ceramic components in many plasma processing chambers.

There may be no commercially viable method for fabrication of large ceramic body components having high (>96% of theoretical) density and minimal (<4% variation) density variation also providing high purities as necessitated by specific applications.

Spark plasma sintering (SPS) technology has been proposed as a solution to fabricate ceramic bodies of large dimension. The challenge in producing large ceramic bodies by spark plasma sintering processes are addressed in two scientific publications from Eugene A. Olevsky et al. in "Fundamental Aspects of Spark Plasma Sintering: I. Experimental Analysis of Scalability" (J. Am. Ceram. Soc., 95 [8], 2406 to 2413 (2012)) and "Fundamental Aspects of Spark Plasma Sintering: II. Experimental Analysis of Scalability" (J. Am. Ceram. Soc., 95 [8], 2414 to 2422 (2012)) which describe the problem arising with the enlargement of the SPS tooling with regards to the temperature gradient.

Attempts to use spark plasma sintering (SPS) technology to fabricate parts of large (>100 mm) dimension have thus far been unsuccessful. This lack of success is due at least in part to the inability to control the temperature across larger dimensioned parts during the sintering process, resulting in a temperature gradient during processing. Additionally, use of spark plasma sintering technology to densify those powders or powder mixtures having minimal or no conductivity (i.e., insulators), is particularly challenging due to the inherently low conductivity of the powder, thus exacerbating temperature gradients across the powder during sintering. This temperature gradient results in a variation in material properties such as density and grain size, each of which impact mechanical strength. The inability to control this temperature gradient currently prevents the preparation of ceramic bodies having a large dimension on the order of greater than 100 mm which can be easily handled without breakage.

Japanese publication JP 2004/068089 A discloses a SPS tooling apparatus in which a uniform temperature distribution is provided by optimizing the mold structure. In detail, the shape of the molded product to be sintered is axisymmetric with respect to the central axis of the sintering chamber, and the electrodes of the power supply are mounted at symmetrical positions with respect to the central axis of the sintering chamber. It would be preferable not to have to modify the mold structure to produce the large dimension sintered ceramic bodies.

US 2018/201545 A discloses a focus ring having high plasma resistance and also provides a method for producing said focus ring. The focus ring is formed of a sintered body of silicon carbide. The sintered body is composed of a plurality of first crystal grains having an α-SiC crystal structure and a plurality of second crystal grains having a β-SiC crystal structure. The sintered body contains the first crystal grains in an amount of 70% by volume or more relative to the total of the first crystal grains and the second crystal grains. The volume average crystallite diameter of the first crystal grains is 10 μm or less. Once again, this prior art document focuses on the preparation of plasma-resistant materials that have an improved stability towards fluorine-based gases and oxygen gas. There is no indication in this prior art reference towards the production of large and dense high purity ceramic bodies that have an improved resistance against breakage. Accordingly, there is a need in the art for larger sintered ceramic bodies that have improved mechanical properties across the large dimension and are resistant to decay under plasma etch conditions.

For these and other reasons, further development of ceramic materials are needed that provide high and uniform density across the sintered body combined with high purity. There is in particular the need for a process for the preparation of large sintered ceramic bodies which have a reduced risk of breakage and have a sufficient quality with regards to density and density variation, purity, etch resistance, and reduced surface roughness.

SUMMARY

Embodiments provide a method for preparing large sintered ceramic bodies with improved mechanical properties and ability to be handled.

Embodiment 1. A method of making a sintered ceramic body, the method comprising the following process steps: (a) disposing at least one ceramic powder inside an inner volume of a spark plasma sintering tool, wherein the spark plasma sintering tool comprises: a die comprising a sidewall comprising an inner wall and an outer wall, wherein the inner wall has a diameter that defines the inner volume; an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die, wherein the sintering tool has a central axis and the gap is from 10 μm to 100 μm wide; (b) creating vacuum conditions inside the inner volume; (c) moving at least one of the upper punch and the lower punch to apply pressure to the ceramic powder while heating the ceramic powder to a sintering temperature and sintering the ceramic powder to form the sintered ceramic body; and (d) lowering the temperature of the sintered ceramic body, wherein the at least one ceramic powder has a specific surface area of from 1 to 18 $m^2/g$ as measured according to ASTM C1274.

Embodiment 2. The method of embodiment 1 wherein the inner wall of the die comprises at least one conductive foil.

Embodiment 3. The method of embodiment 2 wherein the at least one conductive foil comprises graphite, niobium, nickel, molybdenum, or platinum.

Embodiment 4. The method of any one of embodiments 1 to 3 wherein the die, upper punch and lower punch comprise at least one graphite material.

Embodiment 5. The method of embodiment 4 wherein the at least one graphite material has a grain size of from 5 to 30 um.

Embodiment 6. The method of any one of embodiments 4 to 5 wherein the at least one graphite material has a density of from 1.45 to 2.0 g/cc.

Embodiment 7. The method of any one of embodiments 4 to 6 wherein a radial deviation from the average coefficient of thermal expansion of the at least one graphite material varies about the central axis by at least one amount selected from the group consisting of $0.3 \times 10^{-6}/°$ C. and less, $0.25 \times 10^{-6}/°$ C. and less, $0.2 \times 10^{-6}/°$ C. and less, $0.18 \times 10^{-6}/°$ C. and less, $0.16 \times 10^{-6}/°$ C. and less, $0.14 \times 10^{-6}/°$ C. and less, $0.12 \times 10^{-6}/°$ C. and less, $0.1 \times 10^{-6}/°$ C. and less, $0.08 \times 10^{-6}/°$ C. and less, and $0.06 \times 10^{-6}/°$ C. and less.

Embodiment 8. The method of any one of embodiments 1 to 7 wherein the at least one ceramic powder has a resistivity of from about $1 \times 10^{-5}$ ohm-cm to about $1 \times 10^{+10}$ ohm-cm and the at least one ceramic powder is selected from the group consisting of tungsten carbide, chromium carbide, vanadium carbide, niobium carbide, molybdenum carbide, tantalum carbide, titanium carbide, zirconium carbide, hafnium carbide, silicon carbide, boron carbide, molybdenum boride, chromium boride, hafnium boride, zirconium boride, tantalum boride and titanium boride or titanium diboride, and titanium nitride and combinations thereof.

Embodiment 9. The method of any one of embodiments 1 to 8 wherein the gap has a width selected from the group consisting of from 10 μm to 70 μm, from 20 μm to 70 μm, from 30 μm to 70 μm, from 40 μm to 70 μm, from 50 μm to 70 μm, from 60 μm to 70 μm, from 10 to 60 um, from 10 to 50 um, from 10 to 40 um, from 10 to 30 um, from 20 μm to 60 μm, from 20 μm to 50 μm, from 30 μm to 60 μm, and from 30 μm to 50 μm.

Embodiment 10. The method of any one of embodiments 1 to 9 wherein the gap is from 10 to 70 um wide and the at least one ceramic powder has a resistivity of from about $1 \times 10^{+10}$ ohm-cm and greater and the at least one ceramic powder is selected from the group consisting of yttrium oxide, aluminum oxide, sapphire, yttrium aluminum monoclinic (YAM), yttrium aluminum garnet (YAG), yttrium aluminum perovskite (YAP), zirconium oxide, titanium oxide, cordierite, mullite, cobaltite, magnesium aluminate spinel, silicon dioxide, quartz, calcium oxide, cerium oxide, ferrite, spinel, zircon, nickel oxide, copper oxide, strontium oxide, scandium oxide, samarium oxide, lanthanum oxide, lutetium oxide, erbium oxide, erbium aluminum garnet (EAG), hafnium oxide, vanadium oxide, niobium oxide, tungsten oxide, manganese oxide, tantalum oxide, terbium oxide, europium oxide, neodymium oxide, zirconium aluminate oxide, zirconium silicate oxide, hafnium aluminate oxide, hafnium silicate oxide, titanium silicate oxide, lanthanum silicate oxide, lanthanum aluminate oxide (LAO), yttrium silicate oxide, titanium silicate oxide tantalum silicate oxide, yttrium nitride, yttrium oxynitride, aluminum nitride, aluminum oxynitride, silicon nitride, silicon oxynitride, sialon materials, boron nitride, beryllium nitride, titanium nitride, tungsten nitride, forsterite, steatite, cordierite, mullite, barium titanate, lead titanate, lead zirconate, lead zirconate titanate, Mn—Zn ferrite, Ni—Zn ferrite and sialon and combinations thereof.

Embodiment 11. The method of any one of embodiments 1 to 10 wherein at least one of the upper punch and the lower punch are coupled to an electrode and at least one of the upper punch and the lower punch are in ohmic contact with the die.

Embodiment 12. The method of any one of embodiments 1 to 11 wherein the gap is axisymmetric about the central axis.

Embodiment 13. The method of any one of embodiments 1 to 12 wherein the gap is asymmetric about the central axis.

Embodiment 14. The method of any one of embodiments 1 to 13 wherein the at least one ceramic powder has a specific surface area (SSA) selected from the group consisting of from 1 to 16 $m^2/g$, from 1 to 14 $m^2/g$, from 1 to 10 $m^2/g$, from 1 to 8 $m^2/g$, from 1 to 6 $m^2/g$, from 2 to 18 $m^2/g$, from 4 to 18 $m^2/g$, from 6 to 18 $m^2/g$, from 8 to 18 $m^2/g$, from 10 to 18 $m^2/g$, from 4 to 12 $m^2/g$, from 4 to 10 $m^2/g$, and from 6 to 8 $m^2/g$.

Embodiment 15. The method according to any one of embodiments 1 to 14, wherein the method further comprises the following optional steps: (e) annealing the sintered ceramic body by applying heat to raise the temperature of the sintered ceramic body to reach an annealing temperature; (f) lowering the temperature of the sintered and annealed ceramic body to an ambient temperature; and (g) machining the annealed sintered ceramic body into one selected from the group consisting of a focus ring, a window, a nozzle, a gas injector, a shower head, a gas distribution plate, a remote plasma adapter, an etch chamber liner, a plasma source adapter, a gas inlet adapter, a diffuser, an electronic wafer chuck, a chuck, a puck, a mixing manifold, an ion suppressor element, a faceplate, an isolator, a spacer, and a protective ring.

Embodiment 16. The method according to any one of embodiments 1 to 15, wherein a temperature difference per centimeter across the at least one ceramic powder disposed inside the inner volume defined by the tool set of the sintering apparatus during step c. is from 0.15 to 5° C./cm.

Embodiment 17. The method according to any one of embodiments 1 to 16 wherein a temperature difference across the at least one ceramic powder disposed inside the inner volume defined by the tool set of the sintering apparatus during step c. is from 1 to 100° C.

Embodiment 18. The method according to any one of embodiments 1 to 17, wherein the at least one ceramic powder has a d50 particle size selected from the group consisting of from 0.8 to 100 μm, from 0.8 to 80 μm, from 0.8 to 60 μm, from 0.8 to 40 μm, from 0.8 to 30 μm, from 0.8 to 20 μm, from 0.8 to 10 μm, from 0.8 to 5 um, from 1 to 100 μm, from 3 to 100 um, from 5 to 100 μm, from 10 to 100 μm, from 20 to 100 μm, from to 40 μm, and from 5 to 30 μm.

Embodiment 19. The method according to any one of embodiments 1 to 18, wherein the at least one ceramic powder comprises a powder compact having a packing density selected from the group consisting of from 20% to 60% by volume, from 30% to 60% by volume, from 40% to 60% by volume, from 20% to 50% by volume, from 20% to 40% by volume, from 30% to 50% by volume, from 40% to 55% by volume, and from 45% to 55% by volume.

Embodiment 20. A sintered ceramic body having a greatest dimension selected from the group consisting of from 100 to 622 mm, from 200 to 622 mm, from 250 to 622 mm, from 300 to 622 mm, from 350 to 622 mm, from 400 to 622 mm, from 550 to 622 mm, from 500 to 622 mm, and from 550 to 622 mm wherein the density is 98% and greater of the reported theoretical density of the ceramic forming the sintered ceramic body and the sintered ceramic body varies in density along the greatest dimension by from 0.5% to 4% wherein the density is measured according to ASTM B962-17.

Embodiment 21. The sintered ceramic body according to embodiment 20 having a volumetric porosity of from 0.1 to 2% as calculated from density measurements performed according to ASTM B962-17.

Embodiment 22. The sintered ceramic body of embodiment 20 having a density variation as measured along the greatest dimension selected from the group consisting of less than 3%, less than 2%, less than 1%, less than 0.5%, from 0.25 to 4.5%, from 0.25 to 4%, from 0.25 to 3%, from 0.25 to 2%, from 0.25 to 1%, from 0.25 to 0.5%, from 0.5 to 3.5%, from 1 to 3%, from 0.5 to 2%, and from 0.5 to 1%.

Embodiment 23. The sintered ceramic body according to any one of embodiments 20 to 22 wherein the sintered ceramic body contains less than 100 ppm of total impurities.

Embodiment 24. The sintered ceramic body according to any one of embodiments 20 to 23 obtainable by a process according to any one of embodiments 1 to 19.

Embodiment 25. The use of a sintered ceramic body according to embodiment 24 in plasma processing chambers, in particular as a focus ring, a window, a nozzle, a gas injector, a shower head, a gas distribution plate, a remote plasma adapter, an etch chamber liner, a plasma source adapter, a gas inlet adapter, a diffuser, an electronic wafer chuck, a chuck, a puck, a mixing manifold, an ion suppressor element, a faceplate, an isolator, a spacer, and/or a protective ring.

By providing a gap distance between the die system and the punch system it becomes possible to prepare a large sintered ceramic body having excellent mechanical properties.

The embodiments of the invention can be used alone or in combinations with each other.

BRIEF DESCRIPTION OF THE DRAWINGS

The present invention will hereinafter be described in conjunction with the appended figures wherein like numerals denote like elements:

FIG. 2A illustrates an embodiment of FIG. 1 showing one foil layer;

FIG. 2C illustrates another alternative embodiment of FIG. 1 showing three foil layers;

DETAILED DESCRIPTION

Figure 1:
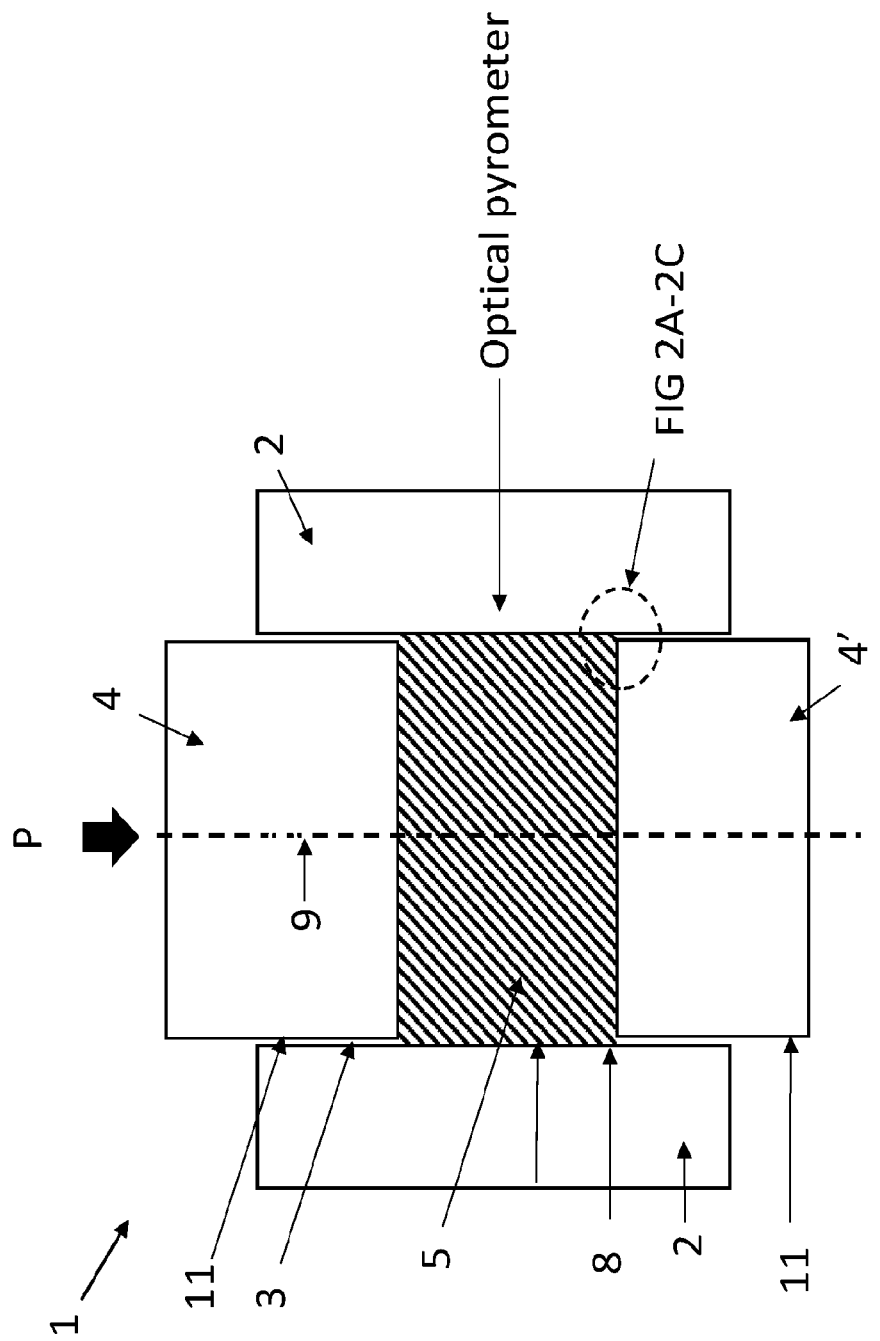
FIG. 1 is a cross-sectional view of a SPS sintering apparatus having a tool set located in a vacuum chamber (not shown) with a simple arrangement used for sintering ceramic materials.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. The use of the term "comprising" in the specification and the claims includes the narrower language of "consisting essentially of" and "consisting of."

Embodiments are described, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Further, all features disclosed with respect to the process/method also apply to the product, a sintered ceramic body as disclosed herein.

All references, including publications, patent applications, and patents, cited herein are hereby incorporated by reference to the same extent as if each reference were individually and specifically indicated to be incorporated by reference and were set forth in its entirety herein.

Definitions

As used herein, the terms "semiconductor wafer," "wafer," "substrate," and "wafer substrate," are used interchangeably. A wafer or substrate used in the semiconductor device industry typically has a diameter of, for example, 200 mm, or 300 mm, or 450 mm.

As used herein, the terms "tool", "tool set" and "apparatus" are used interchangeably.

As used herein, the term "sintered ceramic body" is synonymous with "sinter", "body" or "sintered body" or "sintered ceramic body" and refers to a ceramic article formed from the powder compositions as disclosed upon being subjected to a pressure and heat treatment process which creates a sintered ceramic from the powders as is disclosed. In certain embodiments, the term "sintered ceramic body" may refer to an integral body. By "integral" is meant a single piece or a single unitary part that is complete by itself without additional pieces, i.e., the part is of one monolithic piece formed as a unit with another part.

The sintered ceramic bodies as disclosed herein are preferably polycrystalline and as such the sintered ceramic bodies may comprise two or more crystals without limitation.

As used herein, the term "purity" refers to the absence of various contaminants which do not comprise the bulk powder. As example, a purity of 100% indicates the powder comprises only the ceramic material itself.

As used herein, ambient temperature refers to a temperature of from about 22 to 25° C.

As used herein, ceramic powder refers to one or more crystalline powders, or crystalline powder combinations to form powder mixtures, which may be milled, mixed, blended, calcined, sieved, etc. according to methods known to those skilled in the art. The ceramic powders as disclosed herein are preferably crystalline.

As used herein, the term "impurity" refers to those compounds/contaminants which may be present in a) the starting materials or a powder mixture formed therefrom b) a powder mixture and/or a calcined powder mixture after processing, or c) a sintered ceramic body, comprising impurities other than the starting materials themselves. Impurities do not include optional dopants and/or optional sintering aids. Lower ppm levels correspond to lower impurity content as measured. All values when reported in ppm herein are relative to the total mass of the material to be measured, such as for example the powders as disclosed herein, and/or the sintered ceramic bodies.

As used herein, the term "nanopowder" is intended to encompass those powders having a specific surface area (SSA) of 20 m²/g and greater as measured in accordance with ASTM C1274.

The term "calcination" or "calcining" when used as relates to heat treatment processes is understood herein to mean heat treatment steps which may be conducted on a powder in air to for example remove moisture and/or surface impurities, increase crystallinity and in some instances modify powder and/or powder mixture surface area.

The term "annealing" when applied to heat treatment of ceramics is understood herein to mean a heat treatment conducted on the disclosed sintered ceramic bodies in air to a temperature and allowed to cool slowly to relieve stress and/or normalize stoichiometry.

The term "Sa" as known in the art relates to the arithmetical mean height of a surface and represents the absolute value of the arithmetical mean across the surface. The definition according to ISO 25178-2-2012 section 4.1.7 is the arithmetic mean of the absolute of the ordinate values within a definition area (A).

The term "Sz" as known in the art relates to the maximum (peak to valley) height of a surface and represents the absolute value of the maximum height across the surface. The definition according to ISO 25178-2-2012 section 4.1.6 is the sum of the maximum peak height value and the maximum pit height value within a definition area (A). The maximum pit height value, Sv, is defined as minus the smallest pit height value within a definition area (A) according to ISO 25178-2-2012 section 4.1.5.

The term "Sdr" as known in the art relates to the developed interfacial area ratio of a surface and represents the absolute value of the maximum height across the surface. The definition according to ISO 25178-2-2012 section 4.3.2 is the ratio of the increment of the interfacial area of the scale-limited surface within the definition area (A) over the definition area. Sdr is a proportional expression for an increase in actual surface area beyond that of a completely flat surface. A flat surface is assigned an Sdr of zero, and the value increases with the increase in surface area. Larger numerical values of Sdr correspond with greater increases in surface area, arising from corrosion or etch and/or erosion processes.

As used herein, the terms "substantially", "approximately" and "about" as they are used in connection with numbers allows for a variance of plus or minus 10%.

The term "sintering aid" as used herein refers to additives that enhance densification and promote sintering, and thereby reduce porosity during the sintering process.

As used here, the term "dopant" is used to represent those elements or compounds which may be intentionally added in relatively small amounts (about less than 10 mole %) to alter or achieve specific ceramic properties to achieve desired results. These results may be electrical, mechanical, optical or other properties. By contrast, sintering aids differ from dopants in that sintering aids may be added to lower the temperature at which a powder may sinter to high density.

In the following description, given ranges include the lower and upper threshold values. Accordingly, a definition in the sense of "in the range of X to Y" or "in the range from X to Y" of a parameter A means that A can be any value of X, Y and any value from X to Y. Definitions in the sense of "up to Y" or "at least X" of a parameter A means, that accordingly A may be any value less than Y and Y, or A may be X and any value greater than X, respectively.

Apparatus/Spark Plasma Sintering Tool

Disclosed herein is a spark plasma sintering (SPS) tool comprising: a die comprising a sidewall comprising an inner wall and an outer wall, wherein the inner wall has a diameter that defines an inner volume capable of receiving at least one ceramic powder; and an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die, wherein the gap is from 10 μm to 100 μm wide and the at least one ceramic powder has a specific surface area (SSA) of from 1 to 18 m/g as measured according to ASTM C1274.

FIG. 1 depicts an SPS tool 1 with a simplified dielpunch arrangement used for sintering ceramic powders. Typically, the die/punch arrangement is within a vacuum chamber (not shown) as will be recognized by one of ordinary skill in the art. Referring to FIG. 1, the spark plasma sintering tool 1 comprises a die system 2 comprising a sidewall comprising an inner wall 8 having a diameter that defines an inner volume capable of receiving at least one ceramic powder 5.

Still referring to FIG. 1, the spark plasma sintering tool 1 comprises an upper punch 4 and a lower punch 4' operably coupled with the die system 2, wherein each of the upper punch 4 and the lower punch 4' have an outer wall 11 defining a diameter that is less than the diameter of the inner wall 8 of the die system 2 thereby creating a gap 3 between each of the upper punch 4 and the lower punch 4' and the inner wall 8 of the die system 2 when at least one of the upper punch 4 and the lower punch 4' are moved within the inner volume of the die system 2.

The die system 2 and upper 4 and lower 4' punches may comprise at least one graphite material, typically a low strength graphite material. In certain embodiments, the graphite material/s disclosed herein may comprise at least one isotropic graphite material. In other embodiments, the graphite material/s disclosed herein may comprise at least one reinforced graphite material such as for example a carbon-carbon composite, and graphite materials comprising fibers, particles or sheets or mesh or laminates of other electrically conductive materials such as carbon in a matrix of an isotropic graphite material. In other embodiments, the die and upper and lower punches may comprise combinations of these isotropic and reinforced graphite materials.

The graphite materials used for some or all of the parts of the tool such as, for example, die 6 and punches 4 and 4' may comprise porous graphite materials which exhibit a porosity of from about 5% to about 20%, from about 5% to about 17%, from about 5% to about 13%, from about 5% to about 10%, from 5% to about 8%, from about 8% to about 20%, from about 12% to 20%, from about 15% to about 20%, from about 11% to about 20%, from about 5% to 15%, from 6% to about 13%, and preferably from about 7% to about 12%.

Preferably, the graphite material has an average pore size (pore diameter) of from 0.4 to 5.0 μm, preferably from 1.0 to 4.0 μm and comprises pores with a surface pore diameter of up to 30 μm, preferably up to 20 μm, preferably up to 10 μm. More preferably, pores with a surface pore diameter of from 10 to 30 μm may be present.

The graphite materials used for the tool as disclosed herein may have an average grain size of <0.05 mm, preferably <0.04 mm, preferably <0.03 mm, preferably <0.028 mm, preferably <0.025 mm, preferably <0.02 mm, preferably <0.018 mm, preferably <0.015 mm, and preferably <0.010 mm.

The graphite materials used for the tool as disclosed herein may have an average grain size of >0.001 mm, preferably >0.003 mm, preferably >0.006 mm, preferably >0.008 mm, preferably >0.010 mm, preferably >0.012 mm, preferably >0.014 mm, preferably >0.020 mm preferably >0.025 mm and preferably >0.030 mm.

The graphite materials used for the tool as disclosed herein may have a density of ≥1.45 g/cm$^3$, preferably ≥1.50 g/cm$^3$, preferably ≥1.55 g/cm$^3$, preferably ≥1.60 g/cm$^3$, preferably ≥1.65 g/cm$^3$, preferably ≥1.70 g/cm$^3$, and preferably ≥1.75 g/cm$^3$.

The graphite materials used for the tool as disclosed herein may have a density of ≤2.00 g/cm$^3$, preferably ≤1.90 g/cm$^3$, preferably ≤1.85 g/cm$^3$ and preferably ≤1.80 g/cm$^3$.

In embodiments, the graphite materials have a coefficient of thermal expansion (CTE) across a temperature range from about 400 to about 1200° C. of ≥3.3×10$^{-6}$/° C., ≥3.5×10$^{-6}$/° C., ≥3.7×10$^{-6}$/° C., ≥4.0×10$^{-6}$/° C., ≥4.2×10$^{-6}$/° C., ≥4.4×10$^{-6}$/° C., ≥4.6×10$^{-6}$/° C., ≥4.8×10$^{-6}$/° C.

In embodiments, the graphite materials may have a coefficient of thermal expansion (CTE) across a temperature range from about 400 to 1200° C. of ≤7.2×10$^{-6}$/° C., preferably ≤7.0×10$^{-6}$/° C., preferably ≤6.5×10$^{-6}$/° C., preferably ≤6.0×10$^{-6}$/° C., preferably ≤5.0×10$^{-6}$/° C., preferably ≤4.8×10$^{-6}$/° C., preferably ≤4.6×10$^{-6}$/° C.

In embodiments, the at least one graphite material/s may have a coefficient of thermal expansion (CTE) at a temperature of from 400° C. to 500° C. of from about 3.8×10$^{-6}$/° C. to about 7×10$^{-6}$/° C., preferably from about 4.0×10$^{-6}$/° C. to about 7×10$^{-6}$/° C., preferably from about 4.4×10$^{-6}$/° C. to about 7×10$^{-6}$/° C., preferably from about 4.0×10$^{-6}$/° C. to about 6×10$^{-6}$/° C.

Table 1 lists properties of exemplary graphite materials as disclosed herein.

TABLE 1

| Property | Range |
| --- | --- |
| Density (g/cc) | 1.45 to 2.0 |
| Average Grain Size (um) | 1 to <50 |
| Resistivity (Ohm-cm) | 0.001 to 0.003 |
| Flexural Strength (MPa) | 40-160 |
| Compressive Strength (MPa) | 80-260 |
| CTE (×10$^{-6}$/C) at 400° C. to 1400° C. | 3.3 to 7 |
| Porosity % | 5 to 20 |
| Average Pore Diameter (um) | 0.4 to 5 |
| Thermal K (W/m K) | 40-130 |
| Shore Hardness (HSD) | 55 to 59 |
| Tensile Strength (MPa) | 25 to 30 |
| Elastic Modulus (GPa) | 9 to 11 |
| Impurities/Ash (ppm) | 3 to 500 |

Figure 2B:
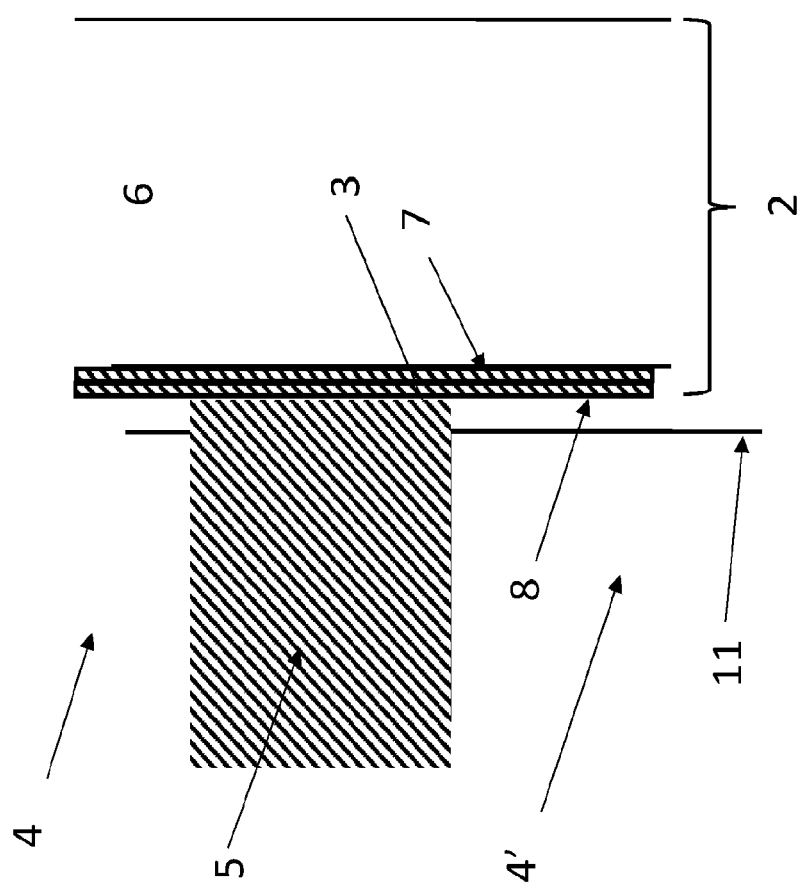
FIG. 2B illustrates an alternative embodiment of FIG. 1 showing two foil layers.

The die system 2 comprises a die 6 and optionally but preferably at least one conductive foil 7 located on the inner wall of the die as depicted in the embodiments of FIGS. 2A to 2C. The number of conductive foils on the inner wall of the die is not limited and 1, 2, 3, 4, 5, 6, 7, 8, 9, or 10 conductive foils may be provided as a circumferential liner between die 6 and each of upper 4 and lower 4' punches whereby the inner wall 8 of the die system 2 (including the at least one conductive foil, if present) and the outer wall 11 of each of the upper and lower punches defines the gap 3. The at least one conductive foil 7 may comprise graphite, niobium, nickel, molybdenum, platinum and other ductile, conductive materials and combinations thereof which are stable within the temperature range according to the method as disclosed herein.

In certain embodiments, the conductive foil may comprise a flexible and compressible graphite foil as disclosed herein having one or more of the following characteristics:
  carbon content of more than 99 wt %, preferably more than 99.2 wt %, more preferably more than 99.4 wt %, more preferably more than 99.6 wt %, more preferably more than 99.8 wt %, more preferably more than 99.9 wt %, more preferably more than 99.99 wt %, and more preferably more than 99.999 wt %;
  impurities of less than 500 ppm, preferably less than 400 ppm, more preferably less than 300 ppm, more preferably less than 200 ppm, more preferably less than 100 ppm, more preferably less than 50 ppm, more preferably less than 10 ppm, more preferably less than 5 ppm, and more preferably less than 3 ppm each relative to the total mass of the foil;
  tensile strength of the graphite foil in a range of from 4.0 to 6.0 MPa, preferably from 4.2 to 5.8 MPa, and more preferably from 4.4 or 5.6 MPa; and/or
  bulk density of the graphite foil preferably in a range of from 1.0 to 1.2 g/cc, preferably 1.02 to 1.18 g/cc, more preferably 1.04 to 1.16 g/cc, and more preferably 1.06 to 1.16 g/cc.

In embodiments, the at least one foil typically comprises graphite. In certain embodiments, the at least one foil as part of the die system may comprise a circumferential liner between a surface of the die and each of the upper and lower punches.

The graphite foils may improve the temperature distribution across the powder during sintering. Table 2 lists properties of exemplary graphite foils according to embodiments as disclosed herein such as Neograf Grafoil®, Sigraflex® graphite foils, and Toyo Tanso Perma-Foil®.

TABLE 2

| Thickness (mm) | 0.030 to 0.260 |
| --- | --- |
| Density (Mg/m3) | 0.5 to 2 |
| Tensile Strength (MPa) | 4.9-6.3 |
| Resistivity (μOhm-m; 25° C.) (parallel to surface) | 5 to 10 |
| Resistivity (μOhm-m; 25° C.) (perpendicular to surface) | 900 to 1100 |
| CTE (×10–6/C; parallel to surface) at 350° C. to 500° C. | 5 to 5.5 |
| CTE (perpendicular to surface) at 350° C. to 500° C. | $2 \times 10^{-4}$ |
| Compressibility (%) | 40-50 |
| Recovery (%) | 10 to 20 |
| thermal conductivity (W/mK at 25° C.; parallel to surface) | 175 to 225 |
| thermal conductivity (W/mK at 25° C.; perpendicular to surface) | ~5 |
| Impurities/Ash (wt %) | <0.5 |

Referring now to FIGS. 2A, 2B and 2C, an SPS tool set with embodiments of the graphite foil arrangement is shown. A ceramic powder 5 is disposed between at least one of upper and lower punches 4 and 4' and gap 3 is shown between the outer wall 11 of each of the upper and lower punches and the inner wall 8 of the die system 2. FIGS. 2A, 2B and 2C depict 1 to 3 layers of conductive foil 7 respectively and die 6 as part of the die system 2. Accordingly, the gap extends from the inner wall 8 of the die system 2 to the outer wall 11 of each of the upper and lower punches. The gap distance is arranged such that the powder may degas before and/or during heating and sintering, while also maintaining ohmic contact between punch and die to improve the temperature distribution across the ceramic powder during heating and sintering.

The graphite foils 7 may have a thickness of, for example, from 0.025 to 0.260 mm, preferably from 0.025 to 0.200 mm, preferably from 0.025 to 0.175 mm, preferably from 0.025 to 0.150 mm, preferably from 0.025 to 0.125 mm, preferably from 0.035 to 0.200 mm, preferably from 0.045 to 0.200 mm, and preferably from 0.055 to 0.200 mm.

The distance of gap 3 is measured from an inwardly facing surface of the foil 7 closest to the upper and lower punches 4 and 4' to the outer wall 11 of each of the upper and lower punches. Preferred ranges for the distance of gap 3 are preferably from 10 to 100 μm, preferably from 10 to 80 μm, preferably from 10 to 70 μm, preferably from 10 to 60 μm, preferably from 10 to 50 μm, preferably from 20 to 70 μm, preferably from 30 to 70 μm, preferably from 40 to 70 μm, preferably from 50 to 70 μm, preferably from 20 to 60 um, preferably from 20 to 50 um, preferably from 30 to 60 μm, preferably from 30 to 50 um.

Moreover, the width of gap 3 between the inner wall 8 of the die system 2 and the outer wall 11 of each of the upper 4 and lower 4' punches may be determined by the person skilled in the art so that the powder degassing during the preheating, heating and sintering processes are sufficiently facilitated on one hand and that a sufficient electrical contact for Joule or resistive heating and, thereby, sintering is achieved on the other hand. If the distance of gap 3 is less than 10 μm, the force required to move at least one of the upper and lower punches within the inner volume of the die system, and thereby assemble the tool set, may cause damage to the tool set. Further, if the gap 3 were less than 10 um then adsorbed gases, organics, humidity and the like within the ceramic powder 5 may not escape, which would extend processing time during manufacturing and may result in residual porosity, and thereby lowered density, in the sintered ceramic body. If the width of gap 3 is greater than 70 μm when sintering an insulating material such as the oxide ceramics comprising oxide and/or nitride ceramics and non-conducting mixed metal oxides as disclosed herein having a high resistivity (on the order of for example about $1 \times 10^{+10}$ ohm-cm and greater at room temperature), localized overheating may occur, resulting in thermal gradients within the tool set 1 during sintering. These thermal gradients may result in low overall bulk density and high density variations and a sintered ceramic body which is fragile and prone to breakage. As a result, in order to form a sintered ceramic body of a large dimension from non-conducting ceramic powders having a high resistivity (and thus low conductivity), a gap of from 10 to 70 um is preferable. Thus, in some embodiments, the distance of the gap 3 between the inner wall 8 of the die system 2 and the outer wall 11 of each of the upper and lower punches when sintering ceramic powders 5 comprising insulating, oxide or nitride ceramics is preferably from 10 to 70 μm, preferably from 10 to 60 μm, preferably from 10 to 50 μm, preferably from 10 to 40 μm, preferably from 20 to 70 μm, preferably from 30 to 70 μm, preferably from 40 to 70 μm, preferably from 50 to 70 um, preferably from 30 to 60 μm. The gap 3 reduces the thermal gradient across a powder compact comprising insulating ceramic powders.

Correspondingly, when the ceramic powder comprises a non-oxide ceramic selected from carbides and borides and specific nitrides such as titanium nitride each of which may have lower resistivity, and partial conductance, relative to the oxide and nitride ceramics as disclosed herein, of for example from about $1 \times 10^{-5}$ ohm-cm to about $1 \times 10^{+10}$ ohm-cm at room temperature, a larger gap may be acceptable, for example from about 10 to about 100 um. This increased gap may be attributed to the partial conductance of the powder or powder compact whereby the partial conductance transmits current, and thereby heat through the powder compact thus reducing the thermal gradients across the powder or powder compact comprising the non-oxide ceramics as disclosed. When sintering those ceramic powders having some conductivity and thereby lower resistivity, such as the non-oxide ceramics and/or conductive mixed metal oxides as disclosed herein, a gap 3 of greater than 100 μm may result in localized overheating and thermal gradients within the tool set during sintering. These thermal gradients may result in low overall or bulk density and high-density variations and a sintered ceramic body which is fragile and prone to breakage. As a result, the distance of gap 3 between the inner wall 8 of the die system 2 and the outer wall 11 of each of the upper and lower punches when sintering the non-oxide ceramics and/or conductive mixed metal oxides as disclosed herein is from 10 to 100 μm, preferably from 10 to 80 μm, preferably from 10 to 60 μm, preferably from 10 to 40 μm, preferably from 20 to 100 μm, preferably from 40 to 100 μm, preferably from 60 to 100 μm, preferably from 30 to 80 um, preferably from 40 to 70 μm.

Without intending to be bound by a particular theory, it is believed that the gap distance between the inner wall 8 of the die system 2 and the outer wall 11 of each of the upper and lower punches during sintering functions to facilitate powder degassing of organics, moisture, adsorbed molecules, etc. during the sintering processes in accordance with step c) of the method as disclosed. This leads to a sintered ceramic body of a large size having high density and low volumetric porosity, low density variation and improved mechanical properties such that the body may be easily handled without breakage and machined into specific forms for fabrication of the sintered ceramic components disclosed herein for use in plasma processing chambers. Sintered ceramic bodies made as disclosed herein may have dimensions of from 100 mm to about 625 mm with regard to the greatest dimension of the sintered ceramic body.

Figure 3B:
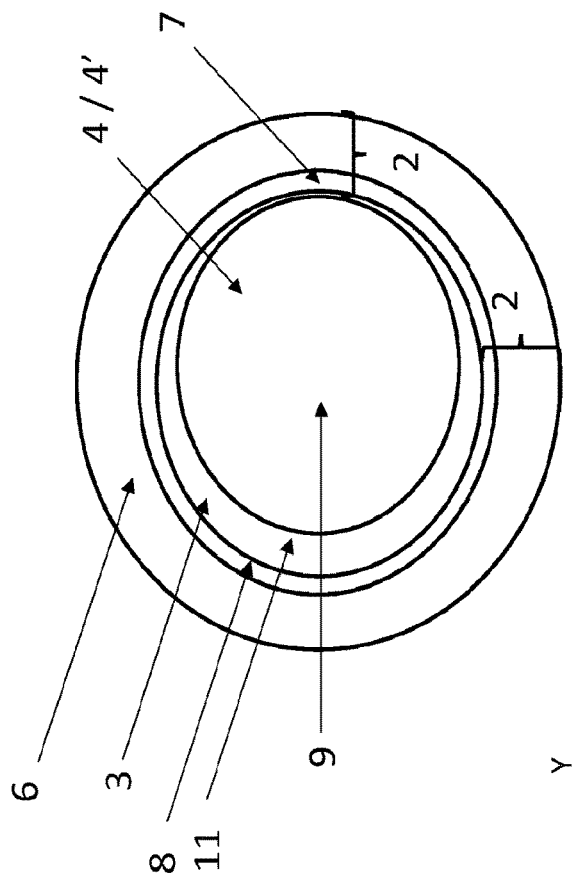
FIGS. 3A and 3B are top plan views of the SPS sintering apparatus of FIG. 1.
Figure 3A:
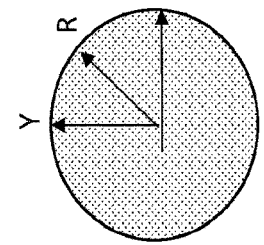
Figure 3A:
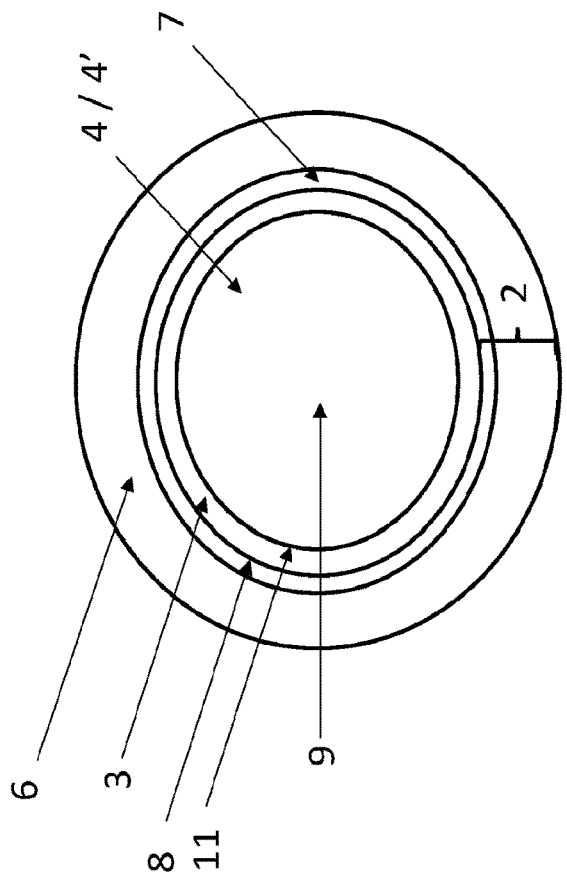

In practice, the upper and lower punches 4 and 4' are not always perfectly aligned about a central axis. FIG. 3A and FIG. 3B are plan views of the tool set 1, illustrating alignments of upper and lower punches 4 and 4', gap 3, any number of conductive foils 7, and die system 2 about central axis 9. In embodiments as depicted in FIG. 3A, the gap may be axisymmetric about central axis 9. In other embodiments as depicted in FIG. 3B, the gap may be asymmetric about central axis, 9. The gap 3 may extend between from 10 um to 70 um when sintering the oxide and/or nitride ceramics as disclosed herein, and may extend from 10 um to 100 um when sintering the non-oxide ceramics as disclosed herein in both axisymmetric and asymmetric embodiments as depicted.

Figure 4:
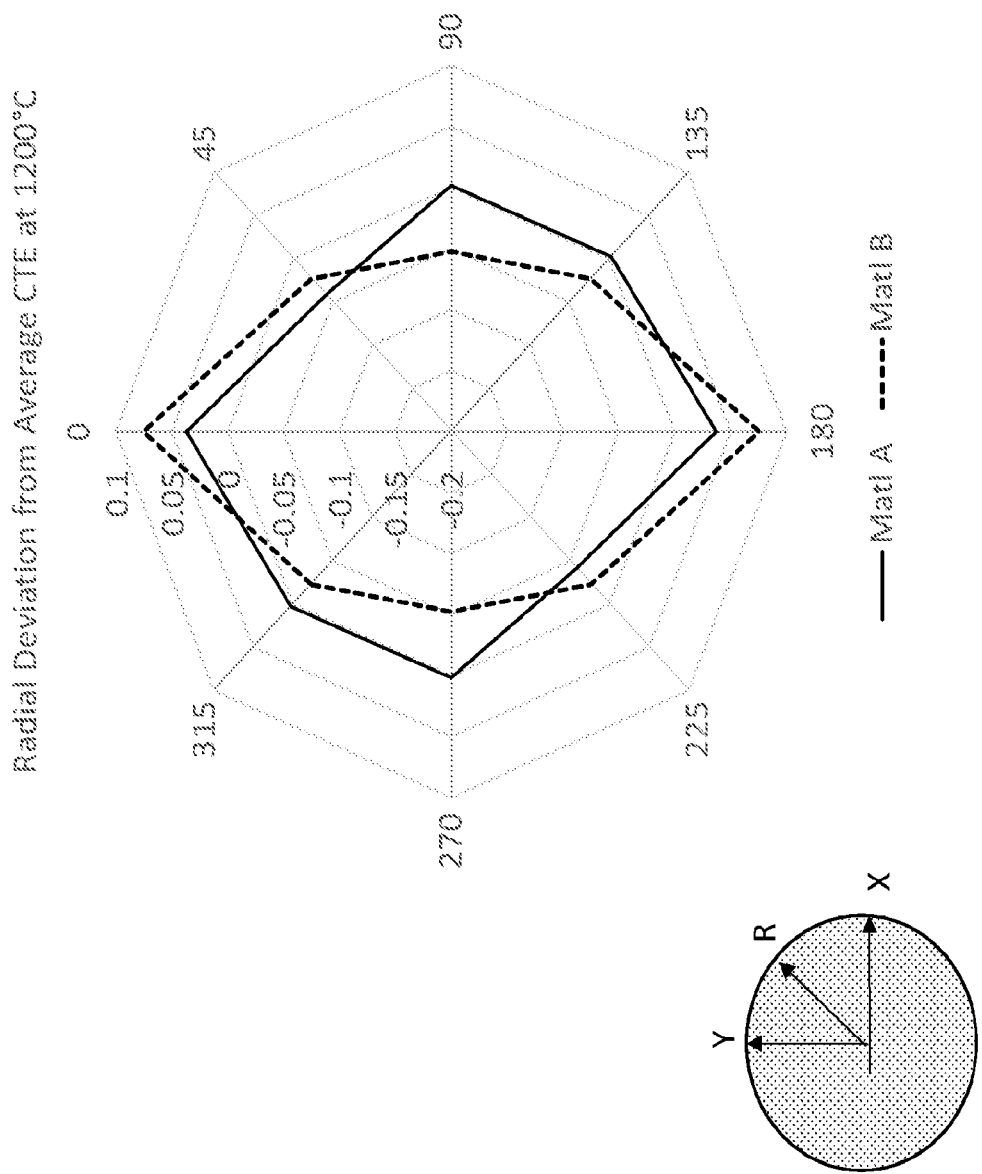
FIG. 4 is a graph depicting radial variance in average coefficient of thermal expansion (CTE) of graphite materials A and B at 1200° C.

Gap asymmetry performance can be measured by performing an absolute radial CTE deviation analysis over a range of temperatures. For example, FIG. 4 shows the radial deviation from the average CTE of two isotropic graphite materials (A and B) which may be used as the punches and die of the apparatus 1 at 1200° C. FIG. 4 shows radial deviation in expansion in ppm/° C. relative to the average expansion in the x-y plane of the graphite (expansion in the z direction is not as critical to operation of the tool 1). FIG. 4 shows that for a material to be successful at maintaining the desired gap over a large temperature range, the radial deviation cannot vary from the average CTE in the x-y plane by $>0.3 \times 10^{-6}$/° C. at the maximum from, e.g., room temperature to 2000° C. Thus, in order to maintain the desired gap 3 across a temperature range necessary for sintering the insulating ceramic powders having a resistivity of $1\times10^{+10}$ and greater as disclosed herein, the radial deviation from average CTE may preferably be minimized, and as such, the radial deviation is preferably from $0.3\times10^{-6}/°$ C. and less, preferably from $0.25\times10^{-6}/°$ C. and less, preferably from $0.2\times10^{-6}/°$ C. and less, preferably $0.18\times10^{-6}/°$ C. and less across a temperature range of interest. In certain embodiments, it may be preferable that radial deviations from the average CTE of $0.16\times10^{-6}/°$ C. and less, preferably $0.14\times10^{-6}/°$ C. and less, preferably $0.12\times10^{-6}/°$ C. and less, preferably $0.1\times10^{-6}/°$ C. and less, preferably $0.08\times10^{-6}/°$ C. and less, preferably $0.06\times10^{-6}/°$ C. and less are maintained to provide the desired gap 3 across a temperature range of from room temperature up to a sintering temperature of the ceramic powder and including up to and a working temperature of the apparatus of about 2,000° C. The disclosed ranges of radial deviation from average CTE of the at least one graphite material in the x/y plane are required to be maintained across a rotational position about the central axis 9 of from 0 to 360 degrees, preferably from 0 to 270 degrees, preferably from 0 to 180 degrees, preferably from 0 to 90 degrees, preferably from 0 to 45 degrees, preferably less than 10 degrees, preferably less than 5 degrees, preferably about 3 degrees, preferably about one degree, each with respect to the rotational position of the die and upper and/or lower punches.

When sintering partially conductive ceramic powders having a resistivity of from about $1\times10^{-5}$ to $1\times10^{+10}$ as disclosed herein, the radial deviation from average CTE may be from $0.5\times10^{-6}/°$ C. and less, preferably from $0.4\times10^{-6}/°$ C. and less, preferably from $0.3\times10^{-6}/°$ C. and less, preferably $0.25\times10^{-6}/°$ C. and less, preferably $0.2\times10^{-6}/°$ C. and less, preferably $0.18\times10^{-6}/°$ C. and less, preferably from $0.16\times10^{-6}/°$ C. and less, preferably $0.14\times10^{-6}/°$ C. less, preferably $0.12\times10^{-6}/°$ C. and less, preferably $0.1\times10^{-6}/°$ C. and less, preferably $0.08\times10^{-6}/°$ C. and less, preferably $0.06\times10^{-6}/°$ C. and less. Material B displays an unacceptable CTE expansion in the x-y plane whereas Material A exhibited an acceptable CTE expansion throughout the temperature range.

Figure 5:
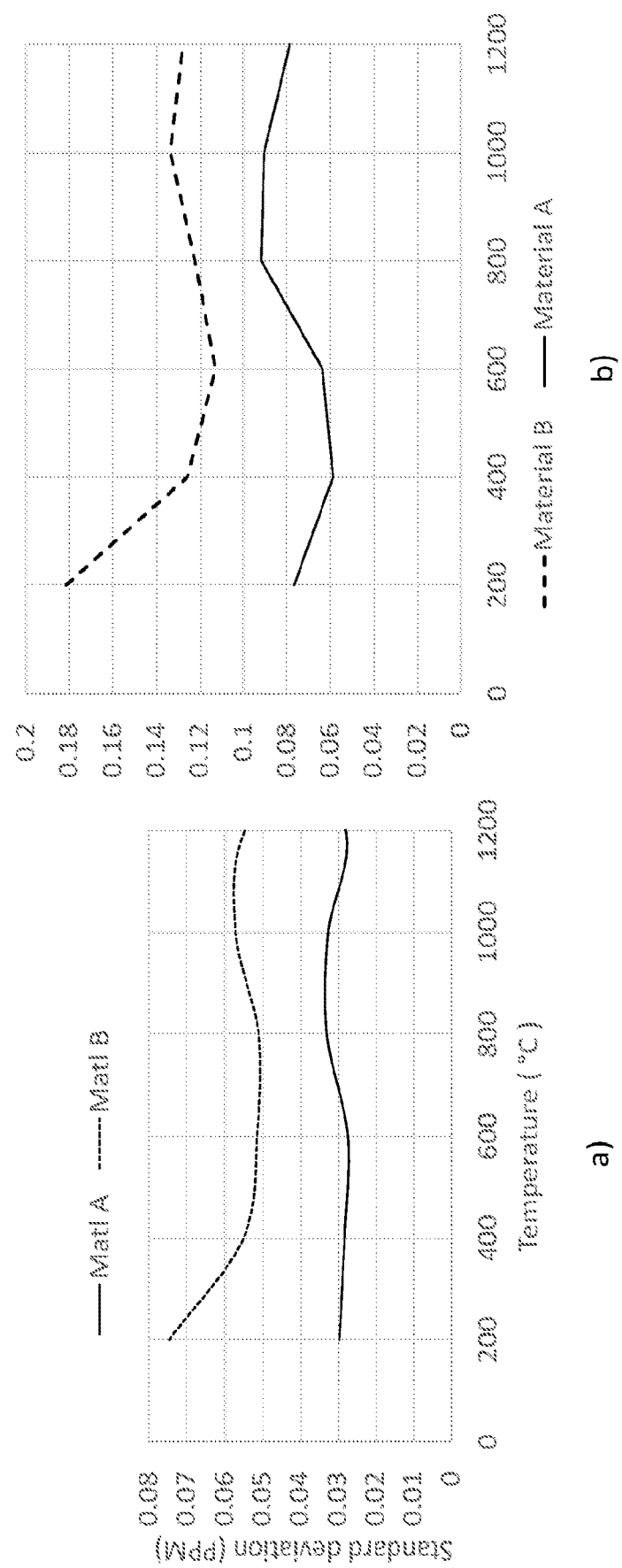
FIG. 5 a) illustrates the standard deviation of coefficient of thermal expansion of graphite materials A and B in ppm and b) variance in coefficient of thermal expansion of graphite materials A and B each as measured over the operating temperatures of 200 to 1200° C.

FIG. 5 A) shows the standard deviation in parts per million (ppm) of the graphite material CTE in the x/y plane and B) the absolute variation (delta) in CTE (from lowest to highest) across the x-y plane of both materials of FIG. 4 across the range of temperatures. Preferable are those graphite materials having a lower standard deviation and absolute variation of CTE in x/y plane.

Figure 6:
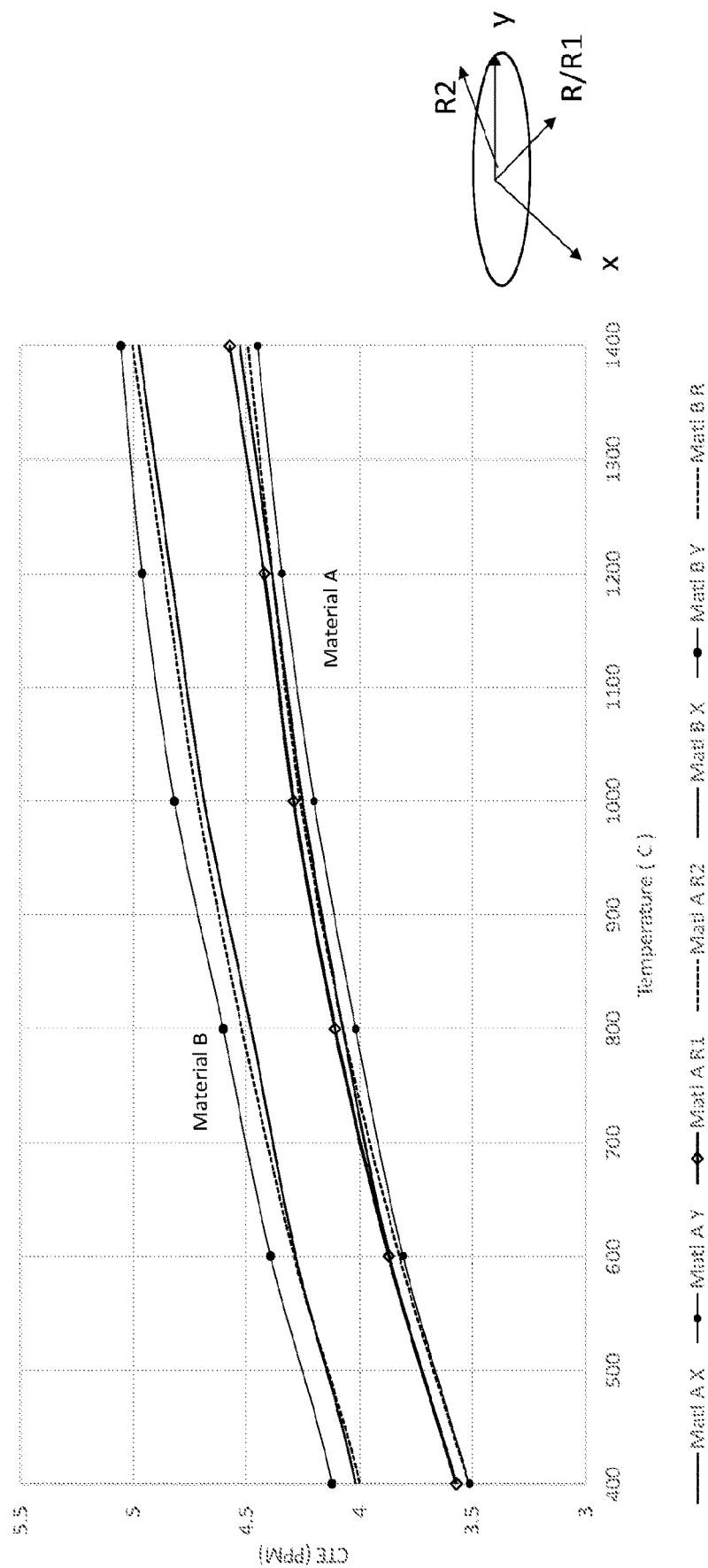
FIG. 6 is a graph illustrating a coefficient of thermal expansion of graphite materials A and B from 400 to 1200° C.

FIG. 6 depicts variance in coefficient of thermal expansion of graphite materials A and B from 400 to 1400° C.

The advantages of the specific tool set 1 design used according to an embodiment may lead to the overall technical effect to provide a large ceramic body of very high purity and having a high and uniform density and low volumetric porosity and thereby a reduced tendency towards breakage in the sintering process, in particular in the SPS process, according to the present disclosure. Therefore, all features disclosed with respect to the tool set also apply to the product of a sintered ceramic body of dimension greater than 100 mm.

By using the tool set as disclosed herein it becomes possible to achieve a more homogeneous temperature distribution in the powder to be sintered, and make a sintered ceramic body, in particular one of large dimension, exceeding for example 100 mm and/or 200 mm in greatest dimension, having very high (>98% of theoretical density for a given material) and uniform density (<4% variation across a greatest dimension) and thereby a reduced tendency towards breakage. The word "homogeneous" means that a material or system has substantially the same property at every point; it is uniform without irregularities. Thus, by "homogeneous temperature distribution" is meant that the temperature distribution is spatially uniform and does not have considerable gradients, i.e., a substantially uniform temperature exists regardless of position in a horizontal x-y plane along the ceramic powder 5. More specifically, by "homogeneous temperature distribution" is meant that the temperature distribution across the at least one ceramic powder 5 disposed inside the inner volume defined by the tool set of the sintering apparatus during heating and sintering is at most from 0.15 to 5° C./cm.

The tool set as disclosed may further comprise spacer elements, shims, liners and other tool set components. Typically, such components are fabricated from at least one of the graphite materials having the properties as disclosed herein.

Process for Preparing Large Sintered Ceramic Bodies

The above-described SPS tool 1 is employed in the following process. As such, all features disclosed with respect to the tool set 1 also apply for the process and accordingly all features disclosed with respect to the process also apply for the product of a sintered ceramic body having as a greatest dimension 100 mm and even up to and including about 625 mm.

In one embodiment, disclosed herein is a method of making a sintered ceramic body, the method comprising the following process steps: (a) disposing at least one ceramic powder inside an inner volume of a spark plasma sintering tool, wherein the spark plasma sintering tool comprises: a die comprising a sidewall comprising an inner wall and an outer wall, wherein the inner wall has a diameter that defines the inner volume; an upper punch and a lower punch operably coupled with the die, wherein each of the upper punch and the lower punch have an outer diameter that is less than the diameter of the inner wall of the die thereby creating a gap between each of the upper punch and the lower punch and the inner wall of the die when at least one of the upper punch and the lower punch are moved within the inner volume of the die, wherein the gap is from 10 μm to 100 μm wide; (b) creating vacuum conditions inside the inner volume; (c) moving at least one of the upper punch and the lower punch to apply pressure to the ceramic powder while heating the ceramic powder to a sintering temperature and sintering the ceramic powder to form the sintered ceramic body; and (d) lowering the temperature of the sintered ceramic body.

The method is characterized in that the SPS tool set described above is located inside a vacuum chamber and comprises at least a die system and upper and lower punches, together defining a volume whereby the sintering process of the powder is carried out by disposing the powder inside the volume defined by the tool set of the sintering apparatus. The die system may have an inner wall and the at least one punch system may have an outer wall wherein the inner wall of the die system and the outer wall of the punch system are separated by a gap.

Pressure assisted sintering can be achieved by Spark Plasma Sintering (SPS), also known as Field Assisted Sintering Technology (FAST), or Direct Current Sintering (DCS). Direct current and these related techniques employ a direct current to heat up an electrically conductive die configuration, and thereby a material to be sintered is deposited in the die. This manner of heating allows the application of very high heating and cooling rates, enhancing densification mechanisms over grain growth promoting diffusion mechanisms, and transferring the intrinsic properties of the original powders into their near or fully dense products. The SPS method as disclosed herein preferably uses an unpulsed, continuous direct current.

The specific process steps (a) to (d) are now described in detail:

Process Step (a)—Disposing at Least One Ceramic Powder Inside a Tool Set of a Sintering Apparatus:

At least one ceramic powder is disposed in the die system between upper and lower punches of the sintering apparatus as described above. A spark plasma sintering apparatus used in the process according to the present technology comprises typically a cylindrical die system. In the die system the ceramic powder is disposed, and the die system filled with the powder is disposed between upper and lower punches.

The ceramic powder to be disposed in the tool as disclosed herein for sintering may be, for example, a ceramic powder formed from any metal oxide (oxide ceramic), any metal nitride (nitride ceramic), any combination or mixture of metal oxides (mixed metal oxides), or a ceramic material formed from a non-oxide such as a carbide, a boride as defined herein.

The oxide ceramic may be any metal oxide without limitation. The metal element that forms the oxide ceramic may be one or two or more selected from metalloid elements such as boron (B), silicon (Si), germanium (Ge), antimony (Sb) and bismuth (Bi); representative elements such as magnesium (Mg), calcium (Ca), strontium (Sr), barium (Ba), zinc (Zn), aluminium (Al), indium (In), tin (Sn), transition metal elements such as scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), cobalt (Co), nickel (Ni), copper (Cu), silver (Ag) and gold (Au); and lanthanoid elements such as lanthanum (La), cerium (Ce), praseodymium (Pr), neodymium (Nd), samarium (Sm), europium (Er) and lutetium (Lu). Among others, it is preferable that the metal element is one or more elements selected from Mg, Y, Ti, Zr, Cr, Mn, Fe, Zn, Al and Er.

More specifically, examples of the oxide ceramic include yttrium oxide, aluminum oxide, yttrium aluminum monoclinic (YAM), yttrium aluminum garnet (YAG), yttrium aluminum perovskite (YAP), zirconia, chromia, titania, cobaltite, magnesia, silica, calcia, ceria, ferrite, spinel, magnesium aluminate spinel, zircon, nickel oxide, silver oxide, copper oxide, zinc oxide, strontium oxide, scandium oxide, samarium oxide, bismuth oxide, lanthanum oxide, lutetium oxide, hafnium oxide, vanadium oxide, niobium oxide, tungsten oxide, manganese oxides, tantalum oxide, terpium oxide, europium oxide, neodymium oxide, tin oxide, antimony oxide, antimony-containing tin oxide, indium oxide, tin-containing indium oxide, zirconium aluminate oxide, zirconium silicate oxide, hafnium aluminate oxide, hafnium silicate oxide, titanium silicate oxide, lanthanum silicate oxide, lanthanum aluminate oxide, yttrium silicate oxide, titanium silicate oxide, tantalum silicate oxide, and mixtures thereof. The oxide ceramics as disclosed herein may have very high electrical resistivities, and thus be non-conducting insulators.

The metal nitride may be any metal nitride without limitation. The metal element that forms the nitride ceramic may be one or two or more selected from metalloid elements such as boron (B), silicon (Si), germanium (Ge); representative elements such as aluminium (Al), indium (In), tin (Sn); transition metal elements such as scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), cobalt (Co), nickel (Ni), copper (Cu), silver (Ag) and gold (Au); and lanthanoid elements such as lanthanum (La), cerium (Ce), praseodymium (Pr), neodymium (Nd), samarium (Sm), europium (Er) and lutetium (Lu). Specific examples of the nitride ceramics include boron nitride, titanium nitride, silicon nitride and aluminum nitride. With the exception of titanium nitride which is electrically conducting, the nitride ceramics as disclosed herein may have high electrical resistivities, and thus be non-conducting insulators.

The mixed metal oxides may comprise oxides such as forsterite, steatite, cordierite, mullite, barium titanate, lead titanate, lead zirconate titanate, Mn—Zn ferrite, Ni—Zn ferrite and sialon (silicon nitride) and mixtures thereof. These mixed metal oxides may be inherently conducting or insulating, dependent upon composition.

Examples of the non-oxide ceramic include carbides such as tungsten carbide, chromium carbide, vanadium carbide, niobium carbide, molybdenum carbide, tantalum carbide, titanium carbide, zirconium carbide, hafnium carbide, silicon carbide and boron carbide. The non-oxide ceramics comprising carbides as disclosed herein may have moderate electrical resistivities, and thus have a conductivity less than that of metals and greater than that of the oxide and/or nitride and mixed metal oxide ceramics as disclosed herein.

Examples of the non-oxide ceramic include borides such as molybdenum boride, chromium boride, hafnium boride, zirconium boride, tantalum boride and titanium boride or titanium diboride, and titanium nitride. The non-oxide ceramics comprising borides as disclosed herein may have moderate electrical resistivities, and thus have a conductivity less than that of metals and greater than that of the oxide, nitride and mixed metal oxide ceramics as disclosed herein.

The ceramic powders comprising non-oxides such as carbides and borides may have a conductivity between that of the oxide nitrides and mixed metal oxides, and powders comprising metallic materials, having a very low resistivity.

The ceramic powder starting material for carrying out the sintering process as disclosed herein is at least one high-purity commercially available ceramic powder. However, other ceramic powders may also be used, for example those produced from chemical synthesis processes and related methods.

In an embodiment, a multilayer sintered body can be formed by separately disposing in a layered manner different powders or different powder mixtures. For example, an alumina and yttria powder mixture can be used as a first powder and, for example, a different ceramic powder mixture such as a mixture of alumina and zirconia can be used as a second powder mixture. In one example, the zirconia is present in an amount of from 5 to 25%, preferably from 10 to 25%, preferably from 15 to 25%, preferably from 15 to 17%, preferably from 20 to 25%, preferably from 5 to 20%, preferably from 5 to 15%, preferably from 5 to 10%, preferably from 15 to 20% each by volume of the sintered ceramic body. Mixtures of alumina and zirconia can be prepared and calcined as detailed herein. In such embodiments, the powder mixtures are preferably evenly dispersed.

In such mixtures comprising zirconia, the zirconia powder may have a particle size distribution having a d10 of between 0.08 and 0.20 um, a d50 of between 0.3 and 0.7 um and a d90 of between 0.9 and 5 μm. The average particle size of the zirconia powder used as a starting material for the mixture according to one embodiment of the present invention may be from 0.3 to 1 um.

The zirconia powder preferably has a specific surface area of from 1 to 16 $m^2/g$, preferably between 2 to 12 $m^2/g$, and more preferably between 5 to 9 $m^2/g$, and the purity of the zirconia powder starting material is typically higher than 99.5%, preferably higher than 99.8%, preferably higher than 99.9%, preferably higher than 99.99%. This corresponds to a total impurity content of 5000 μm and less, preferably 2000 ppm and less, preferably 1000 ppm and less, preferably 100 ppm and less.

In some multilayer embodiments wherein the process component comprises a substrate layer and a surface layer, the substrate layer preferably comprises at least one crystalline phase comprising alumina and zirconia, wherein the zirconia is present in an amount of from 5 to 25%, preferably from 10 to 25%, preferably from 15 to 25%, preferably from 15 to 17%, preferably from 20 to 25%, preferably from 5 to 20%, preferably from 5 to 15%, preferably from 5 to 10%, preferably from 15 to 20% each by volume of the sintered ceramic body; and the surface layer comprises at least one crystalline phase of yttrium aluminum oxide, wherein the at least one crystalline phase of yttrium aluminum oxide comprises pores having a pore size not exceeding 5 μm and having a maximum pore size of 1.5 μm for at least 95% of the pores.

In such multilayer embodiments, although the compositions may not be limited, the layers of powders or powder mixtures preferably have closely matching coefficients of thermal expansion (CTE) across a temperature range of from about 200° C. to about 1700° C. Preferably, the differences in CTE are 0.5×10-6/° C. and less, preferably 0.4×10-6/° C. and less, preferably 0.3×10-6/° C. and less, preferably 0.2×10-6/° C. and less, preferably 0.1×10-6/° C. and less, preferably 0.09×10-6/° C., preferably 0.07×10-6/° C., and preferably 0.05×10-6/° C.

The purity of the ceramic powder starting material is preferably higher than 99.99%, preferably higher than 99.995%, preferably higher than 99.9975%, preferably higher than 99.999%, preferably more than 99.9995%, and in some embodiments, the purity of the ceramic powder is higher than 99.9999%. In other words, the total impurity level of the ceramic powder may be less than 100 ppm, preferably less than 50 ppm, more preferably less than 250 ppm, more preferably less than 10 ppm, more preferably less than 5 ppm, more preferably about 3 ppm, and still more preferably 1 ppm and less (inclusive of 0 ppm) each relative to the total mass of the ceramic powder starting material. A high purity starting ceramic powder is desirable to provide high chemical corrosion and erosion resistance, and thereby minimize particle generation during use as a component in a semiconductor processing chamber.

In contrast to other sintering techniques in the prior art, the ceramic powders employed in the process of the present disclosure do not require sintering aids. Thus, disclosed herein is a ceramic powder and/or a powder mixture which is free of, or substantially free of, sintering aids. Further, formation of a green body is not necessary thus the ceramic powders may not comprise organic binders or dispersants although they may be used if necessary. In embodiments, the ceramic powders in accordance with the method as disclosed herein may have specific surface areas (SSAs) of 18 $m^2/g$ and less, preferably from 1 to 18 $m^2/g$, typically lower than that of nanopowders, which may have SSAs of from 20 $m^2/g$ to more than 200 $m^2/g$. Use of nanopowders having SSAs in excess of 20 $m^2/g$ which may have greater moisture/humidity and adsorbed gas content may result in reduced packing density when forming the powder compact as disclosed herein, which may produce a sintered ceramic body having lower densities/higher porosities. Powders having SSAs of less than 1 $m^2/g$ may not result in full densification of the sintered ceramic body due to reduced driving force for sintering from the low powder specific surface area. All measurements of SSA were performed in accordance with as measured in accordance with ASTM C1274, "Standard Test Method for Advanced Ceramic Specific Surface Area by Physical Adsorption". In embodiments, the ceramic powders in accordance with the method as disclosed herein are substantially free of, or free of, nanopowders as defined herein.

Particle sizes of the powders were measured using a Horiba model LA-960 Laser Scattering Particle Size Distribution Analyzer capable of measuring particle size from 10 nm to 5 mm. Specific surface area for the ceramic powders were measured using a Horiba BET Surface Area Analyzer model SA-9601 capable of measuring across a specific surface area of 0.01 to 2000 $m^2/g$ with an accuracy of 10% and less for most samples.

Preferably, the d10 particle size of the ceramic powder used as a starting material in the SPS process disclosed herein may be from 0.05 to 7 μm, preferably from 0.05 to 6 μm, preferably from 0.05 to 5 μm, preferably from 0.05 to 4 μm, preferably from 0.05 to 3 μm, preferably from 0.05 to 1 um, preferably from 0.1 to 7 μm, preferably from 0.1 to 6 μm, preferably from 0.1 to 5 μm, preferably from 0.1 to 4 μm, preferably from 0.1 to 3 μm, preferably from 0.2 to 6 μm, preferably from 0.3 to 6 μm preferably from 0.4 to 6 μm, and more preferably from 0.3 to 4 μm.

Preferably, the median (d50) particle size of the ceramic powder used as a starting material in the SPS process disclosed herein may be from 0.15 to 100 μm, preferably from 0.15 to 75 μm, preferably from 0.15 to 50 μm, preferably from 0.15 to 25 μm, preferably from 0.15 to 10 μm, preferably from 0.15 to 5 μm, preferably from 0.15 to 3 μm, preferably from 0.8 to 80 μm, preferably from 0.8 to 60 μm, preferably from 0.8 to 40 μm, preferably from 0.8 to 30 μm, preferably from 0.8 to 20 μm, preferably from 0.8 to 10 μm, preferably from 0.8 to 5 μm, preferably from 1 to 100 μm, preferably from 1 to 75 μm, preferably from 1 to 60 μm, preferably from 1 to 45 μm, preferably from 1 to 30 μm, preferably from 1 to 20 μm, preferably from 1 to 10 μm, preferably from 1 to 5 μm, preferably from 10 to 100 μm, preferably from 20 to 100 μm, preferably from 40 to 100 μm, preferably from 10 to 40 μm, preferably from 20 to 40 μm preferably from 30 to 40 μm preferably from 3 to 10 μm, and preferably from 2 to 8 μm.

Preferably, the d90 particle size of the ceramic powder used as a starting material in the SPS process disclosed herein may be from 0.4 to 250 μm, preferably from 0.4 to 100 μm, preferably from 0.4 to 50 μm, preferably from 0.4 to 25 μm, preferably from 0.4 to 10 μm, preferably from 0.4 to 5 μm, preferably from 0.4 to 3 μm, preferably from 0.4 to 1 μm, preferably from 6 to 250 μm, preferably from 6 to 200 μm, preferably from 6 to 160 μm, preferably from 6 to 120 μm, preferably from 6 to 80 μm, preferably from 6 to 40 μm, preferably from 10 to 250 μm, preferably from 20 to 250 μm, preferably from 30 to 250 μm, preferably from 40 to 250 μm, preferably from 10 to 250 μm, preferably from 10 to 140 μm, preferably from 10 to 80 μm, preferably from 3 to 80 μm, and preferably from 10 to 40 μm.

Preferably, the ceramic powder used as a starting material in the SPS process disclosed herein may have a specific surface area of from 1 to 18 $m^2/g$, from 2 to 18 $m^2/g$, preferably from 3 to 18 $m^2/g$, preferably from 4 to 18 $m^2/g$, preferably from 5 to 18 m²/g, preferably from 6 to 18 m²/g, preferably from 1 to 16 m²/g, preferably from 2 to 16 m²/g, preferably from 4 to 16 m²/g, preferably from 6 to 16 m²/g, preferably from 1 to 14 m²/g, preferably from 1 to 12 m²/g, preferably from 1 to 10 m²/g, preferably from 1 to 8 m²/g, preferably from 2 to 12 m²/g, preferably from 2 to 10 m²/g, and preferably from 3 to 8 m²/g as measured according to ASTM C1274.

Preferably, the ceramic powder used as a starting material in the SPS process disclosed herein has a log normal particle size distribution, comprising a continuous distribution of particle sizes. Monomodal and bimodal particle size distributions may result in reduced powder packing density prior to sintering, and thereby reduced density and/or higher density variation across the sintered ceramic body.

Preferably, the ceramic powders used in the SPS process disclosed herein have a low amount of adsorbed gases and/or surface organics, moisture content, entrapped gases and the like. The powder may be optionally subjected to various processing steps such as tumbling, blending, calcining, sieving, etc. as necessary to minimize weight loss relative to total powder weight and thereby minimize porosity in the sintered ceramic body. Table 3 lists total average weight loss upon heating relative to total powder weight across two or more measurements of exemplary ceramic powders. In embodiments, the ceramic powder may have a weight loss relative to total powder weight of from 0.01 to 0.75%, preferably from 0.01 to 0.6%, preferably from 0.01 to 0.45%, preferably from 0.05 to 0.75%, preferably from 0.1 to 0.75%, preferably from 0.2 to 0.75%, preferably from 0.25 to 0.6%, as measured using a thermogravimetric analyzer model no. STA PT1600 by Linseis, Inc.

| Powder | Average Weight Loss (%) |
|---|---|
| alumina | 0.71 |
| alumina | 0.59 |
| alumina | 0.50 |
| alumina | 0.3 |
| alumina | 0.08 |
| aluminum nitride | 0.1 |
| erbium oxide | 0.3 |
| erbium oxide | 0.4 |
| yag | 0.4 |
| yag | 0.66 |
| yag | 0.22 |
| yag | 0.17 |
| yag | 0.07 |
| yag | 0.03 |
| yttria | 0.67 |
| yttria | 0.43 |
| yttria | 0.14 |
| yttria | 0.23 |
| yttria | 0.74 |
| zirconia | 0.7 |

In some embodiments, the ceramic powder may be processed in such a way as to remove unwanted moisture, organics or agglomeration. Such processing may include tumbling and/or sieving prior to and/or after its use in step a) of the process disclosed herein.

The ceramic powder may in certain embodiments comprise more than one of the aforementioned oxide, nitride and non-oxide ceramics and combinations thereof which may be mixed in a wet or dry condition in accordance with methods such as ball milling, attrition milling, high shear mixing, planetary milling, jet milling and other procedures as known to those skilled in the art. Powder processing techniques of calcination, drying, sieving, screening, tumbling, blending and similar may be used in accordance with methods as known in the art. For example, ball milling or end over end tumble mixing may be performed as known to those skilled in the art. When a high purity sintered ceramic body is desired, high purity (>99.99%) media may be used in order to preserve the purity of the starting powders during mixing. Wet ball milling or tumble mixing may be performed by suspending the starting powders in various solvents such as ethanol, methanol, and other alcohols, and/or water to form a slurry. The slurry may be formed having a powder loading during milling or mixing of from about 5 to about 50% by powder weight and media loadings of for example from 40 to 100% by powder weight.

In specific embodiments, the ceramic powder may be optionally calcined prior to use in the process of the present development. Exemplary calcination temperatures include temperatures of from about 600° C. to about 1,500° C., preferably from about 700° C. to about 1,500° C., preferably from about 800° C. to about 1,500° C., preferably from about 900° C. to about 1,500° C., preferably from about 1,000° C. to about 1,500° C., preferably from about 600° C. to about 1,300° C., preferably from about 700° C. to about 1,300° C., preferably from about 800° C. to about 1,300° C., preferably from about 900° C. to about 1,300° C., preferably from about 1,000° C. to about 1,300° C., preferably from about 600° C. to about 1,100° C., preferably from about 700° C. to about 1,100° C., preferably from about 800° C. to about 1,100° C., preferably from about 900° C. to about 1,100° C., preferably from about 1,000° C. to about 1,100° C., for a duration of from 4 to 12 hours, preferably from 4 to 8 hours, preferably from 4 to 6 hours preferably from 6 to 12 hours preferably from 8 to 12 hours, and preferably from 6 to 8 hours in an oxygen containing environment. Before and/or after calcination, the ceramic powder may be sieved and/or tumbled according to known methods. The starting ceramic powder/s as disclosed herein are preferably crystalline, and thereby have a long-range crystallographic order and identifiable peaks in x ray diffraction. In certain embodiments, the calcination conditions as disclosed herein may result in agglomeration of the powder mixture and thus greater variability in particle size distributions may result. Thus, in embodiments, the particle size as referred to herein may include a single particle and in other embodiments, the particle size as referred to herein may include an agglomerate comprising more than one particle or an agglomeration of multiple particles which may be measured, using the laser particle size detection methods as disclosed herein, as a single, large particle.

In some embodiments, although not required to achieve high density sintered ceramic bodies, sintering aids may be optionally used as desired and combined with the ceramic powder in accordance with the methods and materials as disclosed herein. In specific embodiments, the sintered ceramic bodies may comprise a sintering aid selected from the group consisting of silica, zirconia, calcia, magnesia, and combinations thereof. In certain embodiments, the sintered ceramic bodies may comprise a sintering aid optionally added in amounts of ≥0.002% by weight, preferably ≥0.0035% by weight, preferably ≥0.005% by weight, preferably ≥0.0075% by weight. In embodiments, the sintering aid may optionally be added in amounts of ≤0.05% by weight, preferably ≤0.03% by weight, preferably ≤0.02% by weight, preferably ≤0.01% by weight.

In other embodiments, dopants may be used as desired and combined with the ceramic powder in accordance with the methods and materials as disclosed herein. Dopants of for example a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of ≤0.05% by weight, preferably ≤0.03% by weight, preferably ≤0.01% by weight, preferably from 0.002 to 0.02% by weight may be optionally added into the starting ceramic powder/s at step a. In other embodiments, the aforementioned dopants may be added optionally in amounts of ≥0.002% by weight, preferably ≥0.0035% by weight, preferably ≥0.005% by weight, preferably ≥0.0075% by weight into the at least one ceramic powder of step a).

In further embodiments, both dopants and sintering aids may be optionally combined with the ceramic powder according to the method as disclosed.

In embodiments, sintering may be performed with an isothermal time of from 0.5 to 180 minutes, preferably from 0.5 to 120 minutes preferably from 0.5 to 100 minutes, preferably from 0.5 to 80 minutes, preferably from 0.5 to 60 minutes, preferably from 0.5 to 40 minutes, preferably from 0.5 to 20 minutes, preferably from 0.5 to 10 minutes, preferably from 0.5 to 5 minutes, preferably from 5 to 120 minutes, preferably from 10 to 120 minutes preferably from 20 to 120 minutes preferably from 40 to 120 minutes preferably from 60 to 120 minutes, preferably from 100 to 120 minutes, preferably from 30 to 60 minutes, preferably from 15 to 45 minutes, in other embodiments, sintering under isothermal dwell time may be applied for from 0 to 30 minutes; preferably from 0 to 20 minutes; preferably from 0 to 10 minutes; preferably from 0 to 5 minutes. In certain embodiments, sintering may be performed with an isothermal time of zero, or no isothermal hold time and upon reaching the sintering temperature, a cooling step as disclosed herein is initiated.

Process Step (b): Creating Vacuum Conditions Inside the Inner Volume;

Once the ceramic powder is loaded into the die, a pressure of from 5 to 20 MPa, preferably from 8 to 20 MPa, preferably from 10 to 20 MPa, and preferably from 5 to 10 MPa may be applied to the ceramic powder disposed inside an inner volume of the spark plasma sintering tool whereby the ceramic powder after application of pressure forms a powder compact which may have a packing density of from 20% to 60% by volume, from 20% to 50% by volume, preferably from 30% to 60% by volume, preferably from 30% to 55% by volume, preferably from 40% to 60% by volume, and preferably from 40% to 50% by volume. Higher packing densities are desirable to improve the thermal conductivity within the powder compact, thereby reducing differences in temperature across the powder compact during heating and sintering. The powder compact is formed from the ceramic powders disclosed herein without the use of organic additives such as dispersants, binders, deflocculants, etc. and therefore is free of, or substantially free of, organics. Thereafter, vacuum conditions as known to those skilled in the art are established within the chamber between the punches surrounded by the die. Typical vacuum conditions include pressures of $10^{-2}$ to $10^{-3}$ torr. The vacuum is applied primarily to remove air to protect the graphite material from burning and to remove a majority of the air from the powder.

Process Step (c) Moving at Least One of the Upper Punch and the Lower Punch to Apply Pressure to the Ceramic Powder While Heating the Ceramic Powder to a Sintering Temperature and Sintering the Ceramic Powder to Form the Sintered Ceramic Body; and Process Step (d) Lowering the Temperature of the Sintered Ceramic Body After the at least one ceramic powder is disposed in the die and a majority of air has been removed from the inner volume defined by the tool set and powder 5, pressure is applied to the ceramic powder disposed between the graphite punches by moving at least one of the upper punch and the lower punch toward the other in an axial direction. Pressure is applied to the at least one ceramic powder disposed inside the inner volume defined by the tool set across ranges of from 5 MPa to 60 MPa, preferably from 5 MPa to 40 MPa, preferably from 5 MPa to 20 MPa, preferably from 5 MPa to 15 MPa, preferably from 10 MPa to 60 MPa, preferably from 10 MPa to 40 MPa, preferably from 10 MPa to 30 MPa, preferably from 10 MPa to 20 MPa, preferably from 13 MPa to 18 MPa, preferably from 15 MPa to 60 MPa preferably from 15 MPa to 40 MPa, preferably from 15 MPa to 30 MPa, preferably from 20 to 40 MPa. The pressure is applied axially on the at least one ceramic powder.

In preferred embodiments, the ceramic powder is heated directly by the punches and die of the SPS apparatus. The die may be comprised of an electrically conductive material such as a number of graphite materials as disclosed herein, which facilitates resistive/joule heating. SPS apparatus and procedures are disclosed in, for example, US 2010/0156008 A1, which is herein incorporated by reference.

The application of heat to the ceramic powder provided in the die facilitates sintering temperatures of from 1000 to 1700° C., preferably from 1200 to 1700° C., preferably from 1400 to 1700° C., preferably from 1500 to 1700° C., more preferably from 1600 to 1700° C., preferably from 1400 to 1650° C., preferably from 1500 to 1650° C., preferably from 1400 to 1600° C., preferably from 1500 to 1600° C.

Figure 7:
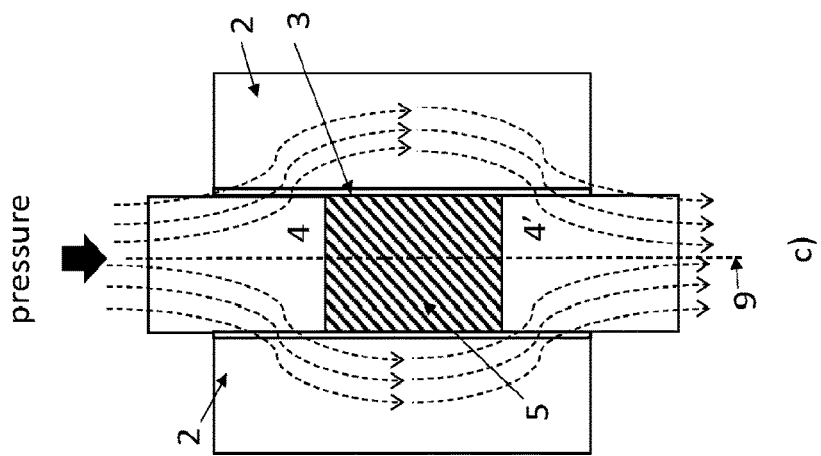
FIG. 7 is an illustration of the cross-sectional views of an SPS sintering apparatus where a), b) and c) illustrate sintering of different embodiments of exemplary ceramic powders having a resistivity from low to moderate to high, respectively.
Figure 7:
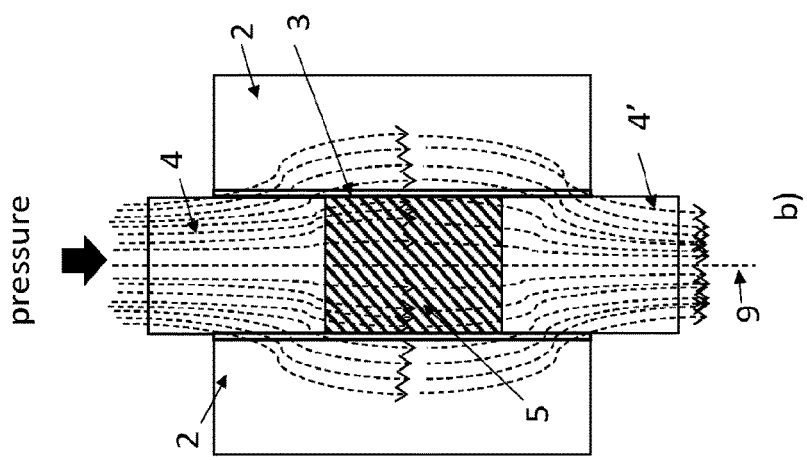
Figure 7:
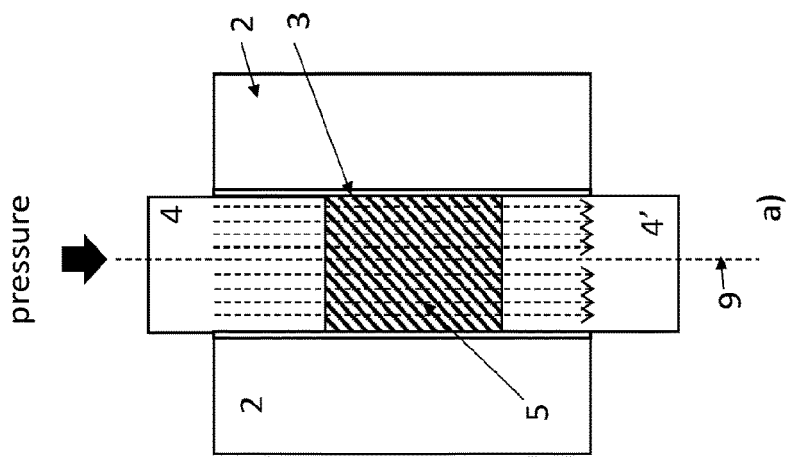

FIGS. 7A, 7B and 7C illustrate the effect of different kinds of ceramic powders on the current path and heating in a gap containing SPS apparatus as disclosed herein. In FIG. 7A), the ceramic powder 5 is a primarily conductive powder (e.g., a metal powder). Here, the powder resistivity is less than the graphite and the current runs directly through the powder rather than extending into the die 6 or die system 2, facilitating uniform sintering across the powder disposed between the punches 4 and 4'. Thus, for a metal ceramic powder 5, the dimension of the gap 3 is irrelevant to the current path and heating.

In FIG. 7B), the ceramic powder 5 is a partial conductor (e.g., the non-oxide ceramics and/or those mixed metal oxides which are partially conducting as disclosed herein having a resistivity of from about $1 \times 10^{-5}$ to $1 \times 10^{+10}$ for example), and the resistivity of these partial conductors may be greater than, on the order of, or less than that of the graphite and the current flows through both the powder and the graphite, dependent upon the resistivity of the powder. Therefore, the size of the gap 3 between the graphite die 6 (or the graphite die system 2) and the upper and lower punches 4 and 4' is preferably from 10 to 100 μm to assure adequate current flow and heating of the ceramic powder 5. The gap in accordance with FIG. 7B may in embodiments be maintained from ambient temperature to a specific sintering temperature for the partially conductive ceramic powder/s to be sintered, and up to and including a maximum temperature of the apparatus of about 2,000° C.

In FIG. 7C), the ceramic powder 5 is an insulator (e.g., the oxide ceramics, nitride ceramics and non-conductive mixed metal oxides as disclosed herein) and the current travels from the upper punch 4 only through the graphite die 6 (or the graphite die system 2) and into the lower punch 4' to sinter the ceramic powder 5. In this embodiment, as illustrated in FIG. 7C, no significant electrical current flows through the ceramic powder 5. The at least one ceramic powder 5 according to FIG. 7C) has a resistivity of greater than $1\times10^{+5}$ for example. A homogeneous temperature distribution, and thereby high and uniform density and low porosity, across the oxide ceramic powder during the sintering process is enabled by the gap distance of from 10 to 70 um. The gap in accordance with FIG. 7C is maintained from ambient temperature to a sintering temperature of the insulating ceramic powder/s to be sintered, and up to and including a maximum temperature of the apparatus of about 2,000° C.

Figure 8:
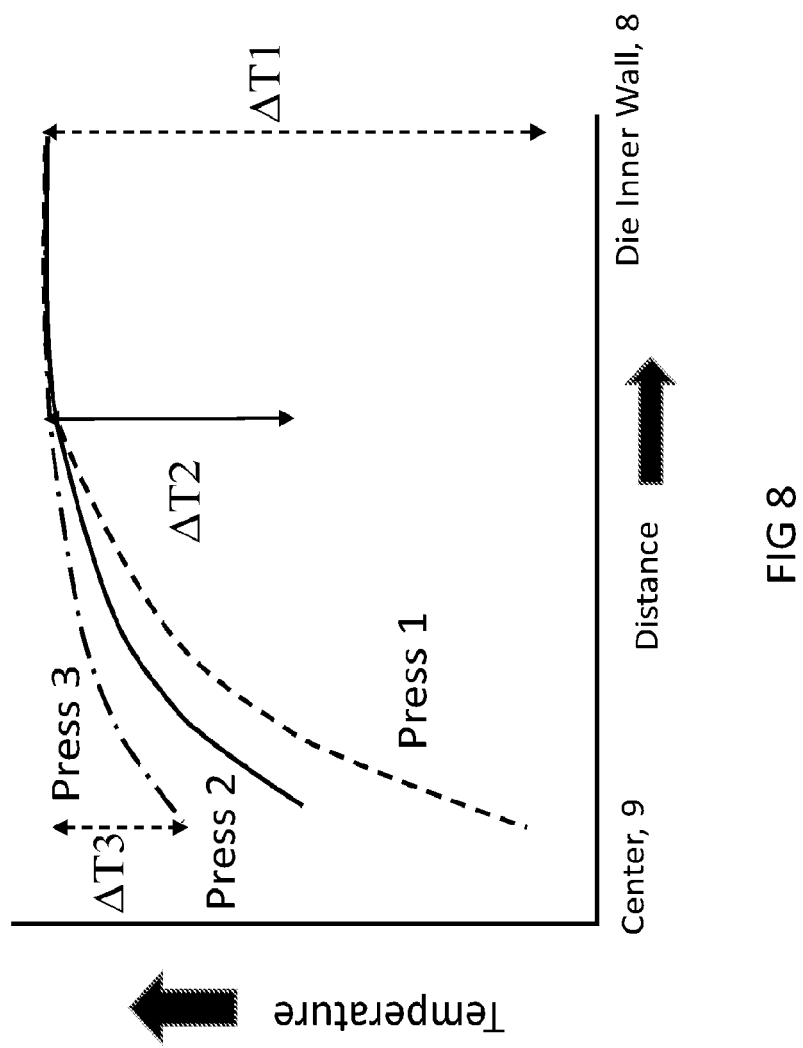
FIG. 8 is a schematic illustrating temperature variance during sintering in the SPS sintering apparatus of FIG. 1.

Referring to FIG. 8, shown is a difference in temperature across a distance between the inner wall 8 of the die system and a central axis 9 of the SPS tool 1. The temperature difference may be less than 100° C., from 1 to 100° C., preferably from 1 to 80° C., preferably from 1 to 60° C., preferably from 1 to 40° C., preferably from 1 to 20° C., preferably from 1 to 10° C., preferably from 5 to 100° C., preferably from 10 to 100° C., preferably from 20 to 100° C., preferably from 5 to 75° C., preferably from 5 to 50° C., and preferably from 5 to 25° C. whereby this temperature differential is thereby applied to the ceramic powder during heating and sintering to achieve a homogeneous temperature distribution across the ceramic powder during sintering. Uniformity in temperature across the powder 5 during sintering poses greater challenge as dimensions of the punches and die increase. Thus, uniformity in temperature disclosed at larger dimensions may be more easily achieved at smaller dimensions of the punches and die, thus small (i.e. 25° C. and less, for example) variations in temperature disclosed when sintering larger ceramic bodies may be assumed to vary to at least the same degree or less than that disclosed for smaller ceramic bodies.

The temperature gradient across a greatest dimension of the sintered ceramic body may also be represented by a normalized change in temperature across the greatest dimension. As such, in certain embodiments, a temperature difference across the at least one ceramic powder 5 disposed inside the inner volume defined by the tool set of the sintering apparatus during heating and sintering is from 0.15 to 5° C./cm, preferably from 0.15 to 3° C./cm, preferably from 0.15 to 2° C./cm, preferably from 0.15 to 1° C./cm, preferably from 0.15 to 0.5° C./cm, preferably from 0.4 to 5° C./cm, preferably from 0.4 to 3° C./cm, preferably from 0.4 to 1° C./cm, and preferably from 0.25 to 0.80° C./cm to achieve a homogeneous temperature distribution across the ceramic powder during sintering. The word "homogeneous" means that a material or system has substantially the same property at every point; it is uniform without irregularities. Thus, by "homogeneous temperature distribution" is meant that the temperature distribution is spatially uniform and does not have considerable gradients, i.e., a substantially uniform temperature exists regardless of position in a horizontal x-y plane along the ceramic powder 5. More specifically, by "homogeneous temperature distribution" is meant that the temperature distribution across the at least one ceramic powder 5 disposed inside the inner volume defined by the tool set of the sintering apparatus during heating and sintering is at most from 0.15 to 5° C./cm.

By use of the SPS tool set having the range of gap dimensions as disclosed herein whereby the gap is maintained throughout the method and in particular during the sintering step c) of the method as disclosed, resistive overheating is prevented and as a result this difference in temperature may be minimized such that density in the sintered ceramic body has minimal variation across the distance between an inner surface 8 of the die system and a central axis 9 defining a center. Uniform densification during sintering may result in density variations across a largest dimension of the sintered ceramic body as disclosed herein which are preferably less than 4%, less than 3%, preferably less than 2%, preferably less than 1%, more preferably less than 0.5%, preferably from 0.25 to 5%, preferably from 0.25 to 4%, preferably from 0.25 to 3%, preferably from 0.25 to 2%, preferably from 0.25 to 1%, preferably from 0.25 to 0.5%, preferably from 0.5 to 3.5%, and preferably from 1 to 3%, across a greatest dimension of a sintered ceramic body.

Further contributing to uniform densification during sintering is a high packing density to between 30 and 60% by volume of the powder compact comprising the ceramic powder as disclosed herein prior to sintering, which may be achieved using the ceramic powders and method as disclosed.

The temperature of the sintering apparatus according to the present disclosure is measured typically within the die comprising at least one graphite material of the sintering apparatus. Thus, it is preferred that the temperature is measured as close as possible to the ceramic powder being sintered so that the indicated temperatures are indeed realized within the ceramic powder.

The order of application of pressure and temperature in one embodiment may vary according to the present disclosure, which means that it is possible to apply at first the indicated pressure and thereafter to apply heat to achieve the desired temperature. Moreover, in other embodiments it is also possible to apply at first the indicated heat to achieve the desired temperature and thereafter the indicated pressure. In a third embodiment according to the present disclosure, the temperature and the pressure may be applied simultaneously to the ceramic powder to be sintered and raised until the indicated values are reached.

Inductive or radiant heating methods may also be used for heating the sintering apparatus and indirectly heating the ceramic powder in the tool set.

In contrast to other sintering techniques, preparation of the powder prior to sintering, i.e., by cold pressing or forming a green body using organic additives such as binders, dispersants and the like before sintering is not necessary, and the powder is filled directly inside the inner volume of the spark plasma sintering tool to form a powder compact without the use of the aforementioned organic additives. This reduced handling may provide for higher purity in the final, sintered ceramic body.

In accordance with aspects of process step c), the temperature and pressure are maintained for a time period of 1 min to 360 min, preferably from 1 to 240 minutes, preferably from 1 to 120 minutes, preferably from 1 to 60 minutes, preferably from 5 to 360 minutes, preferably from 10 to 360 minutes, preferably from 30 to 360 minutes, preferably from 45 to 360 minutes, preferably from 60 to 360 minutes, preferably from 60 to 90 minutes to perform sintering. At the end of step c) of the sintering process, the ceramic powder sintered to form a sintered ceramic body is preferably cooled (step d) in accordance with a natural convection of the process chamber (unforced cooling) until a temperature is reached which may facilitate the optional annealing process of step e). In a further embodiment, the now-sintered ceramic body may be cooled under convection with inert gas, for example, at 1 bar of argon or nitrogen. Other gas pressures of greater than or less than 1 bar may also be used. To initiate the cooling step, the power applied to the SPS apparatus may be removed. The pressure applied to the sintered sample is removed at the end of the sintering process before (natural) cooling occurs.

A volume reduction of about 30% upon sintering the powder to form the sintered ceramic body may occur, dependent upon the packing density of the ceramic powder 5 prior to the sintering step.

Step (e)—in an Optional Step, Annealing the Sintered Ceramic Body by Applying Heat to Raise the Temperature of the Sintered Ceramic Body to Reach an Annealing Temperature, and Performing Annealing; and Process Step (f) Lowering the Temperature of the Sintered Ceramic Body to an Ambient Temperature by Removing the Heat Source Applied to the Sintering Apparatus Sintered Ceramic Body, and Removing the Sintered Ceramic Body:

In optional step (e), the resulting sintered ceramic body of step d) is subjected to an annealing process. Annealing may be performed in a furnace external to the sintering apparatus, or within the sintering apparatus itself, without removal of the sintered ceramic body from the apparatus. For example, in one embodiment the sintered ceramic body may be removed from the sintering apparatus after cooling in accordance with process step (d), and the process step of annealing may be conducted in a separate apparatus such as a furnace. In other embodiments, for the purpose of annealing in accordance with this disclosure, the ceramic body being formed in step (c) may subsequently be annealed while inside the sintering apparatus, without the requirement of removal from the sintering apparatus between the sintering step (c) and optional annealing step (e).

Annealing leads to a refinement of the chemical and physical properties of the sintered ceramic body. The step of annealing can be performed by conventional methods used for the annealing of glass, ceramics and metals, and the degree of refinement can be selected by the choice of annealing temperature and the duration of time that annealing is allowed to continue.

The optional annealing step (e) can be carried out at a temperature of from 1200 to 1800° C., preferably from 1250 to 1700° C., and more preferably from 1300 to 1650° C. At such temperatures, oxygen vacancies in the crystal structure may be corrected back to stochiometric ratios.

The step of annealing the sintered ceramic body may be completed in from 5 minutes to 24 hours, preferably from 20 minutes to 20 hours, preferably from 60 minutes to 16 hours, preferably from 4 to 12 hours, preferably from 6 to 10 hours.

The optional annealing process step (e) is preferably carried out in an oxidizing atmosphere in air.

After the optional process step (e) of annealing the sintered ceramic body is performed, the temperature of the annealed sintered ceramic body is decreased to an ambient temperature in accordance with process step (f) lowering the temperature of the sintered and annealed ceramic body to an ambient temperature. The sintered and in certain embodiments annealed ceramic body thus produced is highly dense and typically has an average grain size of from 0.25 μm to 18 μm, preferably of from 0.25 to 13 μm preferably of from 0.25 to 10 μm, preferably of from 0.25 to 8 μm, preferably of from 0.25 to 5 μm, preferably of from 0.5 to 18 μm, preferably of from 0.75 to 18 μm, preferably of from 1 to 18 μm, preferably of from 2 to 18 μm, preferably of from 5 to 18 μm, preferably of from 0.5 to 10 μm, preferably of from 0.75 to 8 μm, preferably of from 0.75 to 5 μm.

In embodiments, the sintered (and in certain embodiments annealed) ceramic body according to the present disclosure may comprise a non-conductive, metal oxide, nitride or mixed metal oxide, formed from the ceramic powders having the properties as disclosed herein.

In alternate embodiments, the sintered (and in certain embodiments annealed) ceramic body according to the present disclosure may comprise a sintered ceramic body formed from a mixed metal oxide, such as forsterite, steatite, cordierite, mullite, barium titanate, lead titanate, lead zirconate titanate, Mn—Zn ferrite, Ni—Zn ferrite and sialon, and mixtures thereof, having the properties as disclosed herein. Mixed metal oxides as disclosed herein may be conducting or insulating and formed according to the specific gap width, apparatus and methods as disclosed.

The SPS process according to one embodiment and described above is suitable for use in the preparation of large sintered ceramic bodies having a greatest dimension of 100 mm and greater. The process as disclosed provides for rapid powder consolidation and densification, retaining a small (on the order of less than 15 um) average grain size in the sintered body, in some embodiments transferred from the particle size of the starting ceramic powders, and achieving high densities in excess of 98% of theoretical density of a specific material with a density variation across a greatest dimension of <4%. This combination of fine grain size, uniform and high density provides for a high strength sintered ceramic body of large dimension suitable for machining, handling and use as a component in a semiconductor processing chamber. As such, according to certain embodiments, the sintered (and in certain embodiments annealed) ceramic body according to the present disclosure may comprise a metal oxide, metal nitride, metal carbide, metal boride, or a mixed metal oxide having a diameter of more than 100 mm having the properties as disclosed herein.

For example, in an embodiment, the sintered (and in certain embodiments annealed) ceramic body may be formed from the powders as disclosed herein in a disk shape having a dimension from 40 mm to about 625 mm in size and across a range of thicknesses, from about 3 mm to about 60 mm, preferably from 5 to 50 mm in thickness. In another embodiment, the sintered (and in certain embodiments annealed) ceramic body may be formed in a disk shape having a diameter from 100 mm to about 625 mm in diameter. In an alternate embodiment, the sintered (and in certain embodiments annealed) ceramic body may be formed having a greatest dimension from 100 mm to 406 mm. In other embodiments, the sintered (and in certain embodiments annealed) ceramic body has a size of from 200 mm to about 625 mm, preferably from 300 to about 625 mm, preferably from 350 to about 625 mm, preferably from 400 to about 625 mm, more preferably from 450 to about 625 mm, more preferably from 500 to about 625 mm, more preferably 550 to about 625 mm, each with regard to a greatest dimension of the sintered ceramic body.

Finally, the sintered ceramic body may be machined to form, for example, a final sintered component for use in a plasma processing chamber such as, for example, a dielectric window or RF window, a focus ring, a nozzle or a gas injector, a shower head, a gas distribution plate, an etch chamber liner, a plasma source adapter, a gas inlet adapter, a diffuser, an electronic wafer chuck, a chuck, a puck, a mixing manifold, an ion suppressor element, a faceplate, an isolator, a spacer, and a protective ring. Machining of the sintered ceramic body (or sintered and annealed) to create a sintered component may be carried out according to methods known to those skilled in the art.

The method as disclosed herein provides for a high density and related low porosity, minimal density variation, high purity, high mechanical strength and thereby handleability of a sintered ceramic body/component, in particular, for those bodies of dimensions greater than, for example, from 100 to about 625 mm across a maximum dimension.

All features disclosed with respect to the process/method also apply to the product of a sintered ceramic body as disclosed herein.

Description of the Resulting Sintered Ceramic Bodies:

The specific ceramic bodies prepared according to the process disclosed above have an improved breakage resistance by way of high density and minimal density variation, high mechanical strength, and, in addition, having higher purity and improved etch resistance. In the following separate embodiments of the improved ceramic bodies prepared according to the method as disclosed herein are described. All features disclosed with respect to the product of a sintered ceramic body also apply to the process/method as disclosed herein.

Density measurements were performed according to ASTM B962-17. Density values and standard deviations reported herein are for an average across 5 measurements. The relative density (RD) for a given material is defined as the ratio of the measured density of the sample to the reported theoretical density for the same material, as shown in the following equation. Volumetric porosity (Vp) is calculated from density measurements as follows:

$$RD = \frac{\rho \text{sample}}{\rho \text{theoretical}} = 1 - Vp$$

where $\rho$ sample is the measured (Archimedes) density according to ASTM B962-17, $\rho$ theoretical is the reported theoretical density, and RD is the relative fractional density. Using this calculation, volumetric porosity levels by percent of from 0.1 and 4% and less were calculated from measured density values for the sintered ceramic bodies as disclosed herein. Along with high bulk or overall density, variation in density also may improve handleability at large dimensions. Table 4 discloses theoretical density (as disclosed according to available literature), density, % of theoretical density, % volumetric porosity and dimensions for a number of exemplary sintered ceramic bodies comprising oxide and nitride ceramics as disclosed herein. For reference, YAG as known to those skilled in the art comprises yttrium aluminum garnet structure of composition $Y_3Al_5O_{12}$, ZTA comprises zirconia toughened alumina, and spinel comprises magnesium aluminate spinel, $MgAl_2O_4$. A theoretical density greater than 97% of theoretical density for the respective materials was achieved for all materials, made with the sintering apparatus/tool set as disclosed herein having a gap for insulator materials of from 10 to 70 um, as listed in Tables 4 and 5. The very high theoretical density for zirconia may be impacted by the presence of hafnia, which is common to powders of zirconium oxide and may increase overall density.

TABLE 4

| material | theoretical density (g/cc) | average measured density (g/cc) | % theoretical density | % volumetric porosity | Max Size (mm) |
|---|---|---|---|---|---|
| yttria | 5.03 | 4.989 | 99.18 | 0.82 | 406 |
| alumina | 3.987 | 3.957 | 99.25 | 0.75 | 572 |
| YAG | 4.556 | 4.493 | 98.62 | 1.38 | 572 |
| YAG | 4.556 | 4.546 | 99.78 | 0.22 | 622 |
| AlN | 3.27 | 3.266 | 99.88 | 0.12 | 406 |
| spinel | 3.579 | 3.528 | 98.58 | 1.42 | 100 |
| cordierite | 2.66 | 2.62 | 98.50 | 1.50 | 100 |
| mullite | 3.776 | 3.776 | 99.99 | 0.01 | 150 |
| LaAlO$_3$ | 6.52 | 6.350 | 97.39 | 2.61 | 100 |
| ZTA | 4.3 | 4.226 | 98.28 | 1.72 | 150 |
| Zirconia | 6.1 | 6.13 | 100 | ~0 | 100 |
| Er$_2$O$_3$ | 8.49 | 8.64 | 98.3 | 1.70 | 100 |

The density variation was measured from samples taken across the greatest dimension, and thereafter the variation was calculated relative to the highest density measured.

Table 5 lists dimensions, average density, percent theoretical density (TD), % volumetric porosity, density variation in % and % variation per cm for exemplary sintered ceramic bodies according to embodiments as disclosed herein.

TABLE 5

| Material | Sample | Size (cm) | Ave D (g/cc) | % TD | % porosity | % density variation | % variation per cm |
|---|---|---|---|---|---|---|---|
| ALUMINA | 352 | 57.2 | 3.960 | 99.322 | 0.678 | 0.670 | 0.012 |
| YAG | 519 | 10 | 4.534 | 99.517 | 0.483 | <0.5% | 0.05 |
| YAG | 531 | 10 | 4.552 | 99.912 | 0.088 | <0.5% | 0.05 |
| YAG | 514 | 10 | 4.549 | 99.846 | 0.154 | <0.5% | 0.05 |
| YAG | 172 | 15 | 4.553 | 99.930 | 0.070 | <0.5% | 0.03 |
| YAG | 6 | 15 | 4.545 | 99.766 | 0.234 | <0.5% | 0.03 |
| YAG | 258 | 40.6 | 4.542 | 99.687 | 0.313 | 0.410 | 0.010 |
| YAG | 164 | 40.6 | 4.467 | 98.050 | 1.950 | 2.061 | 0.051 |
| YTTRIA | 314 | 40.6 | 4.935 | 98.115 | 1.885 | 1.441 | 0.035 |
| YTTRIA | 414 | 40.6 | 4.988 | 99.165 | 0.835 | 0.548 | 0.014 |
| YTTRIA | 447 | 40.6 | 5.000 | 99.397 | 0.603 | 1.100 | 0.027 |
| YTTRIA | 457 | 40.6 | 4.985 | 99.104 | 0.896 | 0.130 | 0.003 |
| YAG | 191 | 40.6 | 4.464 | 97.971 | 2.029 | 0.120 | 0.003 |
| YAG | 506 | 62.2 | 4.546 | 99.783 | 0.217 | 0.208 | 0.003 |

Figure 15:
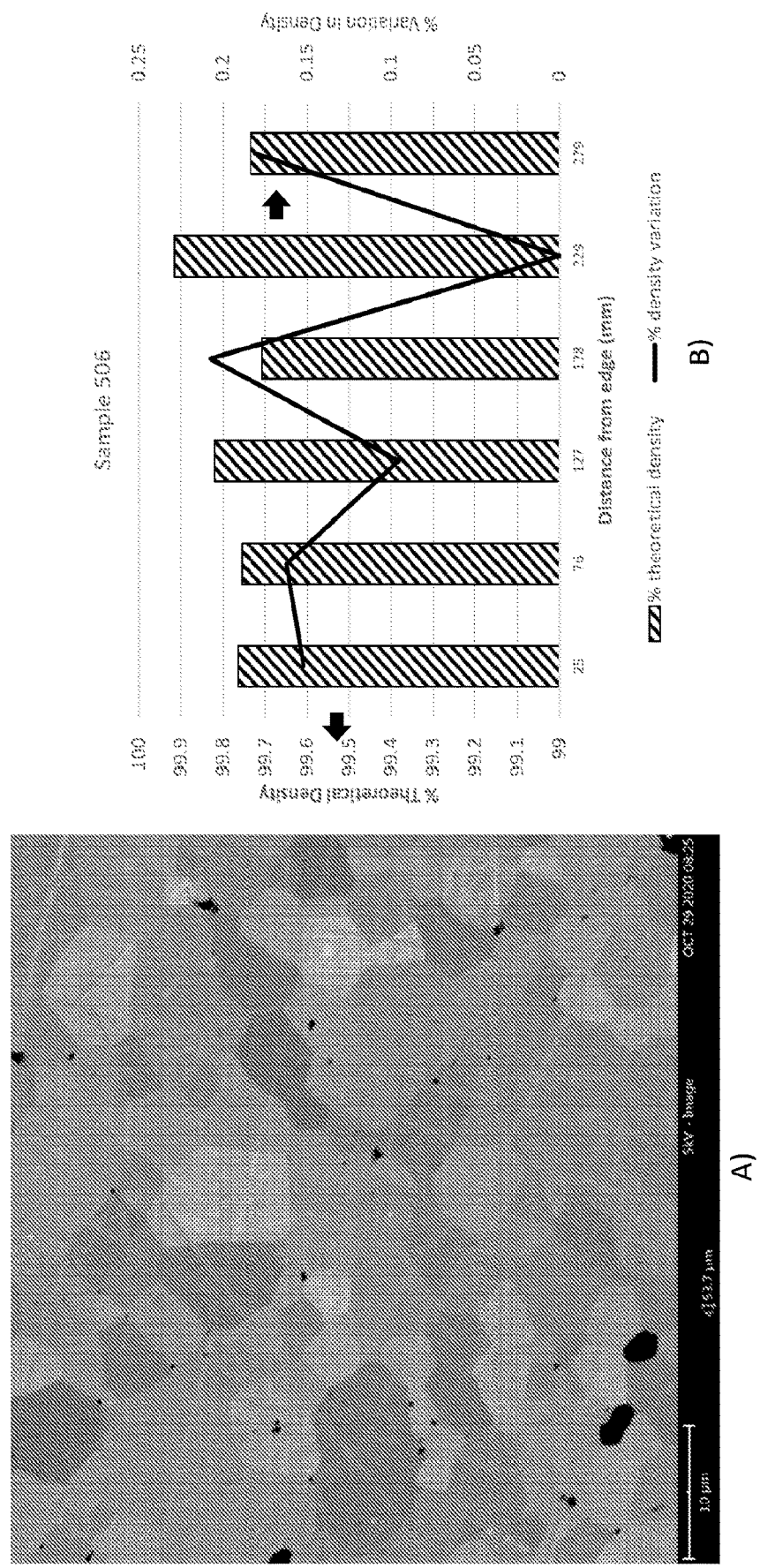
FIG. 15 a) illustrates an SEM micrograph at 5000× and b) illustrates % of theoretical density of YAG and density variation across a greatest dimension for a sintered ceramic body according to sample 506 of the Examples.

Sample 506 comprising YAG is depicted in FIGS. 15A and 15B. FIG. 15A illustrates a highly dense microstructure in the SEM micrograph at 5000× and b) illustrates % of theoretical density of YAG and density variation across a greatest dimension for a sintered ceramic body according to example 506 as disclosed herein. The 5000× SEM image of FIG. 15A was analyzed for grain size measurements using the Heyn Line Intercept Method as known to those skilled in the art, and an average grain size of 6.2 um with a standard deviation of 0.71 um was measured across 25 repetitions. A maximum and minimum grain size of 7.7 um and 5.0 um respectively, were also measured for sample 506. Hardness measurements were performed in accordance with ASTM Standard C1327, and an average hardness of about 14.8 GPa was measured, wherein the average hardness is calculated from 8 measurements or repetitions across a sample surface, with maximum and minimum hardness values of 16 and 12.7 GPa respectively, using an applied load of 0.025 kgf.

Density measurements were performed in accordance with ASTM B962-17 from samples cut across a radius of the sample and the density results are illustrated in FIG. 15B. Five measurements each were taken at 6 locations along the radius, and an average density of 4.546 g/cc was measured, corresponding to 99.783% of theoretical for YAG, and volumetric porosity of 0.217%. Densities across the radius were from 99.7 to 99.9% of theoretical for YAG. The variation in density as depicted in FIG. 25B was measured relative to the highest density measurement along the radius, and a maximum variation in density of 0.208% was measured.

By contrast, sintered ceramic bodies made from non-conducting, oxide ceramics using a sintering apparatus having a gap size of greater than about 90 um resulted in theoretical densities of between 95 to less than 97% and density variations of 4.5% and greater for a non-conducting, oxide ceramic in accordance with Table 6. Sintered ceramic bodies prepared in accordance with Table 6 often resulted in lower and non-uniform density and resulted in breakage, in particular at large body sizes of for example 150 mm and greater.

TABLE 6

| Material | Sample | Size (cm) | Ave D (g/cc) | % TD | % volumetric porosity | % density variation | % variation per cm |
|---|---|---|---|---|---|---|---|
| YTTRIA | 269 | 40.6 | 4.90 | 97.49 | 2.51 | 2.75-3 | 0.07 |
| YTTRIA | 387 | 40.6 | 4.89 | 97.22 | 2.78 | 2.75-3 | 0.07 |
| YTTRIA | 209 | 40.6 | 4.78 | 95.03 | 4.97 | 4-4.5 | 0.11 |

Electrical resistivity was measured for the sintered ceramic bodies formed from the method and apparatus having a gap width of from 10 to 70 um. Table 7 lists electrical resistivity measurements for exemplary sintered ceramic bodies. The process and materials resulted in sintered ceramic bodies having high electrical resistivity, and correspondingly low conductivity.

TABLE 7

| | Resistivity (ohm-cm) | | |
|---|---|---|---|
| material | 20° C. | 300° C. | 500° C. |
| alumina | 5.00E+14 | 1.00E+13 | 3.60E+10 |
| yttria | 1.90E+14 | 2.30E+13 | 8.90E+09 |
| yag | 5.20E+13 | 3.70E+12 | 8.30E+09 |

Providing sintered ceramic bodies low in dielectric loss becomes important at increasing frequencies. The high total purity of the sintered ceramic bodies as disclosed herein in Tables 6 and 7, and in particular those bodies having low silica content, provides preferred results of dielectric constant and dielectric loss or dissipation factor as disclosed in Table 8 for a sintered ceramic body comprising yttrium oxide. In addition, dielectric loss may be affected by grain size and grain size distribution. Fine grain size also may provide reduced dielectric loss, and thereby reduced heating upon use at higher frequencies. Dielectric losses on the order of from $1\times10^{-4}$ to $5\times10^{-2}$, preferably from $1\times10^{-4}$ to $1\times10^{-2}$, more preferably from $1\times10^{-4}$ to $1\times10^{-3}$ may be achieved for the sintered ceramic body comprising high purity yttrium oxide. Yttrium oxide sample 157 had an average dielectric constant of 11.3 and average dielectric loss of $3.6\times10^{-2}$ across 4 measurements as listed in Table 8.

TABLE 8

| | Dielectric Results | |
|---|---|---|
| | 1 MHz | |
| Sample | dielectric constant | dissipation factor |
| 157-1 | 11.2 | 0.048 |
| 157-2 | 11.3 | 0.054 |
| 157-3 | 11.26 | 0.025 |
| 157-4 | 11.4 | 0.018 |

Figure 9:
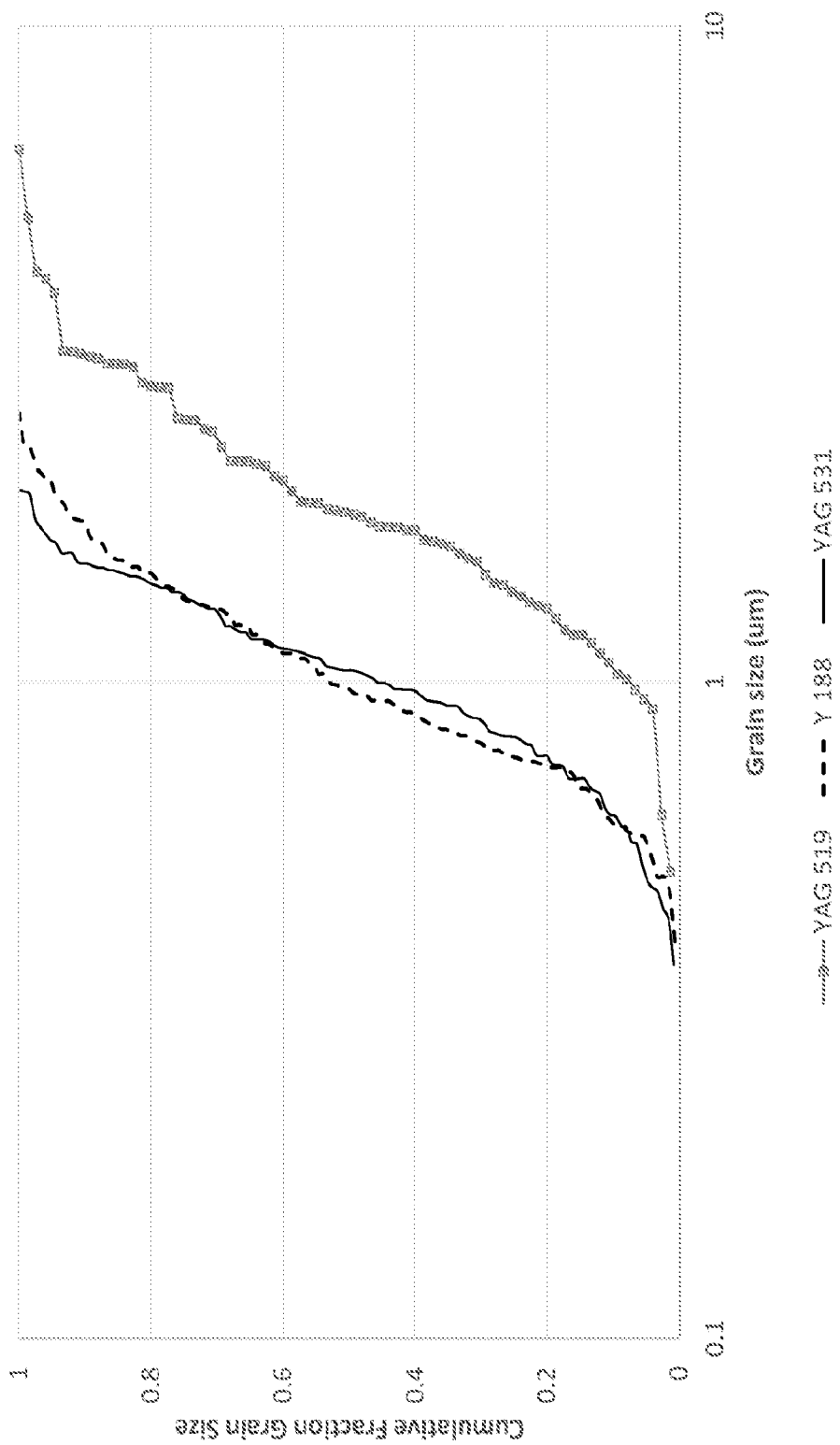
FIG. 9 depicts grain size measurements for sintered ceramic bodies of YAG and yttrium oxide made in accordance with the apparatus, materials and methods as disclosed herein.

In preferred embodiments, high mechanical strengths may be realized through control of grain size in the sintered ceramic body, whereby finer grain sizes provide higher flexural strengths. FIG. 8 illustrates exemplary grain sizes and grain size distributions for YAG (yttrium aluminum garnet) and Yttrium oxide sintered ceramics as disclosed herein. Table 9 lists grain size features for the sintered ceramic bodies of FIG. 9.

TABLE 9

| Material | Sample | Grain Size d10, um | Grain Size d50, um | Grain Size d90, um | Grain Size d100, um | Grain Size Min (um) |
|---|---|---|---|---|---|---|
| YTTRIA | 188 | 0.7 | 1 | 1.8 | 2.6 | N/A |
| YAG | 519 | 1.1 | 1.8 | 3.1 | 7 | 0.5 |
| YAG | 531 | 0.6 | 1 | 1.5 | 2 | 0.4 |

Correspondingly, Table 10 lists 4-point flexural strength results for exemplary sintered ceramic bodies as disclosed. Measurements were performed in accordance with ASTM C1161-18 where n is the number of tests performed. High strengths were measured for those materials comprising sintered ceramic bodies as disclosed.

TABLE 10

| Material | Average (MPa) | St Dev | Max (MPa) | Min (MPa) | n |
|---|---|---|---|---|---|
| ZTA | 576 | 88 | 808 | 347 | 30 |
| AlN | 381 | 55 | 484 | 276 | 30 |
| YAG | 253 | 26 | 296 | 180 | 40 |
| Alumina | 402 | 31 | N/A | N/A | 10 |
| Yttria | 219 | 22 | N/A | N/A | 36 |

The sintered ceramic body and related components as disclosed herein provide improved plasma resistance and enhanced ability to be cleaned within semiconductor processing chambers by way of specific material properties and features to be described following.

Application of the Sintered Ceramic Body:

The sintered ceramic bodies thus prepared may be used in semiconductor plasma processing apparatuses for plasma etching, deposition and similar processes.

Most integrated circuit (IC) manufacturing processes typically include a number of manufacturing steps that can sequentially form, shape or otherwise modify various layers. One way of forming a layer can be to deposit and then etch the layer. Usually, etching can include forming an etch mask over an underlying layer. An etch mask may have a particular pattern that can mask certain portions of an underlying layer while exposing other portions. Etching can then remove portions of an underlying layer exposed by an etch mask. In this way, an etch mask pattern may be transfect to an underlying layer.

Etching may include "wet" chemical etching and "dry" plasma etching. In many cases, plasma etching can provide greater controllability and greater directional control (e.g., anisotropy) if desired.

Thus, plasma etching is currently used to process semiconducting materials for their use in the fabrication of electronics. Small features can be etched into the surface of the semiconducting material in order to be more efficient or enhance certain properties when used in electronic devices. For example, plasma etching can be used to create deep trenches on the surface of silicon for uses in microelectromechanical systems. This application suggests that plasma etching also has the potential to play a major role in the production of microelectronics. Similarly, research is currently being done on how the process can be adjusted to the nanometer scale.

Plasma etching is carried out usually in so-called plasma etch chambers which are commonly used to etch one or more layers formed on a semiconductor substrate. During etching, the substrate is supported on a substrate support within the chamber.

During plasma etching, plasma is formed above the surface of the substrate by supplying radiofrequency (RF) electromagnetic radiation to a low-pressure gas (or gas mixture). By adjusting the electrical potential of the substrate, charged species in the plasma can be directed to impinge upon the surface of the substrate and thereby remove material (e.g., atoms) therefrom.

Plasma etching can be made more effective by using gases that are chemically reactive with the material to be etched. So called "reactive ion etching" combines the energetic impinging effects of the plasma with the chemical etching effects of a reactive gas.

The sintered ceramic body according to the present disclosure may be formed into chamber components for use in semiconductor plasma processing chambers. Such components may have benefits that include extended component lifetime in aggressive etch conditions. Such ceramics may be made dense and pure by sintering with the above-described SPS process, in particular at large dimension. The high-density ceramics may have many advantages in the context of plasma processing. These include resistance to particle generation, improved plasma etch resistance, and increased component lifetime. In addition, cleaning of the high density sintered ceramic parts may be easier, because it may be possible to use aggressive cleaning methods such as highly corrosive or aggressive chemicals.

Examples of chamber components that may include the sintered ceramic bodies according to the present disclosure include a substrate support assembly, an electrostatic chuck (ESC), a ring (e.g., a process kit ring or single ring), a chamber wall, a base, a gas distribution plate, a shower head, a liner, a liner kit, a shield, a plasma screen, a flow equalizer, a cooling base, a chamber viewport, a chamber lid, and so on.

Figure 10:
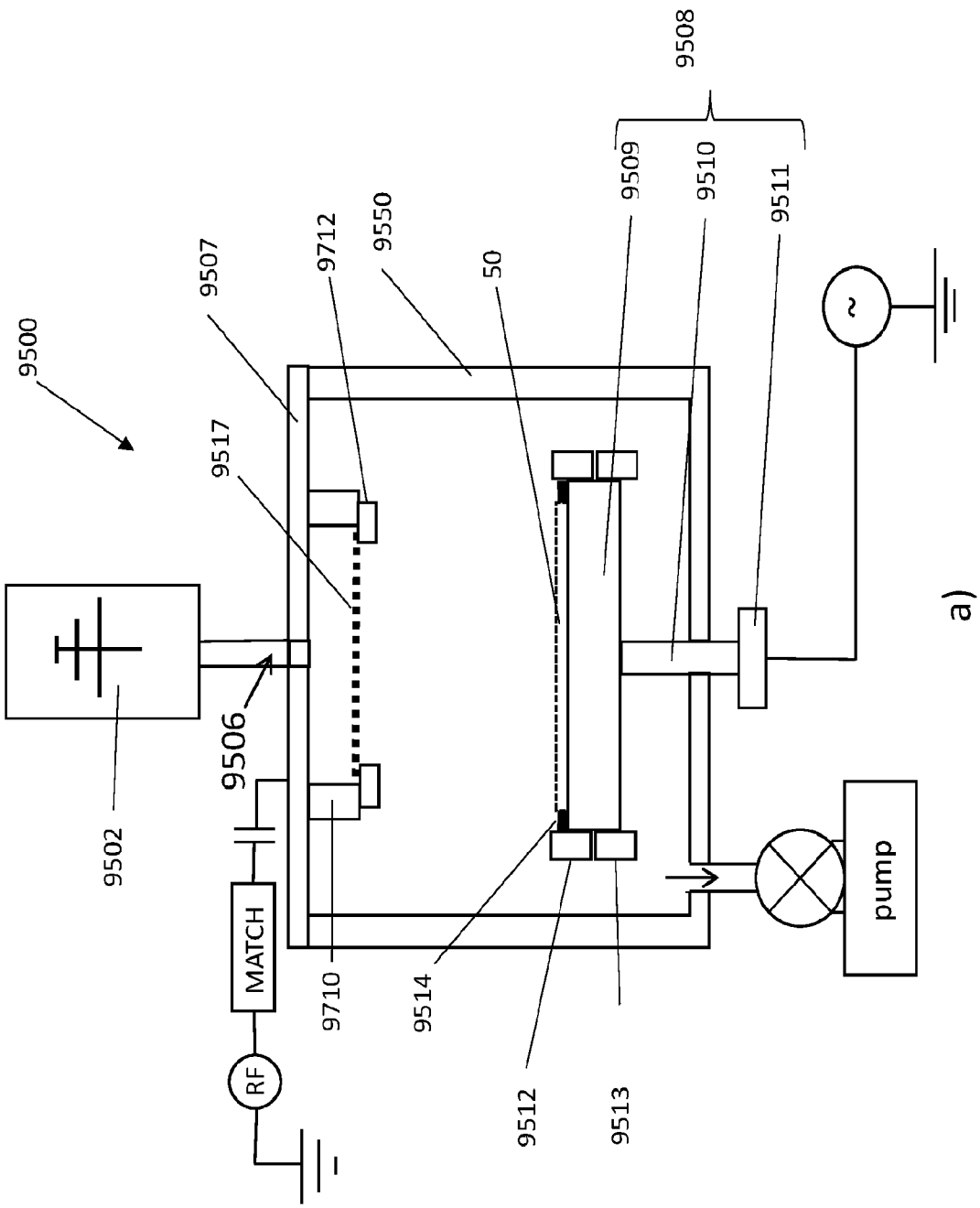
FIG. 10 is a schematic depicting an example of a plasma etch processing system.

As shown in FIG. 10, embodiments of the technology as disclosed herein may be useful as components in a plasma processing system 9500, which may be configured for use in semiconductor etching processes, also denoted as "plasma etch processing system". Plasma etch processing system 9500 may in embodiments include a remote plasma region. The remote plasma region may include a remote RF source/matching network 9502, which is also denoted as remote plasma source ("RPS").

Plasma etch processing system 9500 may comprise a vacuum chamber 9550 having a corrosion resistant chamber liner (not shown), a vacuum source, and a chuck or electrostatic chuck ("ESC") 9509 on which a wafer 50, also denoted as substrate, is supported. A cover ring or electrode cover 9514, a top shield ring 9512 and shield ring 9513 surrounds the wafer 50 and puck 9509. In physical vapor deposition (PVD) processes, a substrate ring comprising a cover ring 9514 is provided about the periphery of the substrate. The cover ring 9514 shields the sidewall surfaces and peripheral edge of the puck that would otherwise be exposed to the energized gas in the chamber, from deposition of process residues. Thus, the cover ring 9514 reduces the accumulation of process residues on the puck 9509, which would eventually flake off and contaminate the substrate. The cover ring can also reduce erosion of the puck 9509 by the energized gas. Providing a cover ring 9514 also lowers the frequency with which the chuck and/or the puck 9509 requires cleaning, because cover ring itself can be periodically removed from the chamber and cleaned, for example, with HF and $HNO_3$, to remove process residues that accumulate on the ring during substrate process cycles. The arrangement of a cover ring 9514 can be seen in FIG. 10, where it covers parts of the supporting surface of the puck 9509. Further parts of the surface of the puck 9509 may be covered with a top shield ring 9512 and/or a shield ring 9513. A top plate/window/lid 9507 forms an upper wall of the vacuum chamber 9550. A showerhead 9517 forms an upper wall or is mounted beneath an upper wall of the vacuum chamber 9650. Top plate/window/lid 9507, gas distribution system 9506, showerhead 9517, cover ring or electrode cover 9514, top shield ring 9512, shield ring 9513, chamber liner (not shown), and chuck or ESC 9508 and puck 9509 may be made entirely or partially from embodiments of the sintered ceramic body as disclosed herein.

Parts of the surface of the showerhead 9517 may be covered with a shield ring 9712. Parts of the surface of the showerhead 9517, especially radial sides of the surface of the showerhead 9517 may be covered with a top shield ring 9710. Shield ring 9712, showerhead 9517 and top shield ring 9710 may be made entirely or partially from embodiments of the sintered ceramic body as disclosed herein.

The remote plasma source 9502 is provided outside of the window 9507 of the chamber 9550 for accommodating the wafer 50 to be processed. The remote plasma region may be in fluid communication with the vacuum chamber 9550 through a gas delivery system 9506. In the chamber 9550, a reactive plasma may be generated by supplying a processing gas to the chamber 9550 and a high frequency power to the plasma source 9502. By using the reactive plasma thus generated, a predetermined plasma processing is performed on the wafer 50. A planar antenna having a predetermined pattern is widely used for the high frequency antenna of the plasma etch processing system 9500.

Figure 11:
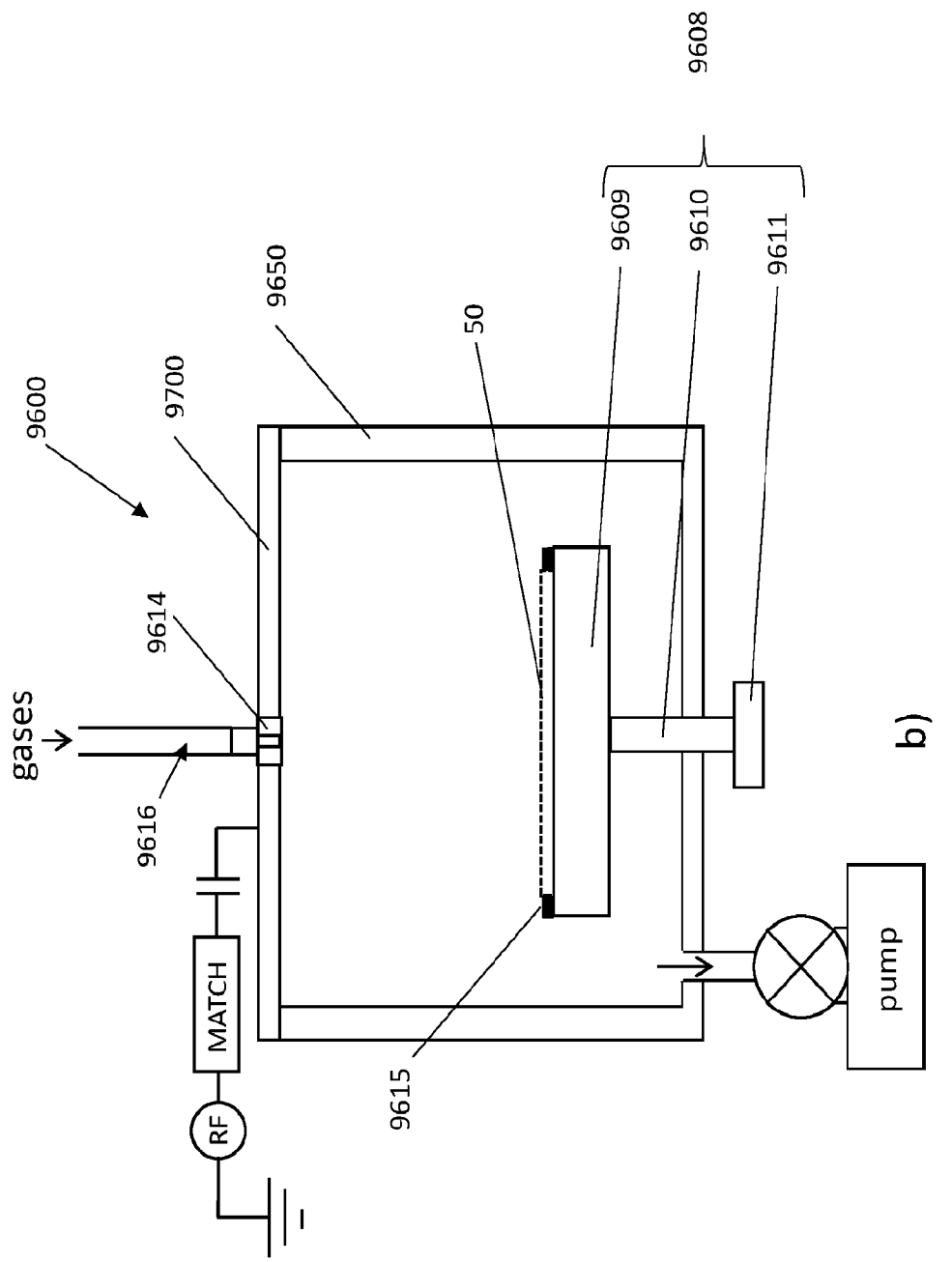
FIG. 11 is a schematic depicting an example of a deposition processing system.

As shown in FIG. 11, embodiments of the technology as disclosed herein may be useful as components for use in a plasma processing system 9600 which may be configured for use in semiconductor deposition processes, also called "deposition processing system". Deposition processing system 9600 comprises a vacuum chamber 9650, a vacuum source, and a puck 9609 on which a wafer 50, also denoted as semiconductor substrate, is supported. The processing system may further include a nozzle or injector 9614 which is in fluid communication with a gas delivery system 9616 for supplying process gases to the interior of the vacuum chamber 9650. A top wall 9700 of the chamber 9650 may comprise a central opening configured to receive a central gas injector (also referred to as nozzle), 9614. In certain embodiments, the top wall 9700 of the chamber may comprise an RF or dielectric window configured with a central opening to accommodate injector, 9614. An RF energy source energizes the process gas into a plasma state to process the substrate 50. Embodiments of the top wall, comprising an RF or dielectric window 9700, the gas delivery system 9616 and the central gas injector 9614 may be made entirely or partially from embodiments of the sintered ceramic body as disclosed herein.

Deposition processing system 9600 may further include an electrostatic chuck 9608 that is designed to carry a wafer 50. The chuck 9608 may comprise a puck 9609, for supporting the wafer 50. Parts of the supporting surface of the puck 9609 may be covered with a deposition ring, 9615. Other names for deposition ring 9615 such as deposition shield or deposition ring assembly are taken as synonymous and may be used interchangeably herein. Deposition ring 9615 may be made entirely or partially from embodiments of the sintered ceramic body as disclosed herein.

The puck 9609 may be formed fully or in part from embodiments of the sintered ceramic body as disclosed herein and may have a chucking electrode disposed within the puck proximate a support surface of the puck 9609 to electrostatically retain the wafer 50 when disposed on the puck 9609. The chuck 9608 may comprise a base 9611 having a ring-like extending to support the puck 9609; and a shaft 9610 disposed between the base and the puck to support the puck above the base such that a gap is formed between the puck 9609 and the base 9610, wherein the shaft 9610 supports the puck proximate a peripheral edge of the puck 9609. Chuck 9608, puck 9609, and deposition ring 9615 may be made entirely or partially from embodiments of the sintered ceramic body as disclosed herein.

The present disclosure is illustrated by the following examples section.

EXAMPLES

The following examples are included to more clearly demonstrate the overall nature of the disclosure. These examples are exemplary, not restrictive, of the disclosure.

All particle size measurements were performed using a Horiba model LA-960 Laser Scattering Particle Size Distribution Analyzer capable of measuring particle size from 10 nm to 5 mm. All specific surface area (SSA) measurements for the starting powders, powder mixtures and calcined powder mixtures were performed using a Horiba BET Surface Area Analyzer model SA-9601 capable of measuring across a specific surface area of 0.01 to 2000 m²/g with an accuracy of 10% and less for most samples. Purities and impurities were measured using an ICP-MS from Agilent 7900 ICP-MS model G8403.

Features of the gap and the radial variance in average coefficient of thermal expansion (CTE) of the at least one graphite material according to the examples are measured within a spark plasma sintering tool wherein the tool comprises: a die comprising a sidewall comprising an inner wall and an outer wall, wherein the inner wall has a diameter that defines the inner volume; an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die. The sintering tool has a central axis wherein a radial deviation from the average coefficient of thermal expansion of the at least one graphite material varies about the central axis by $0.3 \times 10^{-6}/°$ C. and less, preferably $0.2 \times 10^{-6}/°$ C. and less, preferably $0.18 \times 10^{-6}/°$ C. and less, preferably $0.1 \times 10^{-6}/°$ C. and less, preferably $0.08 \times 10^{-6}/°$ C. and less, and preferably $0.06 \times 10^{-6}/°$ C. and less as depicted in FIG. 4.

The terms "apparatus" and "tool" are used interchangeably in reference to the spark plasma sintering apparatus.

All density measurements were performed in accordance with ASTM B962-17, based upon Archimedes methods as known to those skilled in the art. Embodiments of the oxide powders and ceramics formed therefrom are known to be inherently insulating, highly resistive materials having a resistivity of from about $1 \times 10^{+10}$ ohm-cm and greater.

Comparator Example 1

A polycrystalline ceramic sintered body of 406 mm largest dimension was prepared from a crystalline powder of yttrium oxide having a specific surface area of from 4.5 to 6.5 m²/g, and a d10 particle size of from 1.5 to 3.5 um, a d50 particle size of from 4 to 6 μm and a d90 particle size of 6.5 to 8.5 um. The powder had total impurities of about 14 ppm relative to a total mass of the yttrium oxide powder as measured using ICPMS techniques. A die of a spark plasma sintering tool was lined with at least one graphite foil having properties as disclosed herein, and the die and each of upper and lower punches of the tool comprised at least one graphite material as disclosed herein. The powder was disposed inside an inner volume defined by the spark plasma sintering tool and the tool had a gap of about 100 μm. The gap is configured between an inwardly facing surface of the at least one graphite foil and an outer wall of each of the upper punch and the lower punch of the spark plasma sintering apparatus. Vacuum conditions of from $10^{-2}$ to $10^{-3}$ torr were created inside the inner volume. The powder was sintered at 1400° C. at a pressure of 20 MPa for a duration of 30 minutes to form a sintered ceramic body in a disc shape having a greatest dimension, or diameter, of 406 mm. The overall density of the sample was measured as 4.78 g/cc, or 95.03% of the theoretical density for yttrium oxide (reported as 5.03 g/cc). A density variation was measured to be about 4.5% relative to the highest density measurement across the greatest dimension. The sintered ceramic body prepared according to the method using the apparatus having a gap as disclosed in accordance with this example resulted in low overall density, high density variation and subsequent fracture of the sintered body.

Comparator Example 2: (Sample 363)

High purity (>99.99%) yttrium oxide and aluminum oxide powders were combined to form a powder mixture in a molar ratio to form a sintered ceramic body comprising the yttrium aluminum garnet (YAG) phase upon sintering. After wet tumble mixing performed as known to those skilled in the art, the powder was calcined at 1,000° C. for 10 hours. The calcined powder mixture had a specific surface area (SSA) of from about 3.5 to 5.5 m2/g, a d10 particle size of from about 0.8 to 2 um, a d50 particle size of from about 90 to 110 um and a d90 particle size of from about 240 to 250 um. In certain embodiments, the calcination conditions as disclosed herein may result in agglomeration of the powder mixture and thus greater variability in particle size distributions may result. Thus, in embodiments, the particle size as referred to herein may include a single particle and in other embodiments, the particle size as referred to herein may include an agglomerate comprising more than one particle or an agglomeration of multiple particles which may be measured, using the laser particle size detection methods as disclosed herein, as a single, large particle.

A die of a spark plasma sintering tool was lined with at least one graphite foil having properties as disclosed herein, and the die and each of upper and lower punches of the tool comprised at least one graphite material as disclosed herein. The calcined powder mixture was disposed inside an inner volume defined by the tool of the spark plasma sintering tool wherein the tool at ambient temperature had a gap of from about 50 to 70 µm wherein the gap is configured between an inwardly facing surface of at least one graphite foil and an outer wall of each of the upper and lower punches of the spark plasma sintering apparatus. Vacuum conditions of from $10^{-2}$ to $10^{-3}$ torr were created inside the inner volume, and a pressure of about 5 MPa was applied to form a powder compact having a packing density of about 50% from the calcined powder mixture. The powder compact inside the inner volume was heated according to the method as disclosed herein. Upon heating, consolidation of the powder compact was not achieved by the sintering apparatus during the heating process. Thus, the radial variance in average coefficient of thermal expansion (CTE) of the at least one graphite material comprising the die and/or upper and lower punches exceeded $0.3\times10^{-6}/°$ C. across the temperature range in accordance with the method as disclosed herein (from ambient up to the sintering and/or the operational maximum temperature of the apparatus of about 2,000° C.). As a result, the required gap distance of from 10 to 70 um was unable to be maintained across the required temperature range of from ambient temperature to the sintering temperature, in this case set at a predetermined value of 1450° C. The sintered ceramic body produced in accordance with this example fractured upon removal from the tool, indicating a low density and thereby low strength.

Example 1: (Sample 353) High Density, Large Dimension Polycrystalline Sintered Ceramic Body A sintered ceramic body of 406 mm largest dimension was prepared from a crystalline powder of yttrium oxide having a specific surface area of from 6 to 8 m²/g, and a d10 particle size of from 1 to 3 µm, a d50 particle size of from 4 to 6 um and a d90 particle size of from 7.5 to 9.5 um. The powder had total impurities of about 25 ppm relative to the total mass of the yttrium oxide powder. A die of a spark plasma sintering tool was lined with at least one graphite foil having properties as disclosed herein, and the die and each of upper and lower punches comprised at least one graphite material as disclosed herein. The yttria powder was disposed inside an inner volume defined by the spark plasma sintering tool having a gap of from about 50 to about 70 µm wherein the gap is configured between an inwardly facing surface of the at least one graphite foil and an outer wall of each of the upper punch and the lower punch of the sintering apparatus. Preapplication of pressure to the yttrium oxide powder was performed in a multiple step process whereby about 10 MPa pressure was pre-applied under a vacuum of from about 10-2 to 10-3 torr to form a powder compact having a packing density of from about 35 to 45% by volume. The powder compact was sintered at a temperature of 1550° C. at a pressure of 20 MPa for a duration of 60 minutes. A radial variance from the average coefficient of thermal expansion (CTE) of the at least one graphite material comprising the die and/or the upper and lower punches about a central axis of the sintering tool was determined to be about $0.2\times10^{-6}/°$ C. and less. The average density across 5 measurements was performed and a density of 5.020 g/cc, or 99.80% of the theoretical density for yttrium oxide (According to D. R. Lide, CRC Handbook of Chemistry and Physics 84th Edition, 2012 ("the CRC Handbook"), the theoretical density of yttrium oxide is 5.03 g/cm3) was measured. Thus, using the apparatus having the specified gap distance and radial variance as disclosed herein, a high density, sintered ceramic of large dimension may be formed.

Example 2: (Sample 506); Polycrystalline YAG Sintered Ceramic Body of Large Dimension A powder of yttria (average purity of 99.998%, average impurities of about 21 ppm relative to a total mass of the yttrium oxide powder) having a specific surface area of 2 to 3 m²/g, a d10 particle size of from 2.5 to 4.5 µm, a d50 particle size of from 6 to 8 µm and a d90 particle size of from 11 to 13 µm, and a powder of alumina (purity 99.9994%, impurities about 6 ppm relative to a total mass of the aluminum oxide) having a specific surface area of from 6.5 to 8.5 m²/g, a d10 particle size of from 0.75 to 1.5 µm, a d50 particle size of from 2 to 5 µm and a d90 particle size of from 18 to 24 µm were combined in a molar ratio to form a sintered ceramic body comprising the yttrium aluminum garnet (YAG) phase upon sintering. Ball milling as known to those skilled in the art was performed and upon calcination at 1050° C. for 6 hours in air, the calcined powder mixture was measured to have a specific surface area of from 3.5 to 5.5 m²/g, a d10 particle size of from 1 to 3.5 µm, a d50 particle size of from 5 to 8 µm and a d90 particle/agglomerate size of from 130 to 160 um. In certain embodiments, the calcination conditions as disclosed herein may result in agglomeration of the powder mixture and thus greater variability in particle size distributions may result. Thus, in embodiments, the particle size as referred to herein may include a single particle and in other embodiments, the particle size as referred to herein may include an agglomerate comprising more than one particle or an agglomeration of multiple particles which may be measured, using the laser particle size detection methods as disclosed herein, as a single, large particle. The purity of the calcined powder mixture was about the same as that of the starting powders. The powders, powder mixture and/or calcined powder mixture may be sieved, tumbled, blended and/or milled at various process steps according to known methods. A die of a spark plasma sintering apparatus was lined with at least one graphite foil having properties as disclosed herein, and the die and each of upper and lower punches of the apparatus comprised at least one graphite material as disclosed herein. The calcined powder mixture was disposed inside an inner volume defined by the spark plasma sintering tool wherein the tool had a gap of from about 30 to 50 um. The gap is configured between an inwardly facing surface of the at least one graphite foil and an outer wall of each of an upper punch and a lower punch of the sintering apparatus. A radial variance from the average coefficient of thermal expansion (CTE) of the at least one graphite material comprising the die and/or the upper and lower punches about a central axis of the sintering tool was determined to be about $0.1 \times 10^{-6}/°$ C. and less. The calcined powder mixture was disposed inside the inner volume defined by the tool set of a sintering apparatus as disclosed herein, and vacuum conditions of from $10^{-2}$ to $10^{-3}$ torr were created inside the volume. The calcined powder mixture inside the inner volume was heated at 5° C./minute to 800° C., at which temperature a pressure of 5 MPa was applied to form a powder compact having a packing density of from about 40 to 50% by volume, then simultaneously heat was applied at a heating rate of from about 2 to about 3° C./minute and pressure was applied at a rate of from about 0.2 to about 0.25 MPa/min to reach the sintering conditions of 1650° C. and 15 MPa for 60 minutes to form a polycrystalline YAG sintered ceramic body in a disc shape having 622 mm greatest dimension. Density measurements were performed in accordance with ASTM B962-17 from samples cut across a radius of the sample and the density results are illustrated in FIG. 15B. Five measurements each were performed at 6 locations along the radius, and an average density of 4.55 g/cc was measured, corresponding to 99.78% of theoretical for YAG. Densities across the radius were from 99.7 to 99.9% of theoretical (reported as 4.556 g/cc) for YAG. The variation in density as depicted in FIG. 15B was measured relative to the highest density measurement along the radius, and a maximum variation in density of 0.21% was measured. During sintering of the powders and powder mixtures using the spark plasma sintering apparatus as disclosed herein, pressure and temperature are applied in a radially symmetric configuration about a central axis 9. Thus, properties such as high density (≥99% of theoretical for YAG) and minimal density variation (≤0.21%) are maintained across a radius, and also correspondingly across a diameter or greatest dimension of the sintered ceramic body. Thus, disclosed herein is a sintered ceramic body having an average density of 4.546 g/cc, ranging in density from 99.7 to 99.9% of the theoretical density for YAG (a commercially available sample of YAG was measured and average density of 4.556 g/cc was obtained and taken as the theoretical density of YAG as used herein), and having a maximum density variation of 0.21% and less across the diameter of the sintered ceramic body.

Example 3: (Sample 152); Polycrystalline Yttrium Oxide Sintered Ceramic Body

A 100 mm sintered yttrium oxide body was formed from a yttrium oxide powder having a surface area of from 6.5 to 8.0 m²/g and 99.999% purity, corresponding to an average total impurity of 18 ppm relative to a total mass of the yttrium oxide powder. The d10 particle size was from 1.5 to 3.5 um, the median particle size (d50) was from 4 to 6 μm and the d90 particle size was 7.5 to 9.5 um. A die of a spark plasma sintering apparatus was lined with at least one graphite foil having properties as disclosed herein, and the die and each of upper and lower punches of the apparatus comprised at least one graphite material as disclosed herein. The yttria powder was disposed inside an inner volume defined by the sintering apparatus, and vacuum conditions of from $10^{-2}$ to $10^{-3}$ torr were created inside the inner volume. The tool had a gap of from about 25 to about 50 um wherein the gap is configured between an inwardly facing surface of the at least one graphite foil and an outer wall of each of the upper punch and the lower punch of the sintering apparatus. A radial variance in average coefficient of thermal expansion (CTE) of the at least one graphite material comprising the die and/or the upper and lower punches about a central axis of the sintering tool was determined to be about $0.25 \times 10^{-6}/°$ C. and less. Sintering was performed at 1400° C. for 30 minutes at 30 MPa. Thereafter annealing was performed in air at 1400° C. for 8 hours. An average density of 5.02 g/cc was measured, corresponding to 99.9% of the theoretical density of yttrium oxide (According to D. R. Lide, CRC Handbook of Chemistry and Physics 84$^{th}$ Edition, 2012 ("the CRC Handbook"), the theoretical density of yttrium oxide is 5.03 g/cm³).

Example 4 (Sample 329): Polycrystalline Spinel Sintered Ceramic Body

A powder of magnesia having total purity of 99.9994% corresponding to total impurities of 6 ppm, a surface area of 4-6 m²/g, and an average or d50 particle size of between 3 and 4 um was combined with a powder of alumina having total purity of 99.9995% corresponding to total impurities of 5 ppm, a surface area of 6-8 m²/g and an average or d50 particle size of between 2.5 and 4.5 um. The powders were weighed in relative amounts to create a powder mixture in a molar ratio to form spinel, $MgAl_2O_4$ having a cubic crystallographic structure upon sintering. The powder mixture was wet tumble milled according to methods as known to those skilled in the art. The powder mixture was calcined at 850° C. for 4 hours in an oxygen containing environment and was measured to have a specific surface area of 5 to 6 m2/g. The calcined powder mixture may be optionally sieved after calcination using methods known to the art. A die of a spark plasma sintering apparatus was lined with at least one graphite foil having properties as disclosed herein, and the die and each of upper and lower punches of the apparatus comprised at least one graphite material as disclosed herein. The calcined powder mixture was disposed inside an inner volume defined by the sintering apparatus, and vacuum conditions of from $10^{-2}$ to $10^{-3}$ torr were created inside the inner volume. The tool had a gap of from about 20 to about 40 um wherein the gap is configured between an inwardly facing surface of the at least one graphite foil and an outer wall of each of the upper punch and the lower punch of the sintering apparatus. A radial variance from the average coefficient of thermal expansion (CTE) of the at least one graphite material comprising the die and/or the upper and lower punches about a central axis of the sintering tool was determined to be about $0.1 \times 10^{-6}/°$ C. and less. The calcined powder mixture was then sintered in accordance with the method as disclosed herein at a temperature of 1500° C., a pressure of 20 MPa for a duration of 30 minutes under vacuum to form a ceramic sintered body having a greatest dimension of 100 mm. Density on the sintered ceramic body was measured to be 3.546 g/cc or 99.04% of theoretical density. Hardness measurements were performed on the sintered ceramic body in accordance with ASTM C1327 using an applied load of 0.025 kgf. An average hardness of 15.06 GPa with a standard deviation of 0.75 was measured across 8 measurements. Annealing was thereafter performed at 1500° C. and allowed to passively cool in an air environment. Density on the annealed sintered ceramic body was measured to be 3.553 g/cc or 99.24% of theoretical density (According to L. Ping et al, "Magnesium aluminate (MgAl2O4) spinel produced via self-heat-sustained (SHS) technique", Materials Research Bulletin 36 (2001), the theoretical density of magnesium aluminate spinel is 3.579 g/cm$^3$)

Example 5: High Density Polycrystalline Sintered Ceramic Body

A sintered ceramic body of 406 mm largest dimension was prepared from a crystalline powder of yttrium oxide having a surface area of from 2 to 3 m$^2$/g, and a d10 particle size of from 2.5 to 4 µm, a d50 particle size of from 6 to 7.5 um and a d90 particle size of from 11.5 to 13 µm. The powder had total impurities of about 12 ppm relative to a total mass of the yttria powder. The die was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 50 µm whereby the gap is configured between an inwardly facing surface of the at least one foil and an outer wall of each of an upper punch and a lower punch of the sintering apparatus. Preapplication of pressure was performed in a multiple step process whereby about 10 MPa pressure was pre-applied under vacuum to form a powder compact having a packing density of from about 35 to 45% by volume. The powder compact was sintered at a temperature of 1550° C. at a pressure of 20 MPa for a duration of 60 minutes. The average density across 5 measurements was performed and a density of 5.020 g/cc, or 99.801% of the theoretical density for yttrium oxide (reported as 5.03 g/cc as disclosed herein) was measured.

Example 6: High Density Polycrystalline Sintered Ceramic Body

A crystalline powder of yttria having a specific surface area of from 4.5 to 6 m$^2$/g and a crystalline powder of alumina having a specific surface area of from 3.5 to 5 m$^2$/g were combined in a molar ratio to form the yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 12 hours and thereafter the ethanol was extracted from the powder mixture using a rotary evaporator. Upon calcination at 1000° C. for 10 hours in air, the calcined powder mixture was measured to have a specific surface area of from 7 to 8 m$^2$/g according to BET surface area methods, a d10 particle size of from 0.75 to 1.75 µm, a d50 particle size of from 90 to 110 µm and a d90 particle size of from 240 to 280 µm. The powder mixture may be sieved, blended and/or milled at various process steps according to known methods. The die was lined with a graphite foil having properties as disclosed herein, and the die and each of the upper and lower punches comprised a graphite material as disclosed herein. The powder was disposed inside an inner volume of a spark plasma sintering tool having a gap width of from about 50 to about 70 µm whereby the gap is configured between an inwardly facing surface of at least one foil and an outer wall of each of an upper punch and a lower punch of the sintering apparatus. The calcined powder mixture was sintered at 1550° C. at a pressure of 20 MPa for 60 minutes under vacuum to form a sintered ceramic body of 406 mm greatest dimension. Density measurements were performed across a greatest dimension of the sintered body, and an average density of 4.543 g/cc was measured across 135 measurements, corresponding to 99.709% of theoretical density for YAG and volumetric porosity of 0.291% as calculated from density measurements. The density was found to vary across the greatest dimension of the polycrystalline sintered ceramic body from 4.526 to 4.553 g/cc (or from 99.335 to 99.936% of theoretical for YAG) and the density variance across the greatest dimension was determined to be 0.601%.

Example 7: Large Dimension Polycrystalline Sintered Ceramic Body

A crystalline powder of yttria (purity 99.9997% as measured by ICPMS, reported above the reporting limit) having a specific surface area of from 2 to 4 m$^2$/g and a crystalline powder of alumina (purity 99.9998% as measured by ICPMS) having a specific surface area of from 6 to 8 m$^2$/g were combined in a molar ratio to form the yttrium aluminum garnet (YAG) phase upon sintering. High purity alumina media (>99.99% as measured by ICPMS) was added at about 50% loading by powder weight, and ethanol was added to form about a 40 volume % slurry. Ball milling was performed and thereafter the ethanol was extracted from the powder mixture using a rotary evaporator. Upon calcination at 1050° C. for 6 hours in air, the calcined powder mixture was measured to have a specific surface area of from about 3 to 5 m$^2$/g, a d10 particle size of from 1 to 3 um, a d50 particle size of from 3.5 to 6 µm and a d90 particle size of from 6 to 12 µm. The calcined powder mixture may be sieved, blended and/or milled at various process steps according to known methods. The calcined powder purity was measured using ICPMS methods as known to those skilled in the art to have a total impurity content of about 7 ppm, corresponding to purity of about 99.9993%. The die was lined with a graphite foil having properties as disclosed herein, and the die and each of the upper and lower punches comprised a graphite material as disclosed herein. The calcined powder mixture was disposed inside an inner volume of a spark plasma sintering tool having a gap width of from about 40 to about 60 µm whereby the gap is configured between an inwardly facing surface of at least one foil and an outer wall of each of an upper punch and a lower punch of the sintering apparatus. The calcined powder mixture inside the inner volume was subjected to a pre sintering pressure of 10 MPa to form a powder compact having a packing density of about 45% by volume. The calcined powder mixture was sintered at 1600° C. at a pressure of 15 MPa for 60 minutes under vacuum to form a sintered ceramic body of 616 mm greatest dimension. Density measurements were performed in accordance with ASTM B962-17 using Archimedes principle, and an average density of 99.1% of the theoretical density for YAG (4.556 g/cc) was measured for the sintered ceramic body.

Example 8: Zirconia Toughened Alumina (ZTA) Sintered Body

A zirconia powder having a specific surface area of from 6 to 8 m2/g, a d10 particle size of from 0.5 to 0.2 um, a d50 particle size of from 0.2 to 0.5 um, and a d90 particle size of from 1.2 to 3 um and a powder of alumina having a specific surface area of from 6 to 8 m2/g, a d10 particle size of from 0.05 to 0.15 um, a d50 particle size of from 0.2 to 0.5 um, a d90 particle size of from 0.4 to 1 um were weighed and combined to create a powder mixture in a molar ratio to form a zirconia toughened aluminum phase upon sintering, wherein the zirconia is present in an amount of about 16 volume %. The zirconia powder comprised from about 2 to 4 mol % $HfO_2$ and was stabilized with yttria in an amount of about 3 mol %. HfO2 is present in many commercially available zirconia powders and Yttria is known to those skilled in the art to stabilize zirconia. As such, yttria and hafnia are not considered impurities in zirconia as disclosed herein. Excluding Hf and Y, the zirconia powder had total impurities of about 20 ppm. The powders were combined in ratios to form a composite oxide layer comprising about 16% by volume of zirconia and the balance alumina upon sintering. The powder mixture comprising zirconia and yttria was transferred to a container for wet ball milling. The powder mixture comprised zirconia and yttria without the use of sintering aids such as MgO or silica. Thus, disclosed herein is a sintered ceramic body comprising a zirconia alumina layer which is free of, or substantially free of, sintering aids. High purity (>99.99%) alumina media was used at about 75 to 80% loading relative to powder weight and ethanol was added to the container to form a slurry and enhance mixing. In other instances, ball milling may be performed with water or under dry conditions using only alumina or zirconia media. Ball milling using a rolling action about a horizontal axis was performed for a duration of 20 hours at 150 rpm and thereafter the ethanol was extracted from the powder mixture using a rotary evaporator. The powder mixture was calcined at 600° C. for 8 hours. The calcined powder mixture may be optionally sieved, tumbled, blended, etc. after calcination as known to those skilled in the art. A die of a spark plasma sintering apparatus was lined with at least one graphite foil having properties as disclosed herein, and the die and each of upper and lower punches of the apparatus comprised at least one graphite material as disclosed herein. The calcined powder mixture was disposed inside an inner volume defined by the spark plasma sintering tool wherein the tool had a gap of from about 25 to about 45 um. The gap is configured between an inwardly facing surface of the at least one graphite foil and an outer wall of each of an upper punch and a lower punch of the sintering apparatus. A radial variance from the average coefficient of thermal expansion (CTE) of the at least one graphite material comprising the die and/or the upper and lower punches about a central axis of the sintering tool was determined to be about $0.1 \times 10^{-6}$/° C. and less. The calcined powder mixture was disposed inside the inner volume defined by the tool set of a sintering apparatus as disclosed herein, and vacuum conditions of from $10^{-2}$ to $10^{-3}$ torr were created inside the volume. A pressure of about 5 MPa was applied to form a powder compact having a packing density of from about 40 to 50% by volume. The calcined powder mixture inside the inner volume was heated at from 5 to 10° C./minute to 800° C., then simultaneously heat was applied at a heating rate of from about 3 to about 5° C./minute and pressure was applied at a rate of from about 0.2 to about 0.25 MPa/min to reach the sintering conditions of 1450° C., a pressure of 20 MPa for a duration of 30 minutes in accordance with the method as disclosed herein to form a sintered body of 150 mm dimension. Densities for embodiments of the ZTA sintered ceramic body are reported in the table following. The sintered ceramic bodies as disclosed herein may comprise a particle composite of the crystalline phases of zirconia and alumina in the amounts by volume as disclosed. The particle composite may comprise particles or regions of zirconia dispersed in a matrix of alumina wherein the particle composite comprises two separate crystalline phases and preferably the sintered ceramic body does not form a solid solution. Because yttria and zirconia exist as separate phases, the volumetric mixing rule may be applied to calculate the theoretical density as reported following.

| Sample | Vol % ZrO2 | Vol % Al2O3 | Average Density (g/cc) | % Theoretical Density | % Volumetric Porosity |
|---|---|---|---|---|---|
| 337 | 10 | 90 | 4.192 | 100 | 0 |
| 412 | 12 | 88 | 4.228 | 99.9 | 0.12 |
| 412-1 | 12 | 88 | 4.224 | 99.8 | 0.21 |
| 413-1 | 12 | 88 | 4.198 | 99.2 | 0.83 |
| 450 | 16 | 84 | 4.319 | 100 | 0 |
| 365 | 20 | 80 | N/A | N/A | N/A |
| 562 | 16 | 84 | N/A | N/A | N/A |

In a set of examples, ZTA sample 365 comprising 20% by volume of zirconia and 80% by volume of alumina was made in accordance with example 8 and sintered at 1450° C. at a pressure of 20 MPa for a duration of 30 minutes. ZTA sample 562 comprising about 16% by volume of zirconia and about 84% by volume of alumina was made in accordance with example 8 and sintered at 1500° C. at a pressure of 15 MPa for a duration of 30 minutes, as listed following.

| Sample | Size (mm) | Sintering T (° C.) | Sintering P (MPa) | Sintering Time (min) | Anneal Temp (° C.) | Anneal Time (hr) |
|---|---|---|---|---|---|---|
| 337 | 100 | 1450 | 20 | 30 | None | none |
| 365 | 100 | 1450 | 20 | 45 | None | none |
| 373 | 100 | 1450 | 20 | 30 | None | none |
| 412 | 150 | 1500 | 15 | 30 | None | none |
| 412-1 | 150 | 1500 | 15 | 30 | 1400 | 8 |
| 413 | 150 | 1500 | 15 | 30 | None | none |
| 413-1 | 150 | 1500 | 15 | 30 | 1500 | 8 |
| 450 | 150 | 1500 | 20 | 20 | None | none |
| 562 | 406 | 1500 | 15 | 30 | None | none |

Example 9: (Sample 421) Multilayer Sintered Ceramic Body of Large Dimension

A multilayer sintered ceramic body was formed from first and second powder mixtures. The first powder mixture comprised alumina and zirconia to form a particle composite of the crystalline phases of zirconia and alumina in the amounts by volume as disclosed in accordance with Example 8. The second powder comprised alumina and yttria to form a layer comprising the YAG phase. The first powder mixture comprised an alumina powder wherein the alumina powder has a specific surface area of from 6 to 8 $m^2$/g, a d10 particle size of from 0.05 to 0.15 um, a d50 particle size of from 0.2 to 0.5 um, a d90 particle size of from 0.4 to 1 um, and a zirconia powder having a surface area of from 6 to 8 m2/g, a d10 particle size of from 0.5 to 0.2 um, a d50 particle size of from 0.2 to 0.5 um, and a d90 particle size of from 1.2 to 3 um. Total impurity content of the alumina powder was from about 2 to 10 ppm. The zirconia powder comprised from about 2 to 4 mol % Hf and was stabilized with yttria in an amount of about 3 mol %. Hf and Y are not considered impurities in zirconia as disclosed herein. Excluding Hf and Y, the zirconia powder had total impurities of about 20 ppm. The powders were combined in ratios to form at least one particle composite layer upon sintering comprising about 16% by volume of zirconia and the balance alumina. Combining the alumina and zirconia powders to make a powder mixture was performed using the conventional powder preparation techniques of wet ball milling wherein high purity (>99.99%) alumina media was used at about 75 to 80% loading relative to powder weight. A slurry was formed at about 40 volume % by adding ethanol. The slurry was ball milled for about 20 hours at an RPM of about 150 and thereafter dried, tumbled, and sieved according to methods known to those skilled in the art to form the first powder mixture. The first powder mixture was calcined at 600° C. for 8 hours. The first calcined powder mixture had a specific surface area of from 6 to 8 m²/g. The first calcined powder mixture had total impurities of about 15 ppm and comprised about 14 ppm or less of Si and Mg in an amount of about 5 ppm or less. The powder mixture may be sieved, tumbled, blended, etc. as known to those skilled in the art.

The second powder mixture comprised an alumina powder wherein the alumina powder has a specific surface area of from 6 to 8 m²/g, a d10 particle size of from 0.05 to 0.15 um, a d50 particle size of from 0.2 to 0.5 um, a d90 particle size of from 0.4 to 1 um, and a yttria powder having a specific surface area of 2 to 3 m²/g, a d10 particle size of from 2 to 4 μm, a d50 particle size of from 6 to 8 μm and a d90 particle size of from 11 to 13 μm. Total impurity content of the alumina and yttria powders was from about 2 to 10 ppm. The powders were combined in ratios to form a corrosion resistant layer comprising YAG (yttrium aluminum oxide, garnet phase) upon sintering. Combining the alumina and yttria powders to make a second powder mixture was performed using the conventional powder preparation techniques of wet ball milling wherein high purity (>99.9%) media was used at about 60% loading relative to powder weight. A slurry was formed at about 40 volume % by adding ethanol. The slurry was milled for about 15 hours at an RPM of 150 and thereafter dried, tumbled, and sieved according to methods known to those skilled in the art to form the first powder mixture. The second powder mixture was calcined at 850° C. for 6 hours. The second calcined powder mixture had a specific surface area of from 2 to 4 m²/g, and a d50 particle size of from 9 to 13 um. The second calcined powder mixture had total impurities of about 8 ppm and may be sieved, tumbled, blended, etc. as known to those skilled in the art.

A die of a spark plasma sintering apparatus was lined with a graphite foil having properties as disclosed herein, and the die and each of upper and lower punches comprised a graphite material as disclosed herein. A radial variance from the average coefficient of thermal expansion (CTE) of the at least one graphite material comprising the die and/or the upper and lower punches about a central axis of the sintering tool was determined to be about $0.08 \times 10^{-6}$/° C. and less. The first and second calcined powder mixtures were separately disposed to form at least two separate layers inside an inner volume of a spark plasma sintering tool having a gap width of from about 25 to about 45 μm whereby the gap is configured between an inwardly facing surface of at least one foil and an outer wall of each of an upper punch and a lower punch of the sintering apparatus.

The first and second calcined powder mixtures were sintered at a temperature of 1600° C. for 60 minutes at 15 MPa to form a multilayer sintered ceramic body comprising at least two layers comprising YAG and ZTA of greatest dimension of 572 mm. Due to the multilayer structure comprising regions of different densities, density measurements were unable to be performed accurately on the multi-layered body.

An additional multilayer sintered ceramic body comprising at least two layers comprising YAG and ZTA having a greatest dimension of 622 mm was prepared in accordance with Example 9 and sintered at 1625° C. for 60 minutes at 15 MPa.

Example 10: (Sample 477) Multilayer Sintered Ceramic Body of Large Dimension

A multilayer sintered ceramic body was formed from first and second powder mixtures. The first powder mixture comprised alumina and zirconia to form a zirconia toughened alumina (ZTA) in accordance with Example 8. The second powder mixture comprised about mol % zirconia and the balance yttria.

The first powder mixture comprised an alumina powder wherein the alumina powder has a specific surface area of from 6 to 8 m²/g, a d10 particle size of from 0.05 to 0.15 um, a d50 particle size of from 0.2 to 0.5 um, a d90 particle size of from 0.4 to 1 um, and a zirconia powder having a surface area of from 6 to 8 m²/g, a d10 particle size of from 0.5 to 0.2 um, a d50 particle size of from 0.2 to 0.5 um, and a d90 particle size of from 1.2 to 3 um. Total impurity content of the alumina powder was from about 2 to 10 ppm. The zirconia powder comprised from about 2 to 4 mol % Hf and was stabilized with yttria in an amount of about 3 mol %. $HfO_2$ is present in many commercially available zirconia powders and Yttria is known to those skilled in the art to stabilize zirconia. As such, yttria and hafnia are not considered impurities in zirconia as disclosed herein. Excluding Hf and Y, the zirconia powder had total impurities of about 20 ppm. The first powder mixture comprised zirconia and alumina without the addition of sintering aids such as MgO or silica. Thus, disclosed herein is a multilayer sintered ceramic body comprising a zirconia alumina (zta) layer which is free of, or substantially free of, sintering aids. The powders were combined in ratios to form a layer comprising about 16% by volume of zirconia and the balance alumina upon sintering. Combining the alumina and zirconia powders to make the first powder mixture was performed using the conventional powder preparation techniques of wet ball milling wherein high purity (>99.99%) alumina media was used at about 75 to 80% loading relative to powder weight. A slurry was formed at about 40 volume % by adding ethanol. The slurry was ball milled for about 20 hours at an RPM of about 150 and thereafter dried, tumbled, and sieved according to methods known to those skilled in the art to form the first powder mixture. The first powder mixture was calcined at 900° C. for 6 hours. The first calcined powder mixture had a specific surface area of from 5 to 7 m²/g. The first calcined powder mixture had total impurities of about 15 ppm and comprised about 14 ppm or less of Si and less than about 5 ppm of Mg. The powder mixture may be sieved, tumbled, blended, etc. as known to those skilled in the art.

The second powder mixture comprised a zirconia powder having a surface area of from 6 to 8 m²/g, a d10 particle size of from 0.5 to 0.2 μm, a d50 particle size of from 0.2 to 0.5 μm, and a d90 particle size of from 1.2 to 3 μm, and a yttria powder having a specific surface area of 2 to 3 m²/g, a d10 particle size of from 2 to 4 μm, a d50 particle size of from 6 to 8 μm and a d90 particle size of from 11 to 13 μm. Total impurity content of the zirconia and yttria powders was from about 2 to 10 ppm. Si and Mg were not detected using ICPMS as known to those skilled in the art in the yttria and zirconia powders and as such, the yttria and zirconia powders comprise about 14 ppm or less of Si, and about 5 ppm or less of Ca, Li and Mg, in the form of silica, calcia, Li/lithium fluoride and magnesia, respectively. The powders were combined in ratios to form a layer comprising at least one crystalline phase comprising 20 mol % zirconia and the balance yttria upon sintering. Combining the zirconia and yttria powders to make a second powder mixture was performed using the conventional powder preparation techniques of wet ball milling wherein 3 mol % yttria stabilized zirconia media was used at about 90% loading relative to powder weight. A slurry was formed at about 40 volume % by adding ethanol. The slurry was milled for about 12 hours at an RPM of 150 and thereafter dried, tumbled, and sieved according to methods known to those skilled in the art to form the second powder mixture. The second powder mixture was calcined at 850° C. for 6 hours. The second calcined powder mixture had a specific surface area of from 2 to 4 $m^2/g$, and a d50 particle size of from 6 to 10 um. The second calcined powder mixture had total impurities of about 8 ppm and comprised about 14 ppm or less of Si and about 5 ppm or less of Mg, in the form of silica and magnesia, respectively. The second powder mixture may be sieved, tumbled, blended, etc. as known to those skilled in the art.

A die of a spark plasma sintering apparatus was lined with a graphite foil having properties as disclosed herein, and the die and each of upper and lower punches comprised a graphite material as disclosed herein. A radial variance from the average coefficient of thermal expansion (CTE) of the at least one graphite material comprising the die and/or the upper and lower punches about a central axis of the sintering tool was determined to be about $0.08 \times 10^{-6}/°$ C. and less. The first and second calcined powder mixtures were separately disposed to form at least two separate layers inside an inner volume of a spark plasma sintering tool having a gap width of from about 25 to about 45 µm wherein the gap is configured between an inwardly facing surface of at least one foil and an outer wall of each of an upper punch and a lower punch of the sintering apparatus.

First and second calcined powder mixtures were separately disposed inside the inner volume defined by the tool set of the sintering apparatus as disclosed herein to form the multilayer sintered ceramic body comprising at least two separate layers.

The first and second calcined powder mixtures were sintered at a temperature of 1500° C. for 45 minutes at 15 MPa to form a multilayer sintered ceramic body having a greatest dimension of 150 mm. Due to the multilayer structure comprising regions of different densities, density measurements were unable to be performed accurately.

Example 11: 80 Mol % Yttria—20 Mol % Zirconia Sintered Ceramic Body

A powder of yttria having a surface area of 6-8 $m^2/g$ and a powder of zirconia having a surface area of 6-8 $m^2/g$ were weighed and combined to create a powder mixture in a ratio of 80 mol % yttria and 20 mol % zirconia. The purity of the yttria powder was greater than about 99.998% relative to 100% pure yttria, and the purity of the zirconia powder was greater than about 99.79% relative to 100% pure zirconia. Ethanol was added in an amount of 50% by powder weight and 100% by powder weight of zirconia media were added to the powder mixture to form a slurry. The slurry was placed in an axially rotating ball mill for 12 hours at 80 to 90 RPM after which the slurry was removed from the mill. The ethanol was extracted from the slurry using a rotary evaporator, leaving the powder mixture which was calcined at 1000° C. for 8 hours in air. The powder mixture may be optionally sieved, tumbled, blended, etc. according to known methods before and/or after calcination.

A die of a spark plasma sintering apparatus was lined with at least one graphite foil having properties as disclosed herein, and the die and each of upper and lower punches of the apparatus comprised at least one graphite material as disclosed herein. A radial variance from the average coefficient of thermal expansion (CTE) of the at least one graphite material comprising the die and/or the upper and lower punches about a central axis of the sintering tool was determined to be about $0.08 \times 10^{-6}/°$ C. and less. The yttria-zirconia calcined powder mixture was disposed inside an inner volume defined by the sintering apparatus, and vacuum conditions of from $10^{-2}$ to $10^{-3}$ torr were created inside the inner volume. The tool had a gap of from about 25 to about 45 um wherein the gap is configured between an inwardly facing surface of the at least one graphite foil and an outer wall of each of the upper punch and the lower punch of the sintering apparatus. A radial variance in average coefficient of thermal expansion (CTE) of the at least one graphite material comprising the die and/or the upper and lower punches about a central axis of the sintering tool was determined to be about $0.2 \times 10^{-6}/°$ C. and less. Sintering was performed at 1500° C. for 30 minutes at 30 MPa under vacuum in accordance with the method as disclosed herein to form a 100 mm sintered ceramic body. Thereafter annealing was performed in air at 1200° C. for 8 hours. The average density was calculated to be 5.135 g/cc across 5 measurements.

A further sintered ceramic body comprising 90 mol % Yttria and 10 mol % Zirconia was prepared in accordance with the materials, apparatus and method of Example 11.

The following yttrium oxide samples H1/66 to H4/152 according to an embodiment of the present invention were prepared according to the present disclosure.

H1/66:

An 80 mm sintered yttrium oxide body was formed from a powder having a surface area of from 2.5 to 3.5 $m^2/g$, a d50 particle size of 5.4 um and <10 ppm of TREO (total rare earth oxides) and total impurities of 48 ppm for a powder purity of 99.9952%. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 50 to about 70 µm whereby the gap is configured between an inwardly facing surface of at least one foil and an outer wall of each of an upper punch and a lower punch of the sintering apparatus. The body was formed at a sintering temperature of 1500° C. for 60 minutes at 30 MPa. Annealing was performed at a temperature ramp of 5° C./minute to 1450° C. for 1 hour then 1400° C. for 8 hours in air. The sintered yttrium oxide body had density of 4.948 g/cm³ and a maximum pore diameter of 1.1 um. A d10, d50 and d90 grain size was measured at 0.5, 0.8 and 1.4 um, respectively.

H2/65:

A 40 mm sintered yttrium oxide body was formed from a powder having a surface area of from 6.5 to 7.5 $m^2/g$. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 40 to about 60 µm whereby the gap is configured between an inwardly facing surface of at least one foil and an outer wall of each of an upper punch and a lower punch of the sintering apparatus. Sintering was performed at a sintering temperature of 1550° C. for 10 minutes at 30 MPa. Annealing was performed for four hours in a furnace at a temperature of 1300° C. in air. The starting yttrium oxide powder had total purity of 99.999% corresponding to 10 ppm. The median particle size was measured to be 5.82 µm. The sintered yttrium oxide body had a total impurity level of 11 ppm. Purity of the starting powder was maintained in the sintered yttrium oxide body, indicating very minimal to no contaminants were introduced during processing. A d10, d50 and d90 grain size was measured at 4.0, 13.0 and 27.1 um, respectively and an average grain size of 14 um was measured.

H3/79:

A 40 mm sintered yttrium oxide body was formed from a powder having a surface area of 2.5 to 3.5 m²/g and median (d50) particle size of 5.17 µm. The starting powder had total impurities of between 2 and 4 ppm. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 40 to about 60 µm whereby the gap is configured between an inwardly facing surface of at least one foil and an outer wall of each of an upper punch and a lower punch of the sintering apparatus. Sintering of the yttrium oxide body was performed using a sintering temperature of 1500° C. for a duration of 10 minutes at a pressure of 30 MPa. Temperature was ramped at 50° C./minute with simultaneous pressure application at 5 MPa/minute. Annealing was performed by ramping the temperature at 5° C./minute to 1300° C. and holding for four hours in air. The sintered yttrium oxide body had a total impurity level of between 9 and 10 ppm, indicating minimal introduction of contaminants as a result of the process. The maximum pore size was measured to be 0.6 um and density of 5.03 g/cc was measured. A d10, d50 and d90 grain size was measured at 0.8, 1.4 and 2.4 um, respectively. An average grain size of 1.47 um was also measured.

H4/152:

A 100 mm sintered yttrium oxide body was formed from a powder having a surface area of 6 to 8 m²/g and 99.999% purity of TREO (<10 ppm) and an average total impurity of 18 ppm. The median particle size (d50) was 4.65 µm. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 50 µm whereby the gap is configured between an inwardly facing surface of at least one foil and an outer wall of each of an upper punch and a lower punch of the sintering apparatus. Sintering was performed at 1400° C. for 30 minutes at 30 MPa. Thereafter annealing was performed in air at 1400° C. for 8 hours. A density of 5.024 g/cm³ was measured with a maximum pore size of 2 um. After a 2-step $CF_4/O_2$ etch process as disclosed herein, an average step height of 0.98 um, an average etch rate of 0.68 nm/min and an etch volume of 340000 um³ were obtained. Before and after a 2-step $CF_4/O_2$ etch process as disclosed herein, an arithmetical mean height (Sa) of 10 and 14 nm respectively were measured. After an oxygen etch process as disclosed herein, an average step height of 0.1 um, an average etch rate of 0.07 nm/min and an etch volume of 30000 um³ were obtained. After an $SF_6$ etch process as disclosed herein, an average step height of 0.28 um, an average etch rate of 0.19 nm/min and an etch volume of 90000 um³ were obtained.

Single Step, $CF_4$ Etch Procedure

To assess etch performance, polished ceramic samples of dimension 6 mm×6 mm×2 mm were mounted onto a c plane sapphire wafer using a silicone-based heat sink compound. Regions of each part were blocked from exposure to the etch process by bonding a 5 mm×5 mm square sapphire ceramic to the sample surface.

The dry etch process was performed using a Plasma-Therm Versaline DESC PDC Deep Silicon Etch which is standard equipment for the industry. Etching was completed in 4 hour etch segments for a total duration of 24 hours. The process was conducted at a pressure of 10 millitorr with a $CF_4$ flow rate of 90 standard cubic centimeters per minute (sccm), an oxygen flow of 30 sccm, and Argon flow of 20 sccm. The bias was 600 volts and 2000 watts ICP power. This etch recipe has a silicon etch rate of 512 nm/minute. The etch recipe etches fused silica (quartz glass) at a rate of 72 nm/minute. The etch conditions as used here to assess sample performance were selected to subject the disclosed materials to extreme etch conditions in order to differentiate performance.

Upon completion of the etch procedure, surface roughness was measured.

Single Step, $CF_4$ Etch Volume Procedure:

In an embodiment, the sintered yttrium oxide body is characterized by an etch volume of less than about 12000 µm³, preferably less than about 9000 µm³, more preferably less than about 7000 µm³. This etch volume is realized in case an etch process as reference process is carried in which a sample of the dimension of 6 mm×6 mm×2 mm is subjected to etching conditions at a pressure of 10 millitorr with a $CF_4$ flow rate of 90 standard cubic centimetres per minute (sccm), an oxygen flow of 30 standard cubic centimetres per minute (sccm), and argon flow of 20 standard cubic centimetres per minute (sccm), a bias of 600 volts and 2000 watt ICP power for 24 hours. The respective etch process is described in more detail further below in the experimental section. Thereby, the etch volume relates to the volume of the yttrium oxide body being removed during the indicated etch process.

Single Step, $CF_4$ Etch Rate Procedure:

In some embodiments, the yttrium oxide body is characterized by exhibiting an etch rate of less than about 0.08 nm/min, preferably less than about 0.06 nm/min, more preferably less than about 0.05 nm/min. This etch rate is realized in case a single step CF4 etch process as reference process is carried in which a sample of the dimension of 6 mm×6 mm×2 mm is subjected to etching conditions at a pressure of 10 millitorr with a $CF_4$ flow rate of 90 standard cubic centimetres per minute (sccm), an oxygen flow of 30 standard cubic centimetres per minute (sccm), and argon flow of 20 standard cubic centimetres per minute (sccm), a bias of 600 volts and 2000 watt ICP power for a duration of 24 hours. Thereby, the etch rate relates to the thickness reduction of the yttrium oxide body being removed during the indicated etch process.

Single Step $CF_4$ Sdr Procedure (Unetched, Etched)

In some embodiments, the sintered yttrium oxide body is characterized by having a developed interfacial area ratio in an unetched area of less than $100\times10^{-5}$, more preferably less than $75\times10^{-5}$, most preferably less than $50\times10^{-5}$, according to ISO standard 25178-2-2012, section 4.3.2; and having a developed interfacial area ratio in an etched area of less than $600\times10^{-5}$, more preferably less than $500\times10^{-5}$, more preferably less than $400\times10^{-5}$, more preferably less than $300\times10^{-5}$, most preferably less than $200\times10^{-5}$, according to ISO standard 25178-2-2012, section 4.3.2. This latter developed interfacial ratio is realized in case a sample of the yttrium oxide body with a dimension of 6 mm×6 mm×2 mm is subjected to etching conditions at a pressure of 10 millitorr with a $CF_4$ flow rate of 90 standard cubic centimetres per minute (sccm), an oxygen flow of 30 standard cubic centimetres per minute (sccm), and argon flow of 20 standard cubic centimetres per minute (sccm), a bias of 600 volts and 2000 watt ICP power for 24 hours $CF_4$ etch time. The respective etch process is described in more detail further below.

Single Step $CF_4$ Sa (Unetched, Etched)

In some embodiments, the sintered yttrium oxide body is further characterized by having an arithmetical mean height Sa of less than 30 nm, more preferably less than 28 nm, most preferably less than 25 nm, according to ISO standard 25178-2-2012, section 4.1.7; and with an arithmetical mean height Sa of less than 40 nm, more preferably less than 35 nm, most preferably less than 30 nm, according to ISO standard 25178-2-2012, section 4.1.7. The latter arithmetical mean height Sa is realized in case a sample of the yttrium oxide body with a dimension of 6 mm×6 mm×2 mm is subjected to etching conditions at a pressure of 10 millitorr with a $CF_4$ flow rate of 90 standard cubic centimetres per minute (sccm), an oxygen flow of 30 standard cubic centimetres per minute (sccm), and argon flow of 20 standard cubic centimetres per minute (sccm), a bias of 600 volts and 2000 watt ICP power for a duration of 24 hours. The respective etch process is described in more detail further below.

Surface Roughness Measurement

Surface roughness measurements were performed using a Keyence 3D laser scanning confocal digital microscope model VK-X250X under ambient conditions in a class 1 cleanroom. The microscope rests on a TMC tabletop CSP passive benchtop isolator with 2.8 Hz Natural Frequency.

This non-contact system uses laser beam light and optical sensors to analyze the surface through reflected light intensity. The microscope acquires 1,024 data points in the x direction and 786 data points in the y direction for a total of 786,432 data points. Upon completion of a given scan, the objective moves by the pitch set in the z direction and the intensity is compared between scans to determine the focus. The ISO 25178 Surface Texture (Areal Roughness Measurement) is a collection of international standards relating to the analysis of surface roughness with which this microscope is compliant.

The surface of samples was laser scanned using the confocal microscope at 10× magnification to capture a detailed image of the sample. Line roughness was obtained on a profile of 7 partitioned blocks. The lambda chi($\lambda$), which represents the measurement sampling lengths, was adjusted so that the line reading was limited to measurements from the 5 middle blocks of the 7 according to ISO specification 4288: Geometrical Product Specifications (GPS)—Surface texture: Profile method—Rules and procedures for the assessment of surface texture.

Areas were selected within etched and masked regions of a sample for measurement. Areas were selected to be most representative of the typical sample surface and used to calculate Sa and Sdr.

The surface roughness Sa and Sdr are well-known parameters in the underlying technical field and, for example, described in ISO standard 25178-2-2012, section 4.1.7 (surface roughness Sa) and 4.3.2 (surface roughness Sdr).

Step Height Measurements

The step height as a result of etch processing was directly measured by using the Keyence 3D laser scanning confocal digital microscope model VK-X250X at a magnification of 20×. Selected areas in etched and unetched regions of a sample were used to create separate reference planes. The average height difference across three measurements between these reference planes may be taken as the step height.

Etch Rate Calculation

An average etch rate in nanometers per hour may be calculated from the average step height by dividing the step height by the total etch time to arrive at an etching rate in nanometers per minute.

Volume Measurements

Etched volume was calculated from measurements on the Keyence 3D laser scanning confocal digital microscope model VK-X250X at 50×. A 7×7 image template is created, from which a 7×1 region is selected for measurement. A reference plane is first established on a representative region of the sample which has been masked and therefore unetched. To establish the reference plane, an area within the masked region is selected. A software enabled tilt correction is completed across the area to account for variations in sample thickness and mounting. Thereafter, a total area of 600 um×200 um is selected in the etched region of the image at a maximum distance from the masked surface. The height of the etched surface as compared to the reference plane created upon the masked surface is measured, and a volume of material removed by etching with respect to the reference plane is calculated across the selected area.

Differences Between Ra and Sa Measurements:

Sa is the arithmetical mean height of the surface and described within ISO 25178: Geometric Product Specifications (GPS)—Surface texture: areal is an International Organization for Standardization collection of international standards relating to the analysis of 3D areal surface texture. This is based upon non-contact laser microscopy.

Ra is the arithmetic mean roughness of the 2D profile according to ISO 4287:1997 Geometrical Product Specifications (GPS)—Surface texture: Profile method. This is based upon a mechanical stylus in contact with the surface to create a linear profile.

Sa represents height differences across a 3D measurement surface, while Ra represents height differences across a 2D linear profile scan.

Ra is limited by the stylus tip geometry and as such may result in loss of fine feature detail and distortion of peaks and valleys. This becomes problematic when measuring fine, submicron features and is a limitation in the use of Ra values to compare with Sa values.

Additional samples were made according to the process of the present invention and are summarized in the tables below. Where applicable they are compared to commercially available quartz (TSC 03) and comparator yttrium oxide samples (107, 108, and 118).

As an example, sample 188-1 was made as follows: A yttrium oxide powder having a surface area of 2 to 3 $m^2/g$ and 13 ppm total impurities, corresponding to a powder purity of 99.9987% was used to form a 100 mm yttrium oxide sintered body. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 μm whereby the gap is configured between an inwardly facing surface of at least one foil and an outer wall of each of an upper punch and a lower punch of the sintering apparatus. Preapplication of pressure was performed in a multiple step process whereby 20 MPa pressure was pre-applied under vacuum. Thereafter 5 MPa was applied simultaneous to heating at rate of 10° C./min from room temperature to 600° C. Pressure was increased to 30 MPa between 600° C. and the sintering temperature at a rate of 10° C./minute. Sintering was performed at a temperature of 1400° C. and pressure of 30 MPa for a duration of 30 minutes to complete sintering. After sintering, power was shut off to the sintering apparatus, allowing for natural cooling. Annealing was performed at a temperature of 1400° C. for 8 hours in an oxygen containing environment. The density was 5.002 g/cm$^3$.

In another example, sample 116 was made as follows: A 40 mm yttrium oxide sample was formed from a powder having a surface area of 6.5 to 7.5 m$^2$/g. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 40 to about 60 µm whereby the gap is configured between an inwardly facing surface of at least one foil and an outer wall of each of an upper punch and a lower punch of the sintering apparatus. Sintering was performed at a sintering temperature of 1550° C. for 10 minutes at 30 MPa. Annealing was performed for nine hours in a furnace at a temperature of between 1400 and 1450° C. in air. The starting yttrium oxide powder had total purity of 99.999% corresponding to 10 ppm. The median particle size was measured to be 5.82 µm. The sintered yttrium oxide body had a total impurity level of 11 ppm. Purity of the starting powder was maintained in the sintered yttrium oxide body, indicating very minimal to no contaminants were introduced during processing. A d10, d50 and d90 grain size was measured at 0.7, 6.7 and 25.4 um, respectively.

In another example, sample 224 was made as follows: A yttrium oxide powder having a surface area of 5 to 6 m$^2$/g and an average of 8 ppm total impurities corresponding to a powder purity of 99.9992% was used to form a 100 mm yttrium oxide sintered body. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 µm whereby the gap is configured between an inwardly facing surface of at least one foil and an outer wall of each of an upper punch and a lower punch of the sintering apparatus. Pressure was pre-applied at 20 MPa for about 5 minutes and 50 millitorr vacuum established. Thereafter, pressure was reduced to 5 MPa and heating to 600° C. was accomplished at a rate of 10° C./minute. Simultaneous application of heat and pressure were performed to reach a pressure of 20 MPa and temperature application at a rate of 10° C./min to 1400° C. Sintering was performed at a temperature of 1400° C. and pressure of 20 MPa for a duration of 30 minutes to complete sintering. After sintering, power was shut off to the sintering apparatus allowing for natural cooling. The sintered yttrium oxide body had a d10, d50 and d90 grain size of 0.4, 0.7 and 1.2 um, respectively.

In another example, sample 189-1 was made as follows: A yttrium oxide powder having a surface area of 4.2 m$^2$/g and 24.8 ppm total impurities, corresponding to a powder purity of 99.9975% was used to form a 100 mm yttrium oxide sintered body. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 µm whereby the gap is configured between an inwardly facing surface of at least one foil and an outer wall of each of an upper punch and a lower punch of the sintering apparatus. Preapplication of pressure was performed in a multiple step process whereby 20 MPa pressure was pre-applied under vacuum. Thereafter 5 MPa was applied simultaneous to heating at rate of 10° C./min from room temperature to 600° C. Pressure was increased to 30 MPa between 600° C. and the sintering temperature at a rate of 10° C./minute. Sintering was performed at a temperature of 1400° C. and pressure of 30 MPa for a duration of 30 minutes to complete sintering. After sintering, power was shut off to the sintering apparatus, allowing for natural cooling. Annealing was performed at a temperature of 1400° C. for 8 hours in an oxygen containing environment. The sintered yttrium oxide body had impurities of 36 ppm and a purity of 99.996%. The density of the annealed and sintered yttrium oxide body was 5.006 g/cm$^3$ and had a maximum pore size of 0.7 microns. After a 2-step CF$_4$/O$_2$ etch process as disclosed herein, an average step height of 0.82 um, an average etch rate of 0.57 nm/min and an etch volume of 270,000 um$^3$ were obtained.

In another example, sample 045 was made as follows: A yttrium oxide powder having a surface area of 9 to 10 m$^2$/g and 26 ppm total impurities, corresponding to a powder purity of 99.9974% was used to form a 100 mm yttrium oxide sintered body. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 µm whereby the gap is configured between an inwardly facing surface of at least one foil and an outer wall of each of an upper punch and a lower punch of the sintering apparatus. Preapplication of pressure was performed in a multiple step process whereby 20 MPa pressure was pre-applied under vacuum as disclosed herein. Thereafter 5 MPa was applied simultaneous to heating at rate of 10° C./min from room temperature to 600° C. Pressure was increased to 30 MPa between 600° C. and the sintering temperature at a rate of 10° C./minute. Sintering was performed at a temperature of 1400° C. and pressure of 30 MPa for a duration of 30 minutes to complete sintering. After sintering, power was shut off to the sintering apparatus, allowing for natural cooling. An average density using the Archimedes method was measured to be 5.021 g/cm$^3$. Annealing was performed at a temperature of 1400° C. for 8 hours in an oxygen containing environment. An average density after annealing using the Archimedes method was measured to be 5.010 g/cm$^3$.

In another example, sample 200-1 was made as follows: A yttrium oxide powder having a surface area of 4 to 5 m$^2$/g and 9.5 ppm total impurities corresponding to a powder purity of 99.9991% was used to form a 150 mm yttrium oxide sintered body. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 µm whereby the gap is configured between an inwardly facing surface of at least one foil and an outer wall of each of an upper punch and a lower punch of the sintering apparatus. Pressure was pre-applied at 20 MPa for about 5 minutes. Thereafter, pressure was reduced to 5 MPa and heating to 600° C. was accomplished at a rate of 25° C./minute. Simultaneous application of heat and pressure were performed at a heating rate of 25° C./min and a pressure rate of 5 MPa/min to 1000° C. and 20 MPa. Heating at a rate of 10° C./minute was performed between 1000° C. to the sintering temperature. Sintering was performed at a temperature of 1400° C. and pressure of 20 MPa for a duration of 30 minutes to complete sintering. After sintering, power was shut off to the sintering apparatus allowing for natural cooling. Annealing was performed at a temperature of 1400° C. for 8 hours in an oxygen containing environment. The density of the annealed and sintered yttrium oxide body was 4.945 g/cm$^3$ and had a maximum pore size of 1.4 microns. After a 2-step $CF_4/O_2$ etch process as disclosed herein, an average step height of 0.2 um, an average etch rate of 0.14 nm/min and an etch volume of 60,000 um3 were obtained. After an oxygen etch process as disclosed herein, an average step height of 0.1 um, an average etch rate of 0.07 nm/min and an etch volume of 30,000 um$^3$ were obtained. After an $SF_6$ etch process as disclosed herein, an average step height of 0.27 um, an average etch rate of 0.19 nm/min and an etch volume of 80,000 um3 were obtained.

In another example, sample 212-1 was made as follows: A yttrium oxide powder having a surface area of 5.6 m$^2$/g and 8.1 ppm total impurities corresponding to a powder purity of 99.9992% was used to form a 100 mm yttrium oxide sintered body. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 μm whereby the gap is configured between an inwardly facing surface of at least one foil and an outer wall of each of an upper punch and a lower punch of the sintering apparatus. Pressure was pre-applied at 20 MPa for about 5 minutes and 50 millitorr vacuum established. Thereafter, pressure was reduced to 5 MPa and heating to 600° C. was accomplished at a rate of 50° C./minute. Simultaneous application of heat and pressure were performed at a pressure rate of 10 MPa/min and temperature application at a rate of 25° C./min to 30 MPa and 1450° C. Sintering was performed at a temperature of 1450° C. and pressure of 30 MPa for a duration of 30 minutes to complete sintering. After sintering, power was shut off to the sintering apparatus allowing for natural cooling. Annealing was performed at a temperature of 1400° C. for 8 hours in an oxygen containing environment. The density of the annealed and sintered yttrium oxide body was 5.022 g/cm$^3$ and had a maximum pore size of 1.0 micron. The sintered yttrium oxide body had a total average impurity of 6 ppm, corresponding to purity of 99.9994%. After a 2-step $CF_4/O_2$ etch process as disclosed herein, an average step height of 1.1 um, an average etch rate of 0.77 nm/min and an etch volume of 358,000 um$^3$ were obtained.

In another example, sample 314 was made as follows: A yttrium oxide powder having a surface area of from 2 to 3 m$^2$/g and 24.8 ppm total impurities corresponding to a powder purity of 99.9975% was used to form a yttrium oxide sintered body having a longest dimension of 406 mm. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 70 μm whereby the gap is configured between an inwardly facing surface of at least one foil and an outer wall of each of an upper punch and a lower punch of the sintering apparatus. Pressure was pre-applied at 5 MPa and temperature was ramped from room temperature at 10° C./minute to 800° C. Simultaneous application of heat and pressure were performed at a heating rate of 10° C./min and pressure ramping to 20 MPa from between 800° C. to 1000° C. Pressure was maintained at 20 MPa from 1000° C. to the sintering temperature with a heating rate of 10° C./min. Sintering was conducted at a temperature of 1450° C. and pressure of 20 MPa for a sintering duration of 60 minutes. The heat and pressure were terminated after the sintering duration and natural cooling occurred. The sintered yttrium oxide body was annealed in an oxygen containing environment at 1400° C. for 8 hours using a heating and cooling rate of 0.8° C./minute. The average density of the annealed and sintered yttrium oxide body was 4.935 g/cm$^3$ with a density range across the longest dimension of between 4.898 and 4.970 g/cm$^3$.

In another example, sample 457 was made as follows: A yttrium oxide powder having a surface area of 5-6 m$^2$/g and 17 ppm total impurities corresponding to a powder purity of 99.9983% was used to form a yttrium oxide sintered body having a longest dimension of 406 mm. Calcination of the powder was performed at 600° C. for 8 hours with a surface area of 5-6 m$^2$/g. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 70 μm whereby the gap is configured between an inwardly facing surface of at least one foil and an outer wall of each of an upper punch and a lower punch of the sintering apparatus. Pressure was pre-applied at 5 MPa and temperature was ramped from room temperature at 10° C./minute to 600° C. Simultaneous application of heat and pressure were performed at a heating rate of 5° C./min and pressure ramping to 30 MPa from between 600° C. to 1000° C. Pressure was maintained at 30 MPa from 1000° C. to the sintering temperature with a heating rate of 5° C./min. Sintering was conducted at a temperature of 1475° C. and pressure of 30 MPa for a sintering duration of 60 minutes. The pressure was removed after the sintering duration. Cooling was performed using forced convection at 50% blower power for about 4 hours. Cooling using varying blower power levels from about 25% to 100% enables forced convection cooling rates of between 2.5° C./min to 5° C./min. Sintering was conducted at a temperature of 1475° C. and pressure of 30 MPa for a duration of 60 minutes. The sintered yttrium oxide body was annealed in an oxygen containing environment at 1400° C. for 4 hours using a heating rate of 0.8° C./minute and a cooling rate of 2° C./minute. The average density of the annealed and sintered yttrium oxide body was 4.985 g/cm$^3$ with a density range across the longest dimension of between 4.980 and 4.989 g/cm$^3$. A maximum pore size was measured to be 1.4 um, and an Sa value of 18 nm and Sdr value of 1178×10$^{-5}$ were measured after a $CF_4/O_2$ etch process as disclosed. An average grain size of 0.65 um was measured using line intercept techniques for this sample.

In another example, sample 353 was made as follows: A yttrium oxide powder having a surface area of 6.5 to 7.5 m$^2$/g and an average of 11 ppm total impurities corresponding to a powder purity of 99.9989% was used to form a yttrium oxide sintered body having a longest dimension of 406 mm. The powder may be blended, tumbled, sieved, etc. before and/or after calcination according to known methods. Calcination of the powder was performed at 1000° C. for 24 hours and the surface area was from 1.5 to 2.5 m²/g. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 70 µm whereby the gap is configured between an inwardly facing surface of at least one foil and an outer wall of each of an upper punch and a lower punch of the sintering apparatus. Pressure was pre-applied at 5 MPa and temperature was ramped from room temperature at 10° C./minute to 800° C. Simultaneous application of heat and pressure were performed at a heating rate of 10° C./min and pressure ramping to 30 MPa from between 800° C. to 1000° C. Pressure was maintained at 30 MPa from 1000° C. to the sintering temperature with a heating rate of 10 C/min. Sintering was conducted at a temperature of 1475° C. and pressure of 30 MPa for a sintering duration of 60 minutes. The heat and pressure were terminated after the sintering duration and natural cooling occurred. The sintered yttrium oxide body was annealed in an oxygen containing environment at 1400° C. for 0 minutes (without an isothermal annealing duration) at a heating rate of 0.8° C./minute and passive cooling rate of 0.8° C./minute. The average density of the annealed and sintered yttrium oxide body was 4.981 g/cm³.

In another example, sample 414 was made as follows: A yttrium oxide powder having a surface area of 6.5 to 7.5 m²/g and an average of 11 ppm total impurities corresponding to a powder purity of 99.9989% was used to form a yttrium oxide sintered body having a longest dimension of 406 mm. Calcination of the powder was performed at 500° C. for 48 hours and the surface area was 6.5 to 7.5 m²/g. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 70 µm whereby the gap is configured between an inwardly facing surface of at least one foil and an outer wall of each of an upper punch and a lower punch of the sintering apparatus. Pressure was pre-applied at 5 MPa and temperature was ramped from room temperature at 10° C./minute to 800° C. Simultaneous application of heat and pressure were performed at a heating rate of 10° C./min and pressure ramping to 30 MPa from between 800° C. to 1000° C. Pressure was maintained at 30 MPa from 1000° C. to the sintering temperature with a heating rate of 10° C./min. Sintering was conducted at a temperature of 1400° C. and pressure of 30 MPa for a sintering duration of 60 minutes. The heat and pressure were terminated after the sintering duration and natural/passive cooling occurred. The average density of the annealed and sintered yttrium oxide body was 4.985 g/cm³.

In yet another example, sample 476 was made as follows: A yttrium oxide powder having a surface area of about 2 m²/g and 5-6 ppm total impurities corresponding to a powder purity of 99.9995% was used to form a yttrium oxide sintered body having a longest dimension of 406 mm. The powder was tumbled for 24 hours prior to sintering without use of milling media. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 70 µm whereby the gap is configured between an inwardly facing surface of at least one foil and an outer wall of each of an upper punch and a lower punch of the sintering apparatus. Pressure was pre-applied at 5 MPa and temperature was ramped from room temperature at 10° C./minute to 600° C. Simultaneous application of heat and pressure were performed at a heating rate of 5° C./min and pressure ramping to 30 MPa from between 600° C. to 1000° C. Pressure was maintained at 30 MPa from 1000° C. to the sintering temperature with a heating rate of 5° C./min. Sintering was conducted at a temperature of 1475° C. and pressure of 30 MPa for a sintering duration of 60 minutes. The pressure was removed after the sintering duration. Cooling was performed using forced convection at 50% blower power. Cooling using varying blower power levels enables forced convection cooling rates of between 2.5° C./min to 5° C./min. The sintered yttrium oxide body was annealed in an oxygen containing environment at 1400° C. for 4 hours using a heating rate of 1° C./minute and cooling rate of 2° C./minute. The average density of the annealed and sintered yttrium oxide body was 4.953 g/cm³ with a density range across the longest dimension of between 4.891 and 5.014 g/cm³.

In a set of examples, samples 084 and 084-1, 085 and 085-1, 086 and 086-1, 087 and 087-1, 095 and 096 were made as follows: 100 mm yttrium oxide sintered bodies were prepared from a powder having a surface area of between 6.5 to 7.5 m²/g and an average of 11 ppm total impurities, providing a powder purity of 99.9989%. The powder was calcined prior to sintering at 800° C. for 8 hours and had a surface area of 5 to 6.5 m²/g. The die of the sintering apparatus was lined with a graphite foil having properties as disclosed herein, and the die and each of the upper and lower punches comprised a graphite material as disclosed herein. The powder was disposed inside an inner volume of a spark plasma sintering tool having a gap width of from about 30 to about 60 µm whereby the gap is configured between an inwardly facing surface of at least one foil and an outer wall of each of an upper punch and a lower punch of the sintering apparatus. Samples 084-1, 085-1, 086-1, 087-1, 095 and 096 were annealed at 1400° C. at a ramp rate of 5° C./minute for 8 hours in an oxygen environment. Densities and process conditions are as disclosed in the corresponding density and sintering/annealing tables herein.

Tables 11 to 14 summarize the process conditions and resulting densities of samples prepared according to the process of the present disclosure.

TABLE 11

Sintering and Annealing Conditions of Sintered Yttrium Oxide Bodies
Sintering and Annealing Parameters

| Sample | Sintering T (° C.) | Sintering P (MPa) | Sintering Time (min) | Anneal Temp (° C.) | Anneal Time (hr) |
| --- | --- | --- | --- | --- | --- |
| 45 | 1400 | 30 | 30 | none | none |
| 45-1 | 1400 | 30 | 30 | 1400 | 8 |
| 84 | 1550 | 10 | 30 | none | none |
| 85 | 1300 | 40 | 30 | none | none |
| 86 | 1300 | 50 | 30 | none | none |
| 87 | 1300 | 60 | 30 | none | none |
| 95 | 1200 | 40 | 30 | none | none |
| 96 | 1300 | 30 | 30 | none | none |
| H4/152 | 1400 | 30 | 30 | 1400 | 8 |

TABLE 11-continued

Sintering and Annealing Conditions of Sintered Yttrium Oxide Bodies
Sintering and Annealing Parameters

| Sample | Sintering T (° C.) | Sintering P (MPa) | Sintering Time (min) | Anneal Temp (° C.) | Anneal Time (hr) |
|---|---|---|---|---|---|
| 187 | 1400 | 15 | 30 | 1400 | 8 |
| 212 | 1450 | 30 | 30 | none | none |
| 282 | 1400 | 20 | 30 | none | none |
| 294 | 1400 | 30 | 30 | none | none |
| 308 | 1500 | 30 | 30 | none | none |
| 314 | 1450 | 20 | 60 | 1400 | 8 |
| 317 | 1475 | 30 | 30 | none | none |
| 317-5 | 1475 | 30 | 30 | 1400 | 8 |
| 319 | 1475 | 30 | 30 | none | none |
| 319-5 | 1475 | 30 | 30 | 1400 | 8 |
| 323 | 1475 | 30 | 30 | none | none |
| 323-1 | 1475 | 30 | 30 | 1300 | 0 |
| 328 | 1475 | 30 | 30 | none | none |
| 328-1 | 1475 | 30 | 30 | 1400 | 8 |
| 329 | 1475 | 30 | 30 | none | none |
| 329-1 | 1475 | 30 | 30 | 1400 | 8 |
| 334 | 1475 | 30 | 30 | none | none |
| 334-1 | 1475 | 30 | 30 | 1400 | 8 |
| 341 | 1450 | 30 | 60 | 1300 | 0 |
| 353 | 1475 | 30 | 60 | 1400 | 0 |
| 374 | 1475 | 30 | 30 | none | none |
| 374-1 | 1475 | 30 | 30 | 1400 | 8 |
| 385 | 1450 | 30 | 30 | none | none |
| 385-1 | 1450 | 30 | 30 | 1400 | 8 |
| 386 | 1475 | 20 | 30 | none | none |
| 386-1 | 1475 | 20 | 30 | 1400 | 8 |
| 414 | 1400 | 30 | 60 | none | none |
| 440 | 1450 | 30 | 30 | none | none |
| 440-1 | 1450 | 30 | 30 | 1400 | 8 |
| 442 | 1450 | 20 | 30 | none | none |
| 442-1 | 1450 | 20 | 30 | 1400 | 8 |
| 447 | 1450 | 30 | 60 | 1400 | 1 |
| 457 | 1475 | 30 | 60 | 1400 | 4 |
| 476 | 1475 | 30 | 60 | 1400 | 4 |
| 481 | 1500 | 30 | 30 | none | none |
| 11 | 1400 | 30 | 30 | none | none |
| 200 | 1400 | 20 | 30 | none | none |
| 200-1 | 1400 | 20 | 30 | 1400 | 8 |
| 282-1 | 1400 | 20 | 30 | 1300 | 0 |
| 282-10 | 1400 | 20 | 30 | 1300 | 24 |
| 282-11 | 1400 | 20 | 30 | 1400 | 24 |
| 282-2 | 1400 | 20 | 30 | 1400 | 0 |
| 282-3 | 1400 | 20 | 30 | 1500 | 0 |
| 282-4 | 1400 | 20 | 30 | 1300 | 6 |
| 282-5 | 1400 | 20 | 30 | 1400 | 6 |
| 282-6 | 1400 | 20 | 30 | 1500 | 6 |
| 282-7 | 1400 | 20 | 30 | 1300 | 12 |
| 282-8 | 1400 | 20 | 30 | 1400 | 12 |
| 282-9 | 1400 | 20 | 30 | 1500 | 12 |
| 294-1 | 1400 | 30 | 30 | 1300 | 0 |
| 294-10 | 1400 | 30 | 30 | 1300 | 24 |
| 294-11 | 1400 | 30 | 30 | 1400 | 24 |
| 294-2 | 1400 | 30 | 30 | 1400 | 0 |
| 294-3 | 1400 | 30 | 30 | 1500 | 0 |
| 294-4 | 1400 | 30 | 30 | 1300 | 6 |
| 294-5 | 1400 | 30 | 30 | 1400 | 6 |
| 294-6 | 1400 | 30 | 30 | 1500 | 6 |
| 294-7 | 1400 | 30 | 30 | 1300 | 12 |
| 294-8 | 1400 | 30 | 30 | 1400 | 12 |
| 294-9 | 1400 | 30 | 30 | 1500 | 12 |
| 317-5 | 1475 | 30 | 30 | 1400 | 8 |
| 319-5 | 1475 | 30 | 30 | 1400 | 8 |
| 323-1 | 1475 | 30 | 30 | 1300 | 0 |
| 328-1 | 1475 | 30 | 30 | 1400 | 8 |
| 329-1 | 1475 | 30 | 30 | 1400 | 8 |
| 334-1 | 1475 | 30 | 30 | 1400 | 8 |
| 374-1 | 1475 | 30 | 30 | 1400 | 8 |
| 385-1 | 1450 | 30 | 30 | 1400 | 8 |
| 386-1 | 1475 | 20 | 30 | 1400 | 8 |
| 440-1 | 1450 | 30 | 30 | 1400 | 8 |
| 442-1 | 1450 | 20 | 30 | 1400 | 8 |
| 45-1 | 1400 | 30 | 30 | 1400 | 8 |
| 467 | 1475 | 60 | 30 | none | none |
| 489-1 | 1575 | 30 | 10 | none | none |
| 489-5 | 1550 | 30 | 10 | none | none |
| 489-6 | 1600 | 30 | 10 | none | none |
| 85-1 | 1300 | 40 | 30 | 1400 | 8 |
| 86-1 | 1300 | 50 | 30 | 1400 | 8 |
| 87-1 | 1300 | 60 | 30 | 1400 | 8 |
| H1/66 | 1500 | 30 | 60 | 1400-1450 | 9 |
| H2/65 | 1550 | 30 | 10 | 1300 | 4 |
| H3/79 | 1500 | 30 | 10 | 1300 | 4 |
| 188-1 | 1400 | 30 | 30 | 1400 | 8 |
| 188 | 1400 | 30 | 30 | none | none |
| 189-1 | 1400 | 30 | 30 | 1400 | 8 |
| 212-1 | 1450 | 30 | 30 | 1400 | 8 |
| 186-1 | 1400 | 30 | 30 | 1400 | 8 |
| 224 | 1400 | 20 | 30 | none | none |
| 116 | 1550 | 30 | 10 | 1400-1450 | 9 |

TABLE 12

Density for 150 mm Sintered Yttrium Oxide Bodies
150 mm Dimension

| Sample Identifier | Average Density (g/cc) | Std Dev (g/cc) | % TD |
|---|---|---|---|
| 200 | 4.966 | 0.016 | 98.726 |
| 200-1 | 4.945 | 0.010 | 98.318 |
| 11 | 5.021 | 0.002 | 99.819 |
| 467 | 5.026 | 0.001 | 99.928 |

TABLE 13

Density for 40 mm Sintered Yttrium Oxide Bodies
40 mm Dimension

| Sample Identifier | Average Density (g/cc) | Std Dev (g/cc) | % TD |
|---|---|---|---|
| 489-1 | 5.020 | 0.008 | 99.806 |
| 489-5 | 5.016 | 0.012 | 99.712 |
| 489-6 | 5.023 | 0.003 | 99.856 |
| H3/79 | 5.03 | 0.005 | 100 |

TABLE 14

Density and Density Variation for 406 mm Sintered
Yttrium Oxide Bodies
406 mm dimension

| Sample | Std Dev | % TD | Max Density Variation (%) |
|---|---|---|---|
| 314 | 0.003 | 98.115 | 1.441 |
| 476 | 0.003 | 98.513 | 2.353 |
| 414 | 0.006 | 99.165 | 0.548 |
| 447 | 0.006 | 99.397 | 1.100 |
| 457 | 0.007 | 99.104 | 0.130 |
| 341 | 0.002 | 99.583 | N/A |
| 353 | 0.001 | 99.026 | N/A |

Tables 15 and 16 summarize purities measured for starting powders and sintered yttrium oxide samples made according to the process disclosed herein.

TABLE 15

Purity Characteristics for Sintered Yttrium Oxide Bodies

| Sample | Powder impurity range (ppm) | Average impurity (ppm) | Average % powder purity |
|---|---|---|---|
| 84 | 9.6-35.4 | 15 | 99.9985 |
| 187 | 6.3-9.1 | 7.7 | 99.9992 |
| 282 | 24.8-45.7 | 35.3 | 99.9965 |
| 282-1 | 24.8-45.7 | 35.3 | 99.9965 |
| 282-2 | 24.8-45.7 | 35.3 | 99.9965 |
| 282-3 | 24.8-45.7 | 35.3 | 99.9965 |
| 282-4 | 24.8-45.7 | 35.3 | 99.9965 |
| 282-5 | 24.8-45.7 | 35.3 | 99.9965 |
| 282-6 | 24.8-45.7 | 35.3 | 99.9965 |
| 282-7 | 24.8-45.7 | 35.3 | 99.9965 |
| 282-8 | 24.8-45.7 | 35.3 | 99.9965 |
| 282-9 | 24.8-45.7 | 35.3 | 99.9965 |
| 282-10 | 24.8-45.7 | 35.3 | 99.9965 |
| 282-11 | 24.8-45.7 | 35.3 | 99.9965 |
| 442 | 4.1-25.6 | 14.9 | 99.9985 |
| 442-1 | 4.1-25.6 | 14.9 | 99.9985 |
| 386 | 5.6-13 | 9.3 | 99.9991 |
| 386-1 | 5.6-13 | 9.3 | 99.9991 |
| 96 | 9.6-35.4 | 15 | 99.9985 |
| 294 | 24.8-45.7 | 35.3 | 99.9965 |
| 294-1 | 24.8-45.7 | 35.3 | 99.9965 |
| 294-2 | 24.8-45.7 | 35.3 | 99.9965 |
| 294-3 | 24.8-45.7 | 35.3 | 99.9965 |
| 294-4 | 24.8-45.7 | 35.3 | 99.9965 |
| 294-5 | 24.8-45.7 | 35.3 | 99.9965 |
| 294-6 | 24.8-45.7 | 35.3 | 99.9965 |
| 294-7 | 24.8-45.7 | 35.3 | 99.9965 |
| 294-8 | 24.8-45.7 | 35.3 | 99.9965 |
| 294-9 | 24.8-45.7 | 35.3 | 99.9965 |
| 294-10 | 24.8-45.7 | 35.3 | 99.9965 |
| 294-11 | 24.8-45.7 | 35.3 | 99.9965 |
| 152 | 9.6-35.4 | 15 | 99.9985 |
| 45 | 9.6-35.4 | 15 | 99.9985 |
| 45-1 | 9.6-35.4 | 15 | 99.9985 |
| 385 | 5.6-13 | 9.3 | 99.9991 |
| 385-1 | 5.6-13 | 9.3 | 99.9991 |
| 212 | 7.6-10 | 8.8 | 99.9991 |
| 440 | 4.1-25.6 | 14.9 | 99.9985 |
| 440-1 | 4.1-25.6 | 14.9 | 99.9985 |
| 323 | 24.8-45.7 | 35.3 | 99.9965 |
| 323-1 | 24.8-45.7 | 35.3 | 99.9965 |
| 317 | 7.6-10 | 8.8 | 99.9991 |
| 317-5 | 7.6-10 | 8.8 | 99.9991 |
| 319 | 9.6-35.4 | 15 | 99.9985 |
| 319-5 | 9.6-35.4 | 15 | 99.9985 |
| 328 | 24.8-45.7 | 35.3 | 99.9965 |
| 328-1 | 24.8-45.7 | 35.3 | 99.9965 |
| 329 | 24.8-45.7 | 35.3 | 99.9965 |
| 329-1 | 24.8-45.7 | 35.3 | 99.9965 |
| 334 | 24.8-45.7 | 35.3 | 99.9965 |
| 334-1 | 24.8-45.7 | 35.3 | 99.9965 |
| 374 | 5.6-13 | 9.3 | 99.9991 |
| 374-1 | 5.6-13 | 9.3 | 99.9991 |
| 308 | 9.6-35.4 | 15 | 99.9985 |
| 481 | 4.1-25.6 | 14.9 | 99.9985 |
| 95 | 9.6-35.4 | 15 | 99.9985 |
| 85 | 9.6-35.4 | 15 | 99.9985 |
| 85-1 | 9.6-35.4 | 15 | 99.9985 |
| 86 | 9.6-35.4 | 15 | 99.9985 |
| 86-1 | 9.6-35.4 | 15 | 99.9985 |
| 87 | 9.6-35.4 | 15 | 99.9985 |
| 87-1 | 9.6-35.4 | 15 | 99.9985 |
| 200 | 4.1-25.6 | 14.9 | 99.9985 |
| 200-1 | 4.1-25.6 | 14.9 | 99.9985 |
| 11 | 9.6-35.4 | 15 | 99.9985 |
| 467 | 4.1-25.6 | 14.9 | 99.9985 |
| 489-1 | 2.6-5.8 | 4.2 | 99.9996 |
| 489-5 | 2.6-5.8 | 4.2 | 99.9996 |
| 489-6 | 2.6-5.8 | 4.2 | 99.9996 |
| 269 | 5.4-27.5 | 16.45 | 99.9984 |
| 314 | 24.8-45.7 | 35.25 | 99.9965 |
| 387 | 5.6-13 | 9.3 | 99.9991 |
| 476 | 5.6-13 | 9.3 | 99.9991 |
| 414 | 9.6-35.4 | 15 | 99.9985 |
| 447 | 4.1-25.6 | 14.85 | 99.9985 |
| 457 | 4.1-25.6 | 14.85 | 99.9985 |
| 341 | 24.8-45.7 | 35.25 | 99.9965 |
| 373 | 9.6-35.4 | 15 | 99.9985 |
| 353 | 9.6-35.4 | 15 | 99.9985 |

Table 16 shows the maintenance of purity during the process disclosed herein from the powder to the sintered yttrium oxide body.

TABLE 16

Purity from powder to sintered yttrium oxide body

| Sample | powder ppm range | Average ppm purity | average % powder purity | Sintered body contaminants (ppm) | Sintered body purity (%) |
|---|---|---|---|---|---|
| 189-1 | 24.8-45.7 | 35.25 | 99.9965 | 36.1 | 99.9964 |
| 79 | 2.6-5.8 | 4.2 | 99.9996 | 9.2 | 99.9991 |
| 212 | 7.6-10 | 8.8 | 99.9991 | 6.1 | 99.9994 |

Tables 17 to 19 show the etch results for different process gases on quartz (TSC 03) commercially available yttrium oxide parts (107, 108, 118) and on sintered yttrium oxide samples prepared according to the present disclosure, inclusive of the processing conditions. The $CF_4/O_2$ etching was conducted in a two-step process. Step 1 was performed with a pressure of 10 mtorr (millitorr), $CF_4$ flow of 90 sccm, $O_2$ flow of 30 sccm, Argon flow of 20 sccm with a bias voltage of 600 V, power of 2000 W for 1500 seconds. Step 2 was implemented with a pressure of 10 mtorr, $CF_4$ flow of 0 sccm, $O_2$ flow of 100 sccm, Argon flow of sccm with a bias voltage of 600 V, power of 2000 W for 300 seconds. The first and second steps were repeated sequentially until the time of $CF_4$ exposure in the first step was 24 hours. The $O_2$ etching conditions were: a pressure of 25 mtorr; $CF_4/SF_6$ flow 0 sccm; $O_2$ flow 100 sccm; Ar flow 20 sccm; Bias voltage 600 V; Power 2000 W for a total of 6 hours and the $SF_6$ etching conditions were: pressure of 25 mtorr; $SF_6$ flow 100 sccm; $O_2$ flow 0 sccm; Ar flow 50 sccm; Bias voltage 300 V; Power 2000 W for a total of 24 hours. The results show excellent corrosion resistance for the sintered yttrium oxide bodies made according to the present disclosure.

Sintered yttrium oxide bodies prepared according to the present development preferably exhibit a step height of from 0.2 to 0.98 μm for a $CF_4/O_2$ etch process as disclosed, from 0.27 to 0.44 μm for an $SF_6$ etch process as disclosed herein, and from 0.1 to 0.13 μm for an $O_2$ etch process as disclosed herein.

Sintered yttrium oxide bodies prepared according to the present development preferably exhibit an etch volume of from $0.6 \times 10^5$ to $3.4 \times 10^5$ μm$^3$ for a $CF_4/O_2$ etch process as disclosed, an etch volume of from $0.8 \times 10^5$ to $1.4 \times 10^5$ μm$^3$ for an $SF_6$ etch process as disclosed herein, and from 0.28 to 0.39 μm$^3$ for an $O_2$ etch process as disclosed herein.

Sintered yttrium oxide bodies prepared according to the present development preferably exhibit an etch rate of from 0.14 to 0.68 nm/min for a $CF_4/O_2$ etch process as disclosed, from 0.19 to 0.310 nm/min for an $SF_6$ etch process as disclosed herein, and from 0.07 to 0.09 nm/min for an $O_2$ etch process as disclosed herein.

TABLE 17

$CF_4/O_2$ Etch Results

| CF4/02 Etch | Average Step Height (um) | Etch Rate (nm/min) | Average Volume (um³) × 10⁵ | Max Pore Size (um) |
|---|---|---|---|---|
| TSC 03 | 98.54 | 68.43 | 317.1 | N/A |
| 107 | 5.62 | 3.91 | 18 | 38 |
| 118 | 2.95 | 2.05 | 9.3 | 3 |
| 152 | 0.98 | 0.68 | 3.4 | 2 |
| 189-1 | 0.82 | 0.57 | 2.7 | 1 |
| 186-1 | 0.82 | 0.57 | 2.5 | 1.3 |
| 200 | 0.2 | 0.14 | 0.6 | 1.4 |

TABLE 18

$O_2$ Etch Results

| O2 Etch | Average Step Height (um) | Etch Rate (nm/min) | Average Volume (um³) × 10⁵ | Max Pore Size (um) |
|---|---|---|---|---|
| TSC 03 | 3.983 | 2.766 | 12.620 | N/A |
| 107 | 0.883 | 0.613 | 2.750 | 38 |
| 200 | 0.130 | 0.090 | 0.387 | 1.4 |
| 152 | 0.100 | 0.069 | 0.279 | 2 |

TABLE 19

$SF_6$ Etch Results

| SF6 Etch | Average Step Height (um) | Etch Rate (nm/min) | Average Volume (um³) × 10⁵ | Max Pore Size (um) |
|---|---|---|---|---|
| TSC 03 | 4.33 | 3.01 | 14.1 | N/A |
| 107 | 3.3 | 2.29 | 10.1 | 38 |
| 152 | 0.28 | 0.19 | 0.9 | 2 |
| 200 | 0.27 | 0.19 | 0.8 | 1.4 |
| 196 | 0.44 | 0.31 | 1.4 | 0.5 |

TABLE 20

Grain Size Results

| Part | Grain Size d10, um | Grain Size d50, um | Grain Size d90, um | Grain Size d100, um |
|---|---|---|---|---|
| H3/79 | 0.8 | 1.4 | 2.4 | 6.5 |
| 63 | 0.7 | 1.2 | 2.2 | 5.7 |
| 62 | 0.4 | 0.9 | 1.5 | 3.4 |
| H1/66 | 0.5 | 0.8 | 1.4 | 3.8 |
| H2/65 | 4 | 13 | 27.1 | 69.2 |

Grain Boundaries

Figure 12:
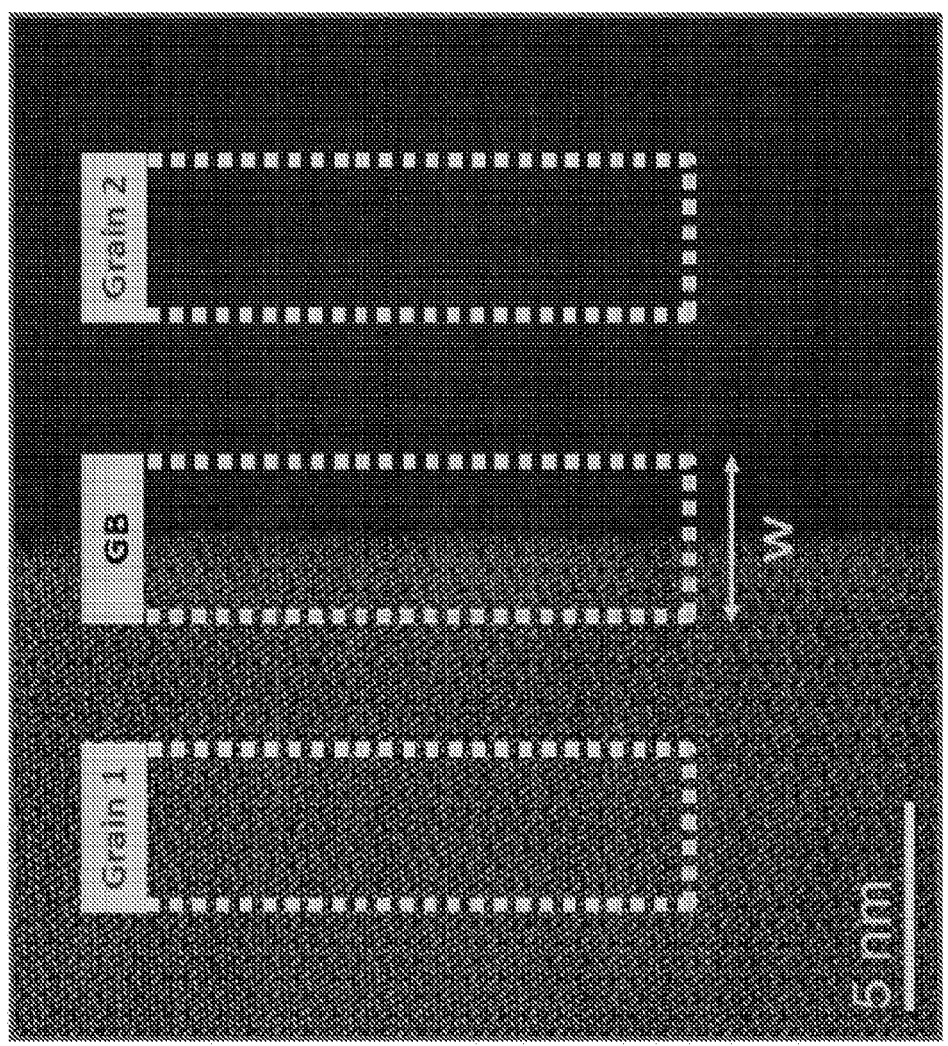
FIG. 12 is an EDS (energy dispersive x ray spectroscopy) spectrum acquired from selected areas on a grain boundary.

The composition and characteristics of the grain boundaries may relate to etch and erosion performance. As reported by M. Watanabe and D. B. Williams, (J. Microsc. 221 (2006) 89-109), the grain boundary characteristics may be calculated by ξ factor quantification. An EDS (energy dispersive x ray spectroscopy) spectrum is acquired from selected areas on a grain boundary and both abutting grains as depicted in FIG. 12, and the difference in elemental composition between the grain boundary and the bulk grains is reported as excess coverage in atoms/nm² (V. J. Keast, D. B. Williams, J. Microsc. 199 (2000) 45-55). Positive numbers for excess coverage indicate that the grain boundary has a higher concentration of a particular element relative to the bulk grain, and correspondingly negative numbers indicate that the element has a higher concentration with the bulk grain than the grain boundary.

Figure 13:
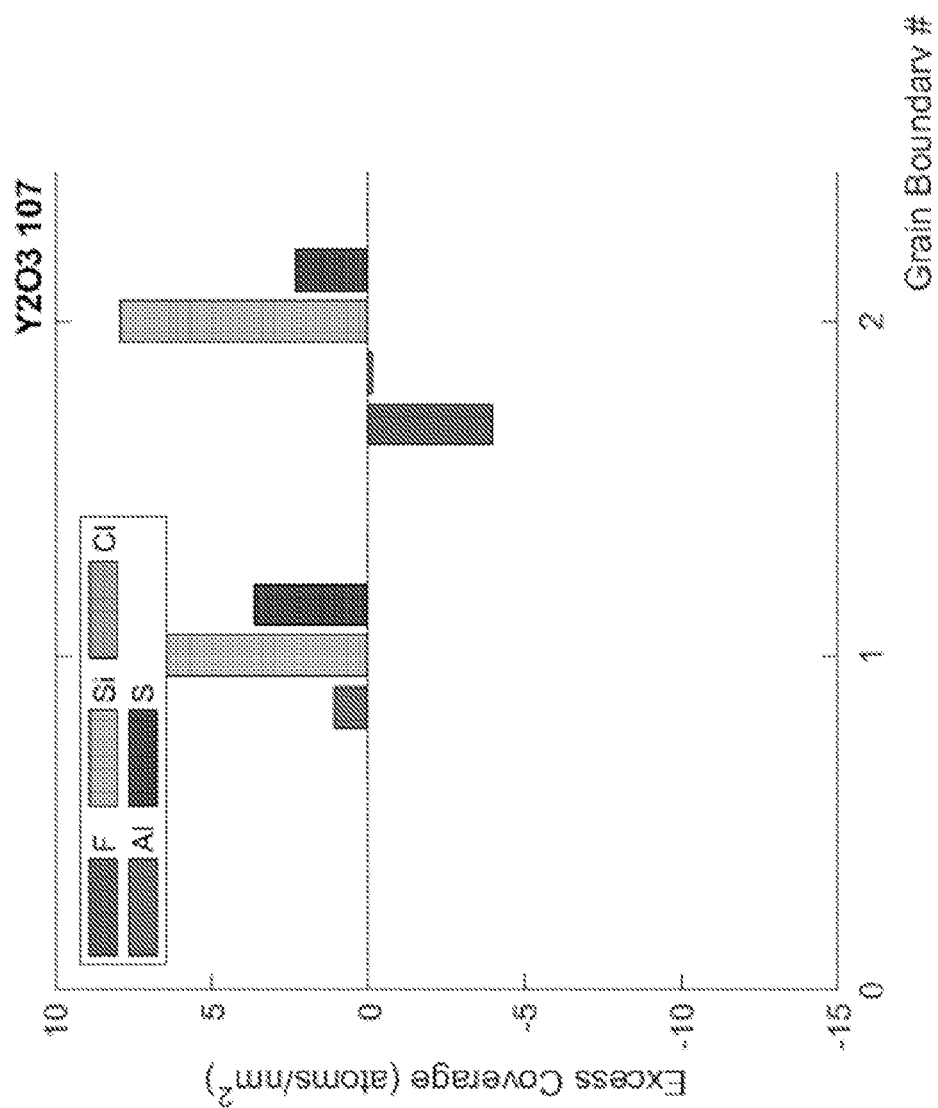
FIG. 13 illustrates the results of excess coverage in atoms/nm$^2$ across several grain boundaries for sample 107 of the Examples.

Comparator sample 107, a commercially available yttrium oxide sample, was analyzed as to its grain boundary composition and excess coverage. FIG. 13 illustrates the results of excess coverage in atoms/nm2 across several grain boundaries for sample 107. Silica was present in the grain boundary in an excess amount of about 8 to 10 atoms/nm2 relative to the abutting grains.

Figure 14:
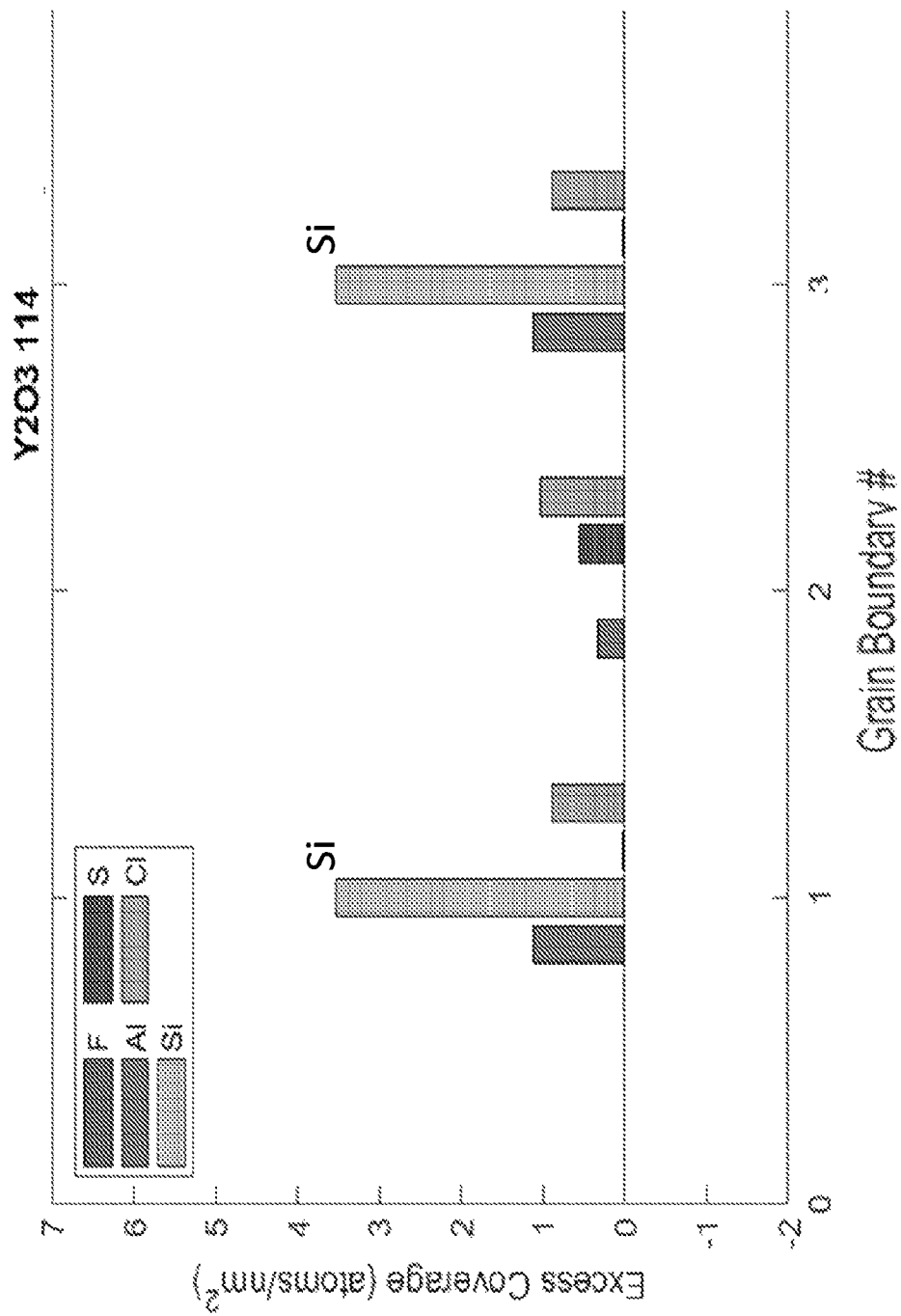
FIG. 14 illustrates the results of excess coverage in atoms/nm$^2$ across several grain boundaries for sample 114 of the Examples.

Sample 114, formed from a common powder supplier to that of sample 152, was analyzed as to its grain boundary composition and excess coverage. FIG. 14 illustrates the results of excess coverage in atoms/nm2. Silica was present in the grain boundary in an amount of from about 2 to about 4 atoms/nm2 relative to the bulk grain composition. All other elements were present in excess coverage amounts less than that of silica. These low levels of elements other than yttrium oxide present in the grain boundary of sample 114, corresponding to sample 152, may provide the preferred etch results as reported in Tables 17, 18 and 19 across various process gases.

What is claimed is:

1. A method of making a sintered ceramic body, the method comprising the following process steps:
   a. disposing at least one ceramic powder inside an inner volume of a spark plasma sintering tool, wherein the spark plasma sintering tool comprises: a die comprising a sidewall comprising an inner wall and an outer wall, wherein the inner wall has a diameter that defines the inner volume; an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die, wherein the sintering tool has a central axis and the gap is from 10 µm to 100 µm wide, wherein the inner wall of the die comprises at least one conductive foil which has a minimum thickness of 25 µm and wherein the gap is measured from an inwardly facing surface of the conductive foil closest to the upper and lower punches to the outer wall of each of the upper and lower punches;
   b. creating vacuum conditions inside the inner volume;
   c. moving at least one of the upper punch and the lower punch to apply pressure to the ceramic powder while heating the ceramic powder to a sintering temperature and sintering the ceramic powder to form the sintered ceramic body; and
   d. lowering the temperature of the sintered ceramic body, wherein the at least one ceramic powder has a specific surface area of from 1 to 18 M²/g as measured according to ASTM C1274 and
   the inner diameter of the die is greater than or equal to 100 mm.

2. The method of claim 1 wherein the inner diameter of the die is greater than or equal to 200 mm.

3. The method of claim 1 wherein the at least one ceramic powder has a resistivity of from about 1×10⁻⁵ ohm-cm to about 1×10$^{+10}$ ohm-cm and the at least one ceramic powder is selected from the group consisting of tungsten carbide, chromium carbide, vanadium carbide, niobium carbide, molybdenum carbide, tantalum carbide, titanium carbide, zirconium carbide, hafnium carbide, silicon carbide, boron carbide, molybdenum boride, chromium boride, hafnium boride, zirconium boride, tantalum boride and titanium boride or titanium diboride, and titanium nitride and combinations thereof.

4. The method of claim 1 wherein the gap has a width selected from the group consisting of from 10 μm to 70 μm, from 20 μm to 70 μm, from 30 μm to 70 μm, from 40 μm to 70 μm, from 50 μm to 70 μm, from 60 μm to 70 μm, from 10 to 60 um, from 10 to 50 um, from 10 to 40 um, from 10 to 30 um, from 20 μm to 60 μm, from 20 μm to 50 μm, from 30 μm to 60 μm, and from 30 μm to 50 μm.

5. The method of claim 1 wherein the gap is axisymmetric about the central axis or wherein the gap is asymmetric about the central axis.

6. The method of claim 1 wherein the at least one ceramic powder has a specific surface area (SSA) selected from the group consisting of from 1 to 16 m$^2$/g, from 1 to 14 m$^2$/g, from 1 to 10 m$^2$/g, from 1 to 8 m$^2$/g, from 1 to 6 m$^2$/g, from 2 to 18 m$^2$/g, from 4 to 18 m$^2$/g, from 6 to 18 m$^2$/g, from 8 to 18 m$^2$/g, from 10 to 18 m$^2$/g, from 4 to 12 m$^2$/g, from 4 to 10 m$^2$/g, and from 6 to 8 m$^2$/g.

7. The method according to claim 1, wherein the method further comprises the following optional steps:
 e. annealing the sintered ceramic body by applying heat to raise the temperature of the sintered ceramic body to reach an annealing temperature;
 f. lowering the temperature of the sintered and annealed ceramic body to an ambient temperature; and
 g. machining the annealed sintered ceramic body into one selected from the group consisting of a focus ring, a window, a nozzle, a gas injector, a shower head, a gas distribution plate, a remote plasma adapter, an etch chamber liner, a plasma source adapter, a gas inlet adapter, a diffuser,
 an electronic wafer chuck, a chuck, a puck, a mixing manifold, an ion suppressor element, a faceplate, an isolator, a spacer, and a protective ring.

8. The method according to claim 1, wherein a temperature difference per centimeter across the at least one ceramic powder disposed inside the inner volume defined by the tool set of the sintering apparatus during step c. is from 0.15 to 5° C./cm.

9. The method according to claim 1 wherein a temperature difference across the at least one ceramic powder disposed inside the inner volume defined by the tool set of the sintering apparatus during step c. is from 1 to 100° C.

10. The method according to claim 1, wherein the at least one ceramic powder has a d50 particle size selected from the group consisting of from 0.8 to 100 μm, from 0.8 to 80 μm, from 0.8 to 60 μm, from 0.8 to 40 μm, from 0.8 to 30 μm, from 0.8 to 20 μm, from 0.8 to 10 μm, from 0.8 to 5 um, from 1 to 100 μm, from 3 to 100 um, from 5 to 100 μm, from 10 to 100 μm, from 20 to 100 μm, from to 40 μm, and from 5 to 30 μm.

11. The method according to claim 1, wherein the at least one ceramic powder comprises a powder compact having a packing density selected from the group consisting of from 20% to 60% by volume, from 30% to 60% by volume, from 40% to 60% by volume, from 20% to 50% by volume, from 20% to 40% by volume, from 30% to 50% by volume, from 40% to 55% by volume, and from 45% to 55% by volume.

12. The method according to claim 1, wherein an unpulsed, continuous direct current is used.

\* \* \* \* \*